(12) United States Patent
Masuda

(10) Patent No.: US 7,817,176 B2
(45) Date of Patent: Oct. 19, 2010

(54) LIGHT SOURCE DEVICE, OPTICAL SCANNING DEVICE, AND IMAGE FORMING APPARATUS

(75) Inventor: Koji Masuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 132 days.

(21) Appl. No.: 11/614,572

(22) Filed: Dec. 21, 2006

(65) Prior Publication Data

US 2007/0146473 A1    Jun. 28, 2007

(30) Foreign Application Priority Data

| Dec. 26, 2005 | (JP) | ............................. 2005-373103 |
| Jan. 12, 2006 | (JP) | ............................. 2006-005431 |
| Feb. 7, 2006 | (JP) | ............................. 2006-029091 |
| Sep. 20, 2006 | (JP) | ............................. 2006-254494 |
| Dec. 6, 2006 | (JP) | ............................. 2006-329113 |

(51) Int. Cl.
*B41J 2/385* (2006.01)
*B41J 15/14* (2006.01)
*B41J 2/435* (2006.01)
*G02B 5/30* (2006.01)
*G02B 27/44* (2006.01)
*G02B 5/18* (2006.01)

(52) U.S. Cl. ..................... 347/241; 347/129; 347/130; 347/134; 347/136; 347/246; 359/487; 359/566; 359/569; 359/576

(58) Field of Classification Search ..................... None
See application file for complete search history.

(56) References Cited

U.S. PATENT DOCUMENTS 4,983,002 A * 1/1991 Shikama et al. ............. 359/566

5,991,063 A * 11/1999 Ando ........................ 359/204

(Continued)

FOREIGN PATENT DOCUMENTS

JP    8-56049    2/1996

(Continued)

OTHER PUBLICATIONS

Tyan et al., 1996, SPIE, vol. 2689, pp. 82-89.*

(Continued)

*Primary Examiner*—Matthew Luu
*Assistant Examiner*—Kendrick X Liu
(74) *Attorney, Agent, or Firm*—Oblon, Spivak, McClelland, Maier & Neustadt, L.L.P.

(57) ABSTRACT

A disclosed device for optically scanning a target surface includes a light source unit configured to emit a light beam; a light intensity detecting unit; a coupling unit configured to substantially collimate the emitted light beam; a beam limiting unit configured to limit the amount of the collimated light beam; a beam splitting unit configured to split the beam limited light beam and thereby to cause a first portion of the beam limited light beam to enter the light intensity detecting unit, wherein the light intensity detecting unit is configured to detect the intensity of the first portion of the beam limited light beam; and a beam deflecting unit configured to deflect a second portion of the split light beam toward the target surface. In the disclosed device, the beam limiting unit and the beam splitting unit are integrated as a single unitary structure and positioned between the coupling unit and the light deflecting unit.

15 Claims, 42 Drawing Sheets

U.S. PATENT DOCUMENTS

| | | |
|---|---|---|
| 6,487,015 B2 * | 11/2002 | Kitamura et al. ............. 359/558 |
| 2005/0078374 A1 * | 4/2005 | Taira et al. .................. 359/569 |
| 2005/0157160 A1 * | 7/2005 | Vazan ........................ 347/238 |
| 2005/0169152 A1 * | 8/2005 | Miyake et al. ......... 369/112.15 |
| 2006/0209372 A1 * | 9/2006 | Tada .......................... 359/196 |

FOREIGN PATENT DOCUMENTS

| | | |
|---|---|---|
| JP | 8-330661 | 12/1996 |
| JP | 2555317 | 8/1997 |
| JP | 9-288244 | 11/1997 |
| JP | 10-325933 | 12/1998 |
| JP | 2002-40350 | 2/2002 |
| JP | 2003-215485 | 7/2003 |

OTHER PUBLICATIONS

Hisao Kikuta, et al., "Light control by subwavelength grating structure", Japanese Journal of Optics, vol. 27, No. 1, 1998, pp. 12-17, and English Translation.

* cited by examiner 121
121a
121b

121

↕ : TM-POLARIZED LIGHT

⊙ : TE-POLARIZED LIGHT

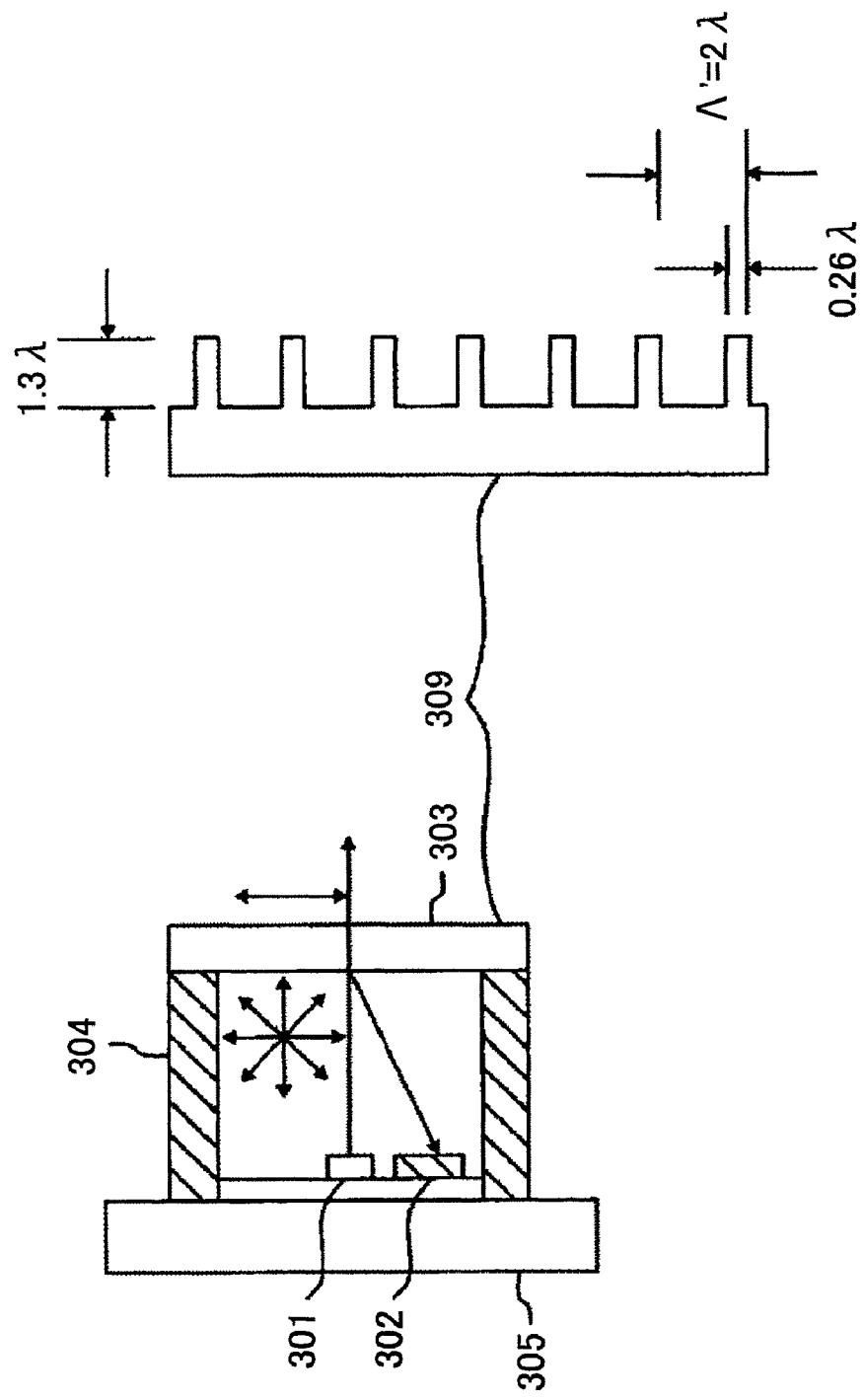

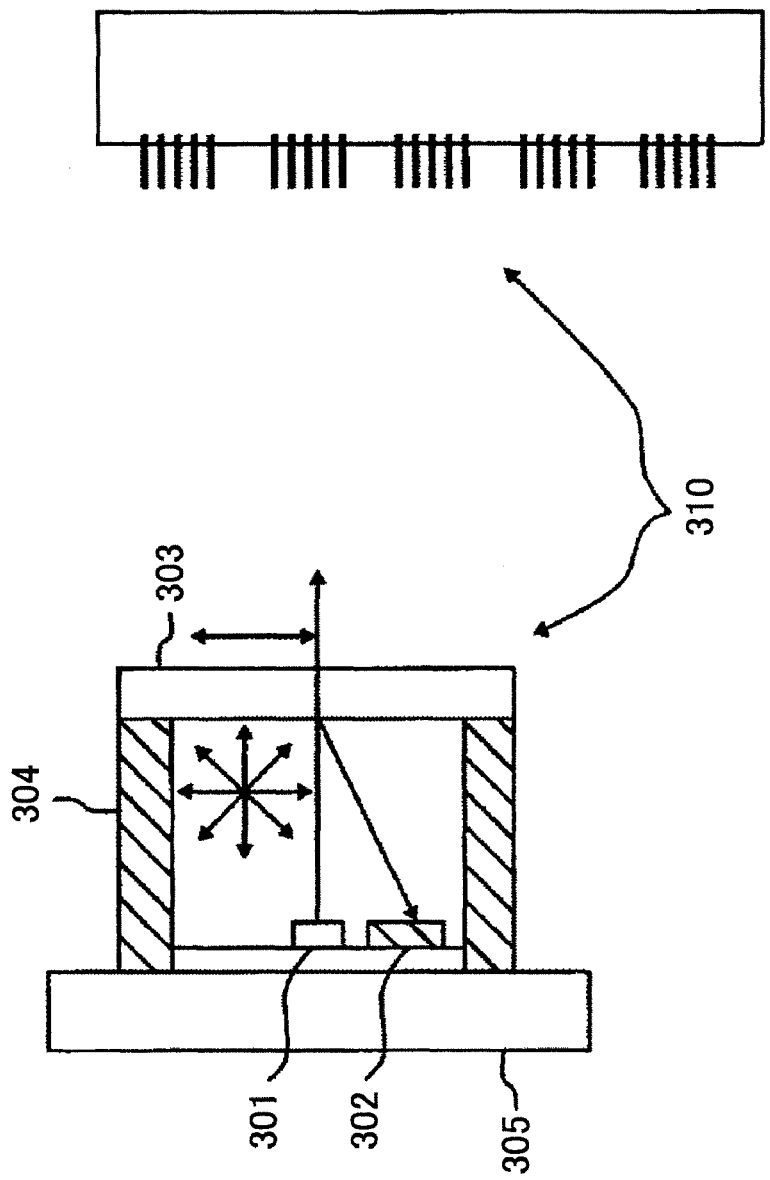

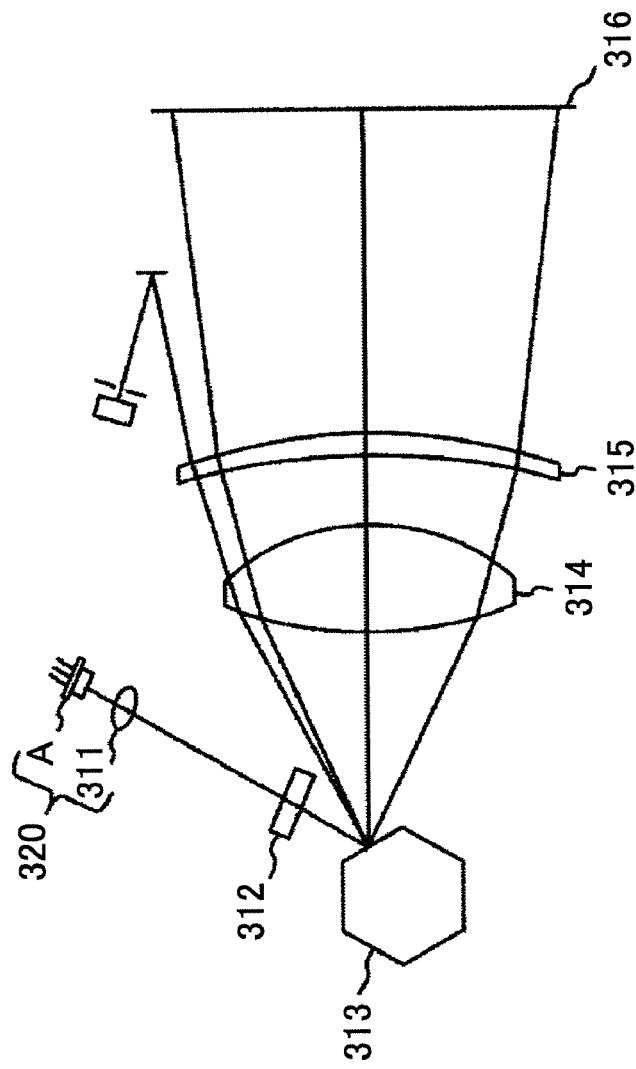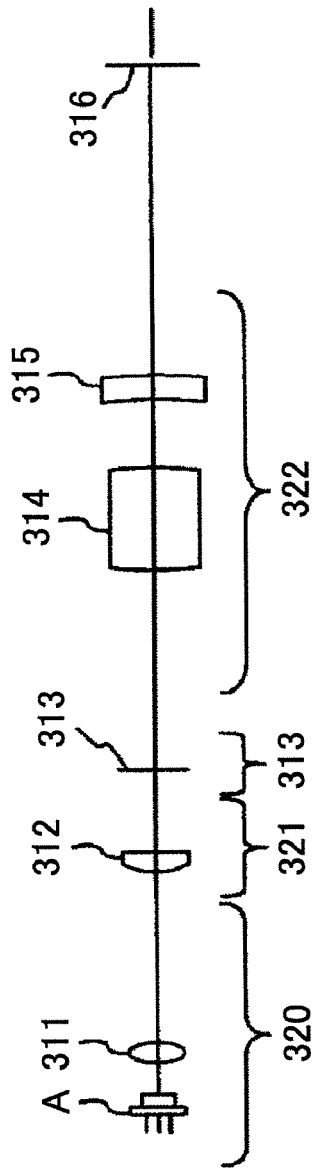
FIG.58A
FIG.58B

LIGHT SOURCE DEVICE, OPTICAL SCANNING DEVICE, AND IMAGE FORMING APPARATUS

BACKGROUND OF THE INVENTION

1. Field of the Invention

The present invention generally relates to a light source device, an optical scanning device, and an image forming apparatus, and more particularly relates to a light source device including a surface emitting laser or a surface emitting laser array and having light intensity control and polarization control mechanisms; an optical scanning device including a beam-splitting unit for splitting a laser beam and thereby enabling the detection of the intensity of the light beam; and an image forming apparatus including the light source device and/or the optical scanning device.

2. Description of the Related Art

In an image forming apparatus such as a laser printer or a digital copier, a latent image (electrostatic latent image) is formed on a photoconductor by focusing a light beam, which is emitted from a light source and modulated according to image data, via a beam deflector and a scanning lens onto the photoconductor and by scanning the focused light beam in a specified direction (main-scanning direction). The formed latent image is developed by causing toner to adhere to the latent image.

In recent years, there has been a demand for improving the printing speed and printing resolution of such an image forming apparatus. One way to improve the printing speed and resolution of an image forming apparatus is to increase the light scanning speed and resolution of an optical scanning device of the image forming apparatus by increasing the deflection speed of a beam deflector, in other words, by increasing the rotational speed of a polygon mirror of the optical scanning device.

However, a higher rotational speed increases noise and heat generated by an optical scanning device and therefore it is difficult to increase the rotational speed of a polygon mirror above a certain level. Another way to increase the light scanning speed and resolution of an optical scanning device is to scan multiple lines at once using multiple light beams.

For example, there is a multi-beam light source device that can scan multiple light beams using a multi-beam light source for generating multiple light beams. Such a multi-beam light source may be implemented by a laser array having multiple light-emitting points in one package. The printing speed and resolution of an image forming apparatus can be improved by replacing a conventional optical scanning device having a single-beam light source device with an optical scanning device having a multi-beam light source device. Also, many technologies for implementing a multi-beam light source device using multiple single-beam light sources each having one light emitting point have been proposed.

As a light source, a laser diode (LD) called an edge emitting laser had been mainly used. In recent years, however, a laser diode called a vertical cavity surface emitting laser (VCSEL, hereafter called "surface emitting laser") has come to be used. Compared with edge emitting lasers, it is easier to form a laser array using surface emitting lasers. For example, with edge emitting lasers, an array of 4 to 8 light beams may be the maximum. On the other hand, with surface emitting lasers, it is possible to array 16 to 32 or more light beams. For this reason, surface emitting lasers are expected to improve the printing speed and resolution of image forming apparatuses. Also, surface emitting lasers may be used for other optical devices such as an optical communications system.

However, to use a surface emitting laser instead of an edge emitting laser as a light source for a conventional optical scanning device, some problems as described below must be solved.

Normally, the light output level of an edge emitting laser is automatically controlled based on feedback obtained by monitoring at least a portion of light emitted backward from the edge emitting laser. This output level control is called auto power control (APC). In the case of a surface emitting laser, since it does not emit light backward, a different light intensity control mechanism is necessary. Without light intensity control, the light output level of a light source device fluctuates. The fluctuation in the light output level causes unevenness in image density and thereby makes it difficult for an image forming apparatus using the light source device to produce a high-quality image.

One way to control the light intensity of a surface emitting laser is to split a light beam emitted from the surface emitting laser and thereby to direct a certain portion of the light beam to a photodetector. Based on an output from the photodetector, a laser beam intensity control unit controls the driving current of the surface emitting laser and thereby maintains the light output from the surface emitting laser at a certain level. In this case, a beam splitter as shown in FIG. 18 or a half mirror as shown in FIGS. 19, 20A, and 20B may be used to split a light beam and thereby to direct a portion of the light beam to a photodetector.

Also, patent documents 1 through 7 and non-patent document 1 disclose technologies for solving the above problems. Patent document 1 discloses a light intensity monitor including a beam splitter positioned adjacent to a surface emitting laser and a photodetector positioned close to the surface emitting laser (FIG. 27). In the disclosed light intensity monitor, the beam splitter separates a portion of a light beam emitted from the surface emitting laser and the photodetector receives the separated portion of the light beam. Also, the disclosed light intensity monitor is designed so as not to greatly increase the size and costs of a laser-using apparatus.

Patent documents 2 and 3 disclose technologies for separating a portion of a light beam by using a half mirror as a beam-splitting optical element. Patent document 2 discloses an optical scanning device that can make changes in reflectance and transmittance, which changes are caused by difference in angle of view, substantially the same among multiple light beams (FIG. 29).

Patent document 3 discloses an optical scanning device that prevents fluctuation in a driving current from affecting the ratio of the intensity of a laser beam transmitted through a half mirror to that of a laser beam reflected by the half mirror (FIG. 28).

However, technologies disclosed in the above patent documents have disadvantages as described below.

In the light intensity monitor disclosed in patent document 1, a portion of a laser beam emitted from a surface emitting laser is separated by a beam splitter adjacent to the surface emitting laser. The disclosed light intensity monitor can maintain the light intensity of a light beam just emitted from a surface emitting laser at a certain level. However, since the divergence angle of a light beam emitted from a surface emitting laser changes as the driving current changes, the amount of the light beam that can pass through an aperture, which is a beam-limiting unit provided between a surface emitting laser and a beam deflector, may change.

Also, since the beam splitter in the light intensity monitor disclosed in patent document 1 is positioned in the path of divergent light, the portion of the light beam separated by the beam splitter and received by the photodetector is also divergent light. Therefore, to receive all of the separated divergent light, it is necessary to increase the size of the photodetector. However, increasing the size of a photodetector may reduce the responsivity of the photodetector. Although it is possible to reduce the size of a photodetector by adding a light focusing unit, such a configuration increases production costs.

To obviate the above problems, in patent documents 2 and 3, a beam-splitting unit (half mirror) for separating a portion of a light beam is positioned downstream of an aperture. This configuration makes it possible to maintain the intensity of a light beam passing through an aperture at a certain level. With this configuration, however, the position of a photodetector becomes further from the surface emitting laser than that in the configuration shown in patent document 1.

Also, in an optical scanning device disclosed in patent document 2 or 3, a portion of a light beam is separated and directed in a direction that forms a wide angle with the light path of a light beam going from the light source to the beam deflector. Therefore, a photodetector must be placed in a position that is distant from the light source. Such a configuration contributes to increasing the size of an optical scanning device. Although it is possible to position the photodetector close to the light source by providing a loopback mirror for bending the separated light beam toward the light source, such a configuration increases production costs. Also, as in the case of patent document 1, to reduce the size of the photodetector, an additional light focusing unit is necessary.

Further, in both of the above configurations, since reflection of a beam splitter or a half mirror is used to split a light beam, the beam splitter or the half mirror must be installed with very high accuracy to guide a reflected light beam to a desired point.

FIG. 27 is a drawing illustrating a conventional optical scanning device where a beam splitter is used to separate a portion of a light beam. FIG. 60 is a drawing illustrating a conventional optical scanning device where a half mirror is used to separate a portion of a light beam.

In an optical scanning device disclosed in patent document 1, a beam splitter 341 is used to split a light beam and thereby to guide a portion of the light beam to a photodetector 340 (FIG. 27). In an optical scanning device disclosed in patent document 4, a half mirror 44 is used as a beam-splitting optical element to separate a portion of a light beam (FIG. 60).

In an optical system 343 shown in FIG. 60, reference numbers are assigned only to a light intensity control circuit 342, a half mirror 344, a polygon mirror 348, and imaging lenses 346 and 347 for scanning a light beam onto a photosensitive drum 345.

A light beam emitted from an edge emitting laser is linearly polarized in a direction parallel to the active layer of the edge emitting laser. FIG. 61 is a drawing illustrating the polarization direction of a light beam emitted from an edge emitting laser.

While a light beam emitted from an edge emitting laser is linearly polarized as shown in FIG. 61, a light beam emitted from a surface emitting laser is randomly polarized due to its structure. Therefore, a polarization control mechanism is necessary for a light beam from a surface emitting laser.

In an optical scanning device, a light beam is transmitted and reflected by many optical elements such as a beam deflector. The transmission and reflection of a light beam at a phase boundary is polarization-dependent. In other words, the transmittance and reflectance of a light beam polarized in a direction parallel to the incidence plane (P-polarized) and those of a light beam polarized in a direction perpendicular to the incidence plane (S-polarized) become different.

Therefore, light beams emitted from the light sources in a multi-beam light source device are preferably polarized in the same direction. Also, when a light source device having surface emitting lasers is used in an optical scanning device that is originally designed to be used with a light source device having edge emitting lasers, the polarization directions of the light beams are preferably the same. If the light beams have different polarization directions, the light intensity characteristics in one line (one scan line) are greatly degraded.

Accordingly, with an image forming apparatus having such characteristics, image density becomes uneven because of the polarization dependence of transmittance and reflectance of a beam deflector and other optical elements, and therefore it is difficult to form an image with high quality.

FIG. 62 is a drawing illustrating a conventional polarization control mechanism. Patent document 5 discloses a polarization control mechanism for a surface emitting laser. The disclosed polarization control mechanism is incorporated in the structure of a surface emitting laser (FIG. 62). One disadvantage of the disclosed polarization control mechanism is that the structure of a surface emitting laser becomes complicated and therefore its production is difficult.

Also, the structure of the disclosed polarization control mechanism may have to be changed according to the structure and production method of a surface emitting laser. Therefore, the disclosed polarization control mechanism may not be able to be used for all types of surface emitting lasers. As another example, there is a polarization control method where the polarization of a light beam emitted from a surface emitting laser is controlled before the light beam is affected by the polarization dependence of transmittance and reflectance of optical elements.

FIG. 63 is a drawing illustrating a conventional polarization control mechanism disclosed in patent document 6 where a polarization beam splitter is positioned adjacent to the light emitting side of a surface emitting laser. FIG. 29 is a drawing illustrating a conventional polarization control mechanism disclosed in patent document 2 where a polarizer and a half mirror are used.

The polarization control mechanism disclosed in patent document 6 is provided outside of the light emitting part of a surface emitting laser. More specifically, in patent document 6, a polarization beam splitter 350 is positioned adjacent to the light emitting side of a surface emitting laser 349 (FIG. 63). The polarization beam splitter 350 transmits only a light beam with a specific polarization direction. In the polarization control mechanism disclosed in patent document 2, a polarizer 351 and a half mirror 352 are positioned in the light path of a light beam so that only a light beam with a specific polarization direction is transmitted (FIG. 29).

However, in devices disclosed in patent documents 1 and 6, light intensity control is not performed. In an optical scanning device disclosed in patent document 2, both a polarization control unit and a beam-splitting unit are provided. However, those two units are provided separately. In an optical scanning device disclosed in patent document 7, polarization direction of a light beam is controlled by a polarization filter.

In a light intensity control unit disclosed in patent document 1, a light beam is split by a beam splitter and a cover glass (parallel plate), and a portion of the light beam is thereby directed to a photodetector. In a light intensity control unit disclosed in patent document 4, a beam-splitting optical element (half mirror) is used.

A polarization control mechanism disclosed in patent document 5 uses a resonator structure to control the polarization of a light beam. In a polarization control mechanism disclosed in patent document 6, a polarization beam splitter is positioned adjacent to the light emitting side of a surface emitting laser. In an optical scanning device disclosed in patent document 2, a polarization control unit is provided between a light source unit and a deflecting unit. Also, the polarization control unit is integrated with another optical element. Further, a light intensity detecting unit is provided between the polarization control unit and the deflecting unit.

In an optical scanning device disclosed in patent document 7, the polarization direction of a light beam is controlled by a polarization filter. Also, non-patent document 1 includes a description of an optical element having a structure where two media (for example, air and an isotropic medium) with different refractive indices are arranged alternately at a pitch smaller than the wavelength of light (subwavelength structure: SWS). Such an optical element shows an optical anisotropy called form birefringence.

Conventionally, a birefringent crystal such as rock crystal or calcite has been used to produce birefringence. However, since birefringence is a substance-specific property, it is difficult to control the birefringence of a substance. On the other hand, form birefringence can be produced without using a birefringent crystal and can be relatively easily controlled by changing the shape of a medium.

Using form birefringence makes it possible to create, for example, a polarization beam splitter without using a birefringent crystal. Also, it is possible to form an antireflection structure on an optical surface by changing the shape of a medium and thereby controlling the effective refractive index of the medium.

Form birefringence is also seen in a periodic structure (resonance structure) where two media are arranged alternately at a pitch within a so-called resonance range that is equal to or several times greater than the wavelength of light. An optical element having a subwavelength structure or a resonance structure that shows form birefringence as described above may behave differently with TE-polarized light and TM-polarized light. For example, the diffraction efficiency of such an optical element may become polarization-dependent.

By changing the thickness, an optical element having form birefringence can also be used as a $\lambda/2$ plate or a $\lambda/4$ plate that changes the phase difference between TE-polarized light and TM-polarized light.

When the refractive indices of TE-polarized light and TM polarized light are n(TE) and n(TM), the wavelength of light is $\lambda$, and the thickness of a subwavelength structure is d, the phase difference $\Phi$ can be obtained by the following formula:

$$\Phi=2\Pi\{n(TE)-n(TM)\}d/\lambda$$

Also, with a subwavelength structure having a certain thickness d, it is possible to create a polarization filter that transmits only either TE-polarized light or TM polarized light.

[Patent document 1] Japanese Patent Application Publication No. 8-330661

[Patent document 2] Japanese Patent Application Publication No. 9-288244

[Patent document 3] Japanese Patent Application Publication No. 2002-040350

[Patent document 4] Japanese Patent Application Publication No. 2003-215485

[Patent document 5] Japanese Patent Application Publication No. 8-56049

[Patent document 6] Japanese Utility Model No. 2555317

[Patent document 7] Japanese Patent Application Publication No. 10-325933

[Non-patent document 1] Light control by subwavelength grating structure, H. Kikuta and K. Iwata, Japanese Journal of Optics Vol. 27 No. 1 (1998) page 12-17

SUMMARY OF THE INVENTION

The present invention provides a light source device, an optical scanning device, and an image forming apparatus that substantially obviate one or more problems caused by the limitations and disadvantages of the related art.

An embodiment of the present invention makes it easier to install a beam-splitting unit in an optical scanning device of an image forming apparatus. Another embodiment of the present invention provides an optical scanning device and an image forming apparatus including a polarization control mechanism that reduces the influence of polarization dependence of light sources and optical elements and thereby reduces fluctuation in the intensity of a light spot. Another embodiment of the present invention provides an optical scanning device and an image forming apparatus that can control the intensity of a light beam from a light source without being affected by changes in the divergence angle of the light beam which are caused by changes in the driving current.

According to one aspect of the present invention, a device for optically scanning a target surface includes a light source unit configured to emit a light beam; a light intensity detecting unit; a coupling unit configured to substantially collimate the emitted light beam; a beam limiting unit configured to limit the amount of the collimated light beam; a beam splitting unit configured to split the beam limited light beam and thereby to cause a first portion of the beam limited light beam to enter the light intensity detecting unit, wherein the light intensity detecting unit is configured to detect the intensity of the first portion of the beam limited light beam; and a beam deflecting unit configured to deflect a second portion of the split light beam toward the target surface; wherein the beam limiting unit and the beam splitting unit are integrated as a single unitary structure and positioned between the coupling unit and the light deflecting unit.

Another embodiment of the present invention provides a small and low-cost optical scanning device including a light intensity detecting unit that can accurately detect the intensity of a light beam emitted from a light source.

Another embodiment of the present invention provides a small and low-cost image forming apparatus that can form a high-quality image.

According to one aspect of the present invention, a device for optically scanning a target surface includes a light source unit configured to emit a light beam; a light detecting unit; a first optical unit configured to shape the emitted light beam; a second optical unit configured to split the shaped light beam and thereby to cause a first portion of the shaped light beam to pass through the first optical unit again and then enter the light detecting unit; and a deflecting unit configured to deflect a second portion of the split light beam toward the target surface; wherein the second optical unit is positioned between the first optical unit and the deflecting unit.

An embodiment of the present invention provides a small and low-cost surface-emitting laser light source device including a light intensity control unit and a polarization control unit that is integrated with a beam-splitting unit on a cover glass; an optical scanning device including the surface-emitting laser light source device; and an image forming apparatus including the optical scanning device.

According to one aspect of the present invention, a light source device includes a surface emitting laser configured to emit a light beam; a light detecting unit; a cover glass configured to cover the surface emitting laser; a beam splitting unit configured to split the emitted light beam and thereby to cause a portion of the emitted light beam to enter the light detecting unit; and a polarization control unit configured to control the polarization of the emitted light beam; wherein the beam splitting unit and the polarization control unit are integrated with the cover glass.

BRIEF DESCRIPTION OF THE DRAWINGS

FIG. 54 is a drawing illustrating another exemplary polarization control mechanism;

FIG. 55 is a drawing illustrating an exemplary beam-splitting/polarization-control mechanism formed on a cover glass;

FIGS. 58A and 58B are drawings illustrating an exemplary optical scanning device according to an embodiment of the present invention;

DESCRIPTION OF THE PREFERRED EMBODIMENTS

Preferred embodiments of the present invention are described below with reference to the accompanying drawings.

First Embodiment

An exemplary optical scanning device according to a first embodiment is described below.

Figure 1A:
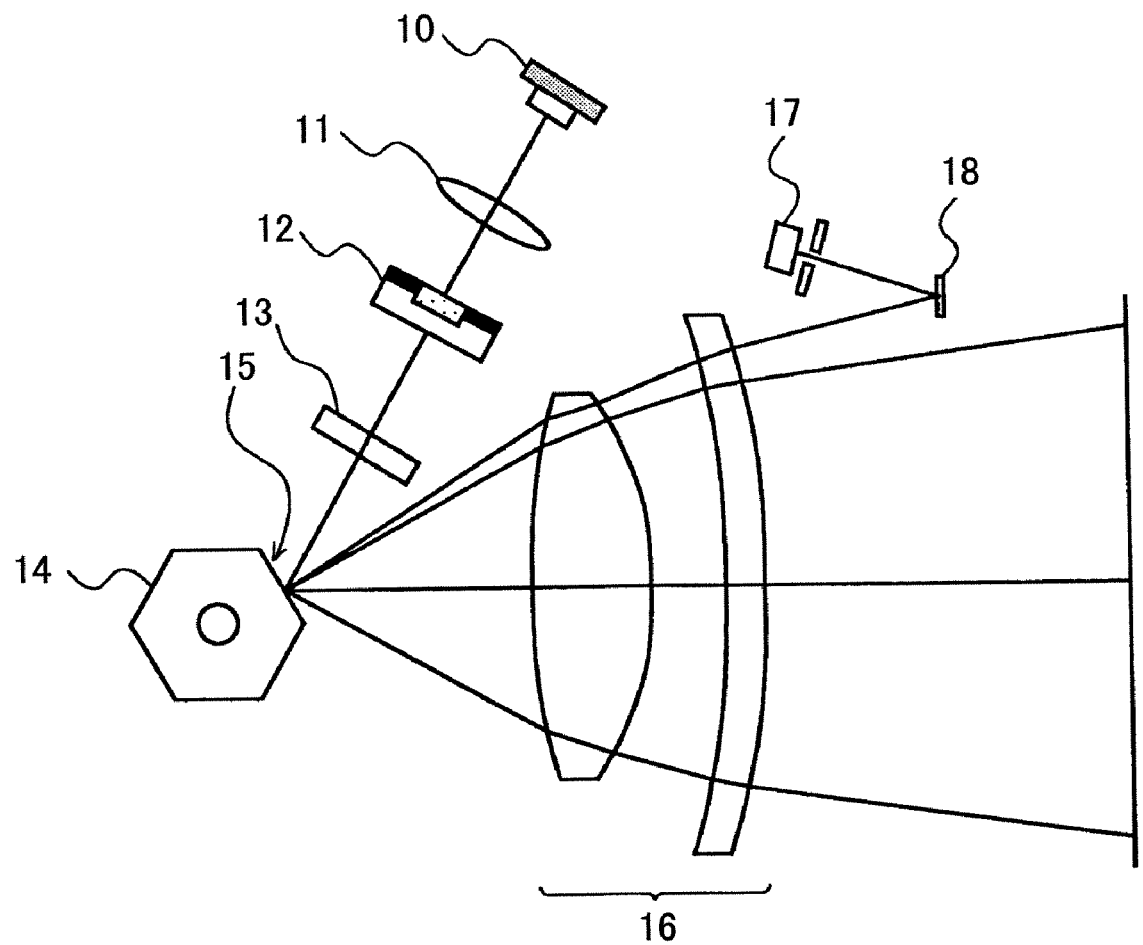
FIGS. 1A and 1B are drawings illustrating an exemplary configuration of an optical scanning device according to a first embodiment of the present invention.
Figure 1B:
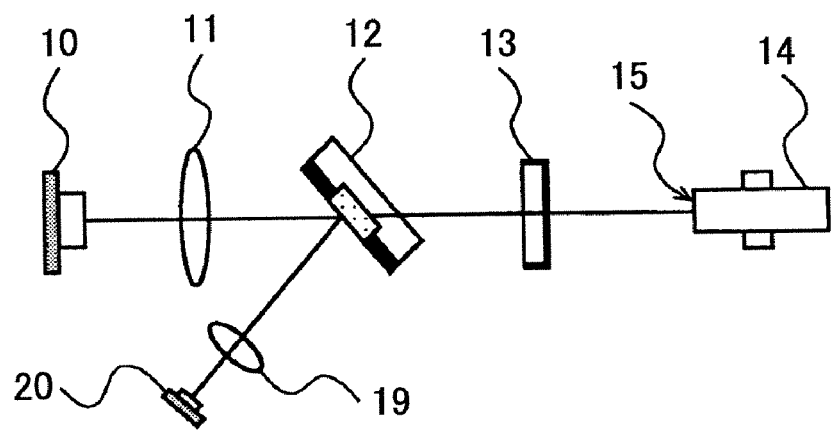

FIGS. 1A and 1B are drawings illustrating an exemplary configuration of the exemplary optical scanning device according to the first embodiment of the present invention.

As shown in FIGS. 1A and 1B, the exemplary optical scanning device according to the first embodiment includes a VCSEL 10, a coupling lens 11, a beam limiting/splitting unit 12, a cylindrical lens 13, a polygon scanner 14 having deflecting reflective surfaces 15, fθ lenses 16, a synchronizing sensor 17, a reflection mirror 18, an optical unit 19, and a photodetector 20.

The VCSEL (vertical cavity surface emitting laser) 10 is a light source. Either a single-VCSEL having one light-emitting point or a multi-beam VCSEL having multiple light-emitting points may be used as the VCSEL 10. A divergent light beam emitted from the VCSEL 10 enters a coupling unit for converting the divergent light beam into a light beam with a desired convergence or divergence angle.

In the coupling unit, the light beam is substantially collimated by the coupling lens 11 and then enters a first optical unit via the beam limiting/splitting unit 12. The first optical unit is made of the cylindrical lens 13 and focuses the light beam to form a line image that is long in the main-scanning direction near the deflecting reflective surfaces (polygon mirror surfaces) 15 of the polygon scanner 14.

The light beam is deflected by the polygon scanner 14 and is then focused by a second optical unit to form a light spot on a target surface. In the first embodiment, two fθ lenses 16 are used as the second optical unit. The synchronizing sensor 17 for controlling scan timing and a third optical unit for guiding the light beam to the synchronizing sensor 17 are positioned outside of the effective image area. In the first embodiment, the reflection mirror 18 is used as the third optical unit.

Also, as shown in FIG. 1B, the beam limiting/splitting unit 12 includes a beam-limiting part for limiting the amount of the light beam and a beam-splitting part for separating a portion of the light beam. The portion of the light beam separated by the beam-splitting part is guided via the optical unit 19 or directly to the photodetector 20. Then, the photodetector 20 detects the intensity of the portion of the light beam.

With the configuration as described above, the exemplary optical scanning device according to the first embodiment is able to control the intensity of a light beam from a light source without being affected by changes in the divergence angle of the light beam which are caused by changes in the driving current.

Figure 2:
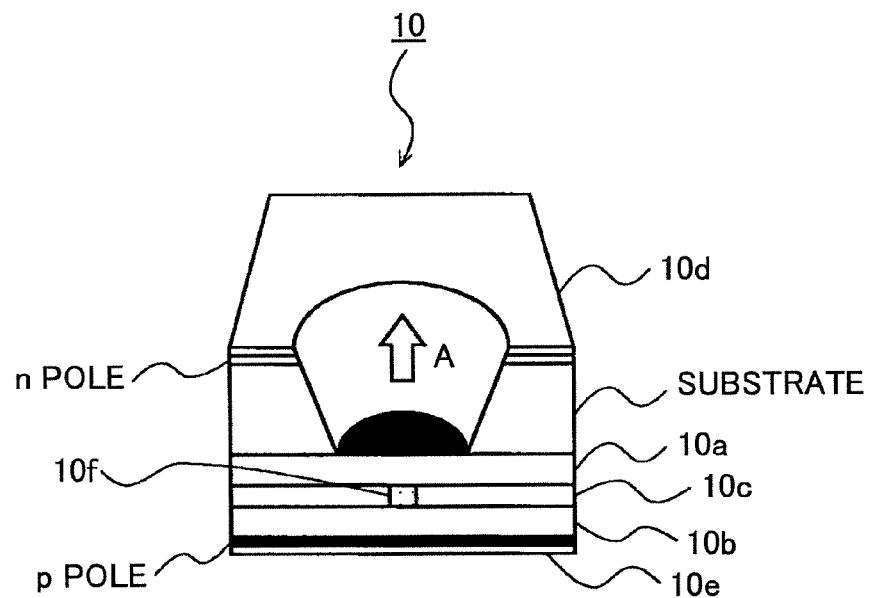
FIG. 2 is a drawing illustrating an exemplary structure of a VCSEL 10.

Next, the VCSEL 10 used as a surface emitting laser is described in detail. FIG. 2 is a drawing illustrating an exemplary structure of the VCSEL 10.

As shown in FIG. 2, an active layer 10c is sandwiched between two clad layers 10a and 10b. A substrate is stacked on the upper surface of the clad layer 10a. Also, reflective layers 10d and 10e with high reflectance are provided on the upper surface of the substrate and the under surface of the clad layer 10b, respectively, so that they are positioned at the opposite ends.

The layers sandwiched between the reflective layers 10d and 10e function as a Fabry-Perot resonator that is perpendicular to the substrate and cause laser oscillation in an oscillation area 10f of the active layer 10c. A light beam is emitted in the direction of arrow A shown in FIG. 2, in other words, in the direction perpendicular to the substrate.

Because of the above structure, the VCSEL 10 does not emit light backward. Therefore, auto power control (APC) has to be performed on the VCSEL 10 using a portion of a light beam emitted forward. In the first embodiment, the beam limiting/splitting unit 12 is used to direct a portion of a light beam to the photodetector 20.

Figure 3:
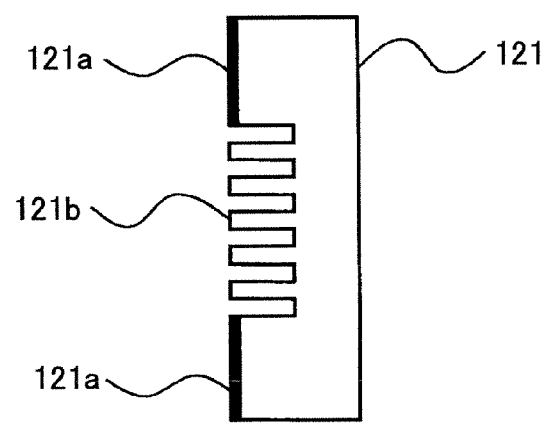
FIG. 3 is a drawing illustrating an example of a beam limiting/splitting unit 12.

The beam limiting/splitting unit 12 is described below in detail. FIG. 3 is a drawing illustrating an example of the beam limiting/splitting unit 12.

In the first embodiment, as shown in FIG. 3, a beam limiting/splitting element 121 is used as the beam limiting/splitting unit 12. The beam limiting/splitting element 121 includes a beam-limiting part 121a for limiting the amount of a light beam and a beam-splitting part 121b for separating a portion of the light beam.

The beam limiting/splitting element 121 is made of a glass plate. The beam-limiting part 121a has a light shielding property and is formed by applying a light shielding film or a light shielding material on the glass plate. A light beam incident on the beam-limiting part 121a is absorbed and therefore cannot pass through the beam limiting/splitting element 121.

Figure 4:
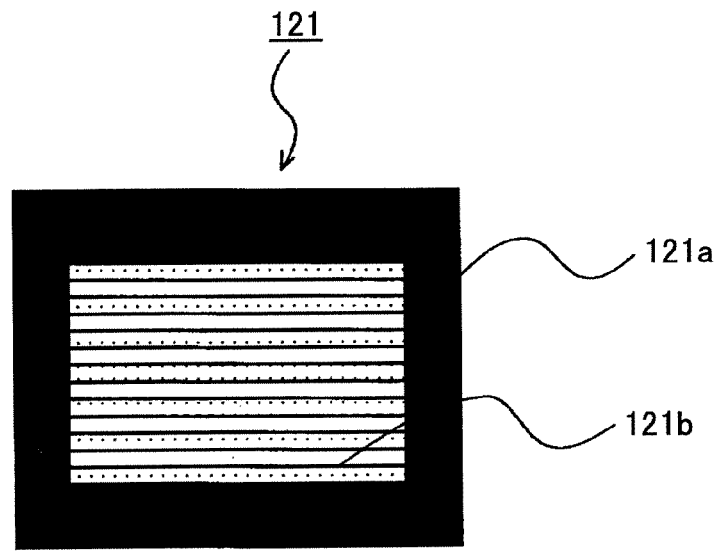
FIG. 4 is a drawing illustrating an example of a beam limiting/splitting element 121 seen from the light beam incident side.

FIG. 4 is a drawing illustrating the beam limiting/splitting element 121 seen from the light beam incident side. As shown in FIG. 4, the beam-limiting part 121a having a light-shielding property is positioned around the beam-splitting part 121b and controls the amount of an entering light beam. The beam-splitting part 121b has a periodic structure having a diffraction property where ridges and grooves are arranged alternately at a certain pitch. A large portion of a light beam incident on the beam-splitting part 121b is transmitted by the beam limiting/splitting element 121 as zero-order transmitted light and a small portion of the light beam is returned as reflected light. The reflected light or the portion of the light beam is guided to a photodetector for detecting light intensity. In this embodiment, the beam-splitting part 121b is implemented as a phase-type diffractive-optical element.

As described above, in the exemplary optical scanning device according to the first embodiment, a diffractive-optical element is used to split a light beam instead of an optical element made of an optical multilayer film such as a polarization beam splitter or a half mirror. Therefore, according to the first embodiment, it is possible to provide a beam limiting/splitting element with high environmental stability.

Figure 5:
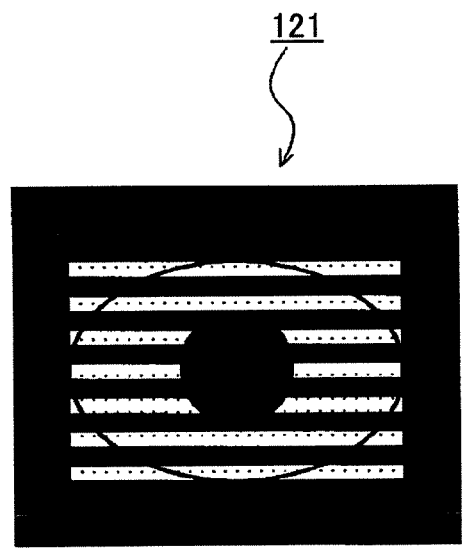
FIG. 5 is another drawing illustrating the beam limiting/splitting element 121 seen from the light beam incident side.

Although a glass plate is used for the beam limiting/splitting element 121 of the first embodiment, any other material, for example, a resin, may be used. Also, although the beam-limiting part 121a in this embodiment has a rectangular shape, it may be formed in any shape including an oval shape and a circular shape. Further, the shape of the beam-limiting part 121a is not limited to a shape formed by a closed curve, but may be a shape formed by combining multiple shapes as shown in FIG. 5.

As described above, in the exemplary optical scanning apparatus, the beam-limiting part 121a limits the amount of a light beam and the beam-splitting part 121b separates and directs a portion of the light beam to the photodetector 20 for light intensity control.

Figure 6:
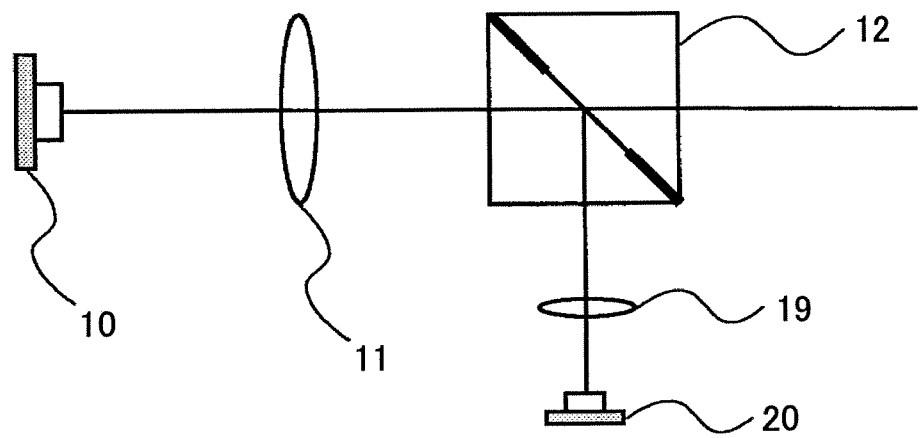
FIG. 6 is a drawing illustrating another exemplary configuration of an optical scanning device according to the first embodiment.
Figure 7:
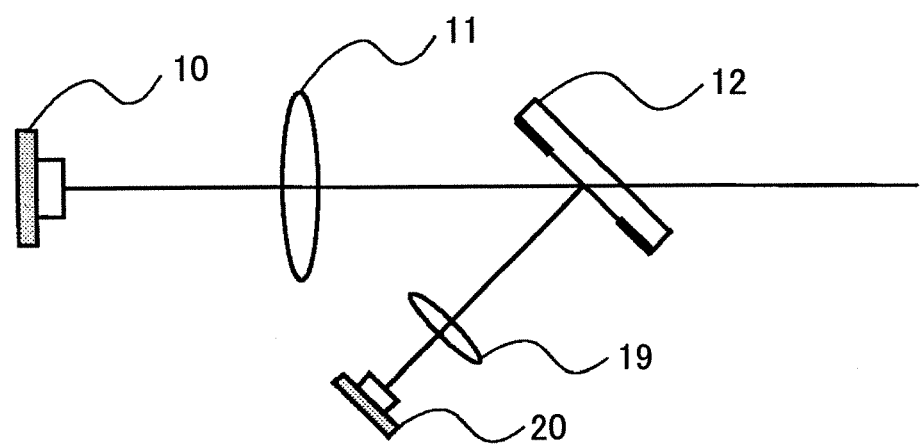
FIG. 7 is a drawing illustrating still another exemplary configuration of an optical scanning device according to the first embodiment.

Although a diffractive-optical element is used as a beam-splitting mechanism in the first embodiment, a cubic polarization beam splitter or a half mirror as in a conventional optical scanning device may also be used as shown in FIGS. 6 and 7. Further, in addition to the beam-splitting mechanism as described above, an aperture may be provided as a beam-limiting mechanism.

Another example of the beam limiting/splitting unit 12 is described below with reference to FIG. 8.

In FIG. 3, both the beam-limiting part 121a and the beam-splitting part 121b are formed on the light-incident side of the beam limiting/splitting element 121. In FIG. 8, the beam-limiting part 121a and the beam-splitting part 121b are formed separately on the light-incident side and the light-exit side of the beam limiting/splitting element 121.

Figure 8:
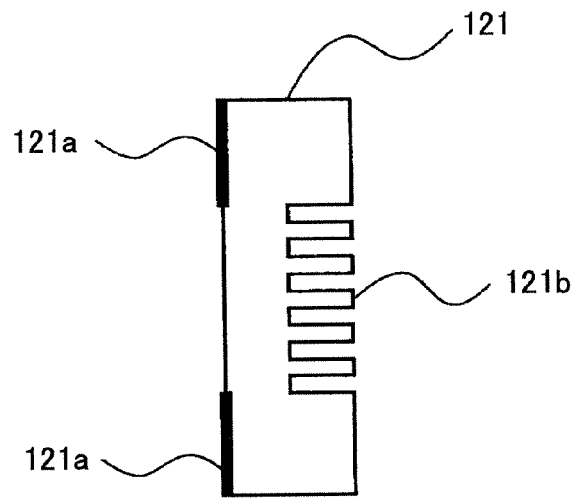
FIG. 8 is a drawing illustrating another example of the beam limiting/splitting element 121.

As shown in FIG. 8, the beam-limiting part 121a is formed on the light-incident side and the beam-splitting part 121b is formed on the light-exit side. The beam-limiting part 121a and the beam-splitting part 121b function in substantially the same manner as those shown in FIG. 3. With the beam limiting/splitting element 121 having a structure as shown in FIG. 8, a portion of a light beam reflected by the beam-splitting part 121b may be absorbed by the beam-limiting part 121a depending on the incidence angle of the light beam. However, the amount of the reflected light beam to be absorbed can be controlled by the structure of the beam limiting/splitting element 121 and therefore does not cause a problem.

Figure 9:
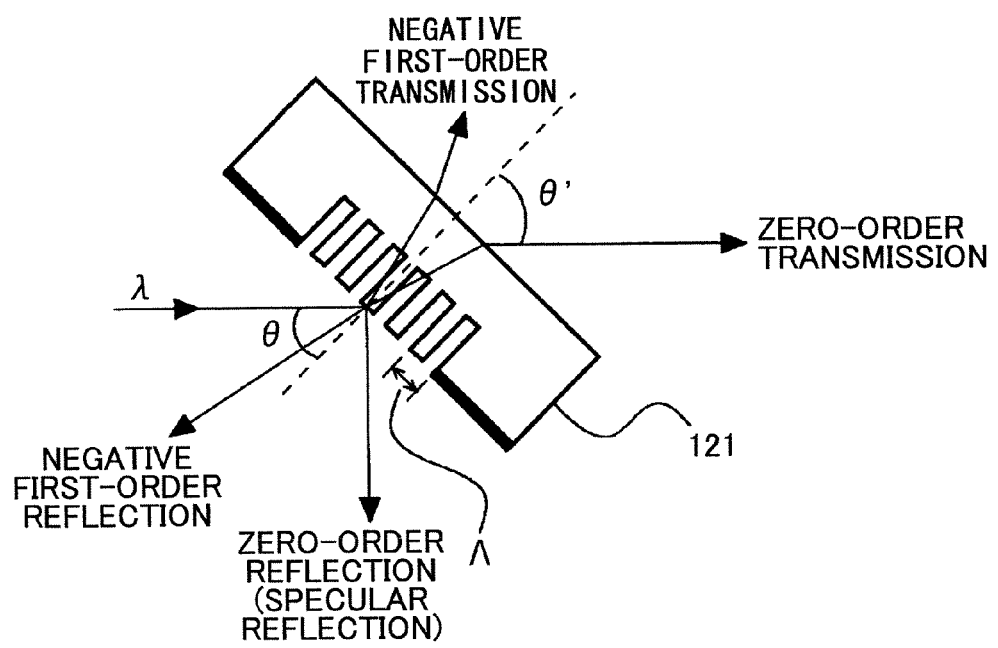
FIG. 9 is a drawing illustrating transmission and reflection of a light beam by a beam-splitting part 121b.

The beam-splitting part 121b is described below in detail with reference to FIG. 9.

As described above, the beam-splitting part 121b according to the first embodiment is implemented as a diffractive-optical element having a periodic structure where ridges and grooves are arranged alternately at a certain pitch. As shown in FIG. 9, a light beam incident on the beam-splitting part 121b at an angle θ is diffracted into zero-order transmitted light, zero-order reflected light, high-order transmitted light, and high-order reflected light. While zero-order transmission and reflection occur even with a structure other than the periodic structure, high-order transmission and reflection are caused by the periodic structure.

The diffraction order of high-order diffracted light can be obtained by the grating equation shown below. When the wavelength of a light beam is λ, the pitch of the periodic structure is Λ, the incidence angle of the light beam on the beam limiting/splitting element is θ, and the diffraction order is m, the exit angle θ' is expressed by the following formula (1):

$$\sin\theta + m\lambda/\Lambda = \sin\theta' \quad (1)$$

It is possible to select the diffraction order by using the above formula (1). In FIG. 9, the diffraction order of the high-order diffracted light is −1.

Of the transmitted diffracted light and the reflected diffracted light described above, the reflected diffracted light is preferably used for light intensity control because of the reason described below.

Both a light source and a photodetector require a driving circuit and are preferably positioned close to each other. Therefore, a photodetector is preferably positioned so as to face the light-incident side of a beam limiting/splitting element. When such an arrangement is taken into account, it is convenient to use reflected light. Using transmitted light may make it necessary to deflect the transmitted light by using, for example, a loopback mirror.

In the exemplary optical scanning device according to the first embodiment, reflected light is used for light intensity control. Since reflected light can be guided to the light source side without using a deflector such as a loopback mirror, a photodetector can be positioned close to a light source.

Also, it is preferable to use high-order diffracted light as the reflected light. Although it is possible to use specularly-reflected light that is zero-order diffracted light, the diffraction angle of zero-order diffracted light is not changeable. On the other hand, the diffraction angle of high-order diffracted light can be adjusted by changing the pitch Λ of the periodic structure. For this reason, using high-order diffracted light enables more flexible positioning of a photodetector.

In other words, using high-order diffracted light makes it possible to change the diffraction angle of reflected light by changing the pitch Λ of the periodic structure depending on the layout of an optical scanning device.

An exemplary configuration of the beam-splitting part 121b according to the first embodiment is described below with reference to FIG. 10. In the descriptions below, it is assumed that the wavelength of incident light is λ, the pitch of the periodic structure is Λ, the ratio (fill factor) of the width of each ridge to the pitch Λ is f, the depth of the periodic structure is D, the refractive index of the material used for the periodic structure is N, and the incidence angle is θ.

Figure 10:
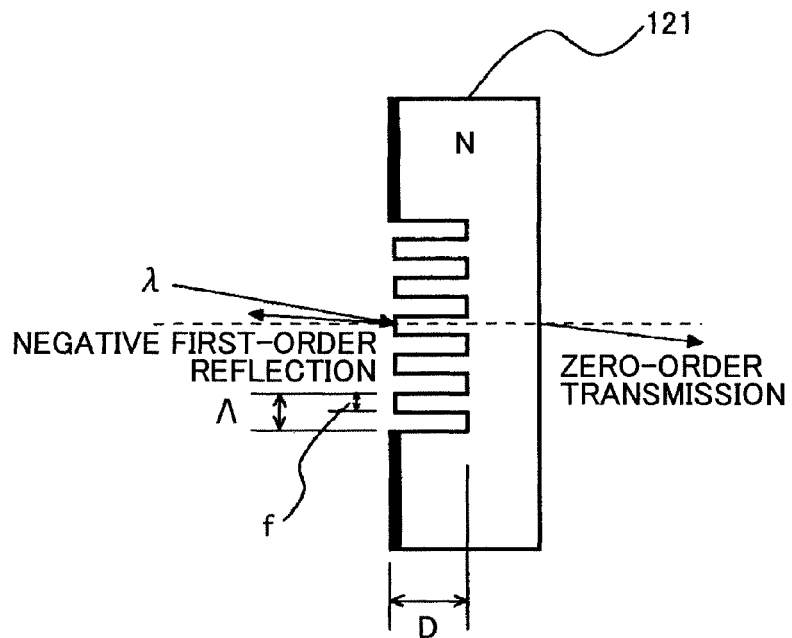
FIG. 10 is a drawing illustrating an exemplary configuration of the beam-splitting part 121b.

The above parameters for the beam-splitting part 121b shown in FIG. 10 are λ=1 μm, Λ=5 μm, f=0.5, D=0.18 μm, N=1.456, and θ=6 degrees.

In this case, the beam-splitting part 121b shows the following diffraction efficiency: zero-order transmission efficiency of 91.2% and negative first-order reflection efficiency of 1.4%. Accordingly, a large portion of an incident light beam is transmitted and a small portion of the light beam is reflected as negative first-order diffracted light. With the beam-splitting part 121b shown in FIG. 10, the reflection diffraction angle of the negative first-order diffracted light becomes −5.5 degrees. Therefore, the path of the reflected light becomes close to the path of the incident light beam. The reflected light is guided to a photodetector. Also, the first embodiment makes it possible to change the reflection diffraction angle depending on the position of the photodetector by changing the pitch Λ.

In the above example, the incidence angle is close to the Bragg angle ($\theta = \sin^{-1}(\lambda/2\Lambda)$).

An example of a beam-splitting part 121b having polarization dependence is described below with reference to corresponding figures.

Figure 11:
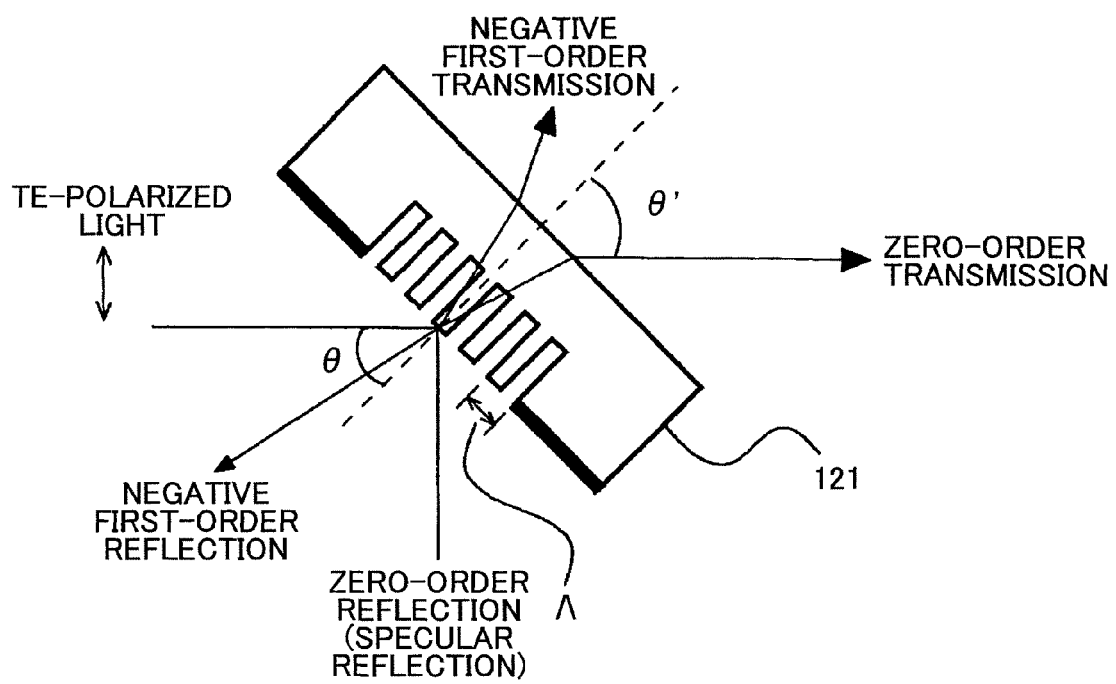
FIG. 11 is a drawing illustrating an example of a beam-splitting part 121b having polarization dependence.

FIG. 11 is a drawing illustrating the beam-splitting part 121b having polarization dependence. When the beam-splitting part 121b has polarization dependence, the beam limiting/splitting unit 12 may also be used as a polarization control mechanism.

As shown in FIG. 2, a surface emitting laser normally has a symmetrical structure. Therefore, a laser beam emitted from a surface emitting laser may be randomly polarized. Although surface emitting lasers having a polarization control mechanism have been developed in recent years, they still have many disadvantages. Therefore, in practice, it is preferable to provide a polarization control mechanism separately from a surface emitting laser. In other words, it is useful to give polarization dependence to a beam-splitting part of a beam limiting/splitting unit.

The beam limiting/splitting element 121 shown in FIG. 11 has high zero-order transmission diffraction efficiency and low negative first-order reflection diffraction efficiency for TE-polarized light having a polarization direction perpendicular to the printed page (projection plane of FIG. 11). On the other hand, the beam limiting/splitting element 121 has low zero-order transmission diffraction efficiency for TM-polarized light having a polarization direction that is orthogonal to that of TE-polarized light (longitudinal direction on the printed page).

As shown in FIG. 11, a large portion of the TE-polarized component of an incident light beam is transmitted as zero-order diffracted light but the TM-polarized component is almost not transmitted. With this property of the beam-splitting part 121b, the beam limiting/splitting unit 12 functions as a polarization control mechanism. To give polarization dependence to the beam-splitting part 121b, a birefringent material such as calcite having optical anisotropy or a liquid crystal may also be used.

As described above, an optical scanning device according to the first embodiment may include a polarization control mechanism. A polarization control mechanism reduces the influence of polarization dependence in transmittance and reflectance of optical elements in an optical scanning device and may also be used for polarization control of a surface emitting laser.

Also, birefringence may be produced without using a birefringent material such as calcite. To produce a type of birefringence called form birefringence, a diffractive-optical element is formed to have a periodic structure where ridges and grooves are arranged alternately at a pitch within a subwavelength range or a resonance range that is smaller than, equal to, or several times greater than the wavelength of light. In other words, a beam-splitting part having a very fine periodic structure may be used as a polarization-dependent diffractive-optical element, and a beam limiting/splitting unit including such a beam-splitting part may be used as a polarization control mechanism.

As described above, according to an embodiment of the present invention, a periodic structure with form birefringence is used to provide a polarization-dependent diffractive-optical element. This makes it possible to use an inexpensive optical material instead of an expensive birefringent material.

Figure 12B:
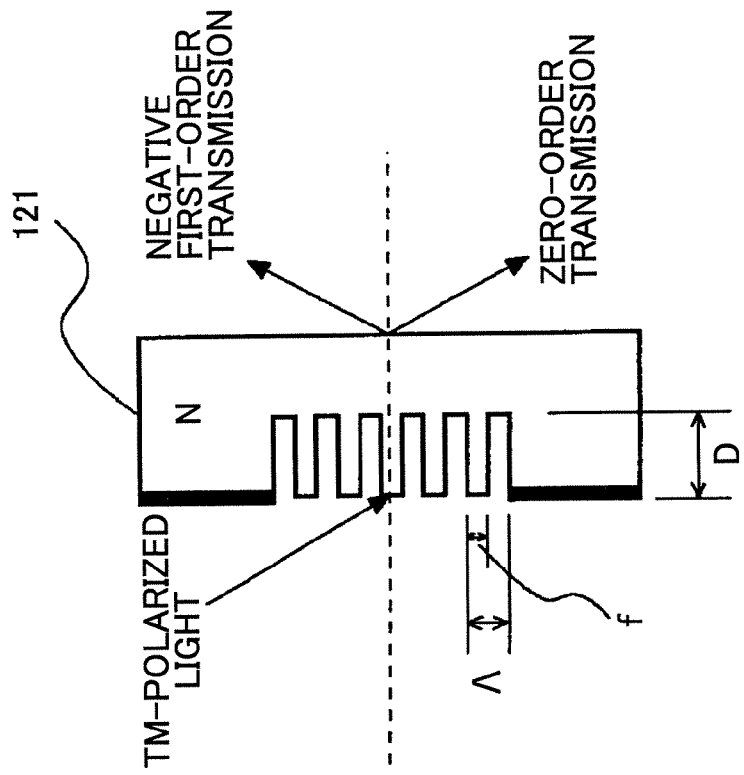
FIGS. 12A and 12B are drawings illustrating transmission and reflection of a light beam by the beam-splitting part 121b having polarization dependence.
Figure 12A:
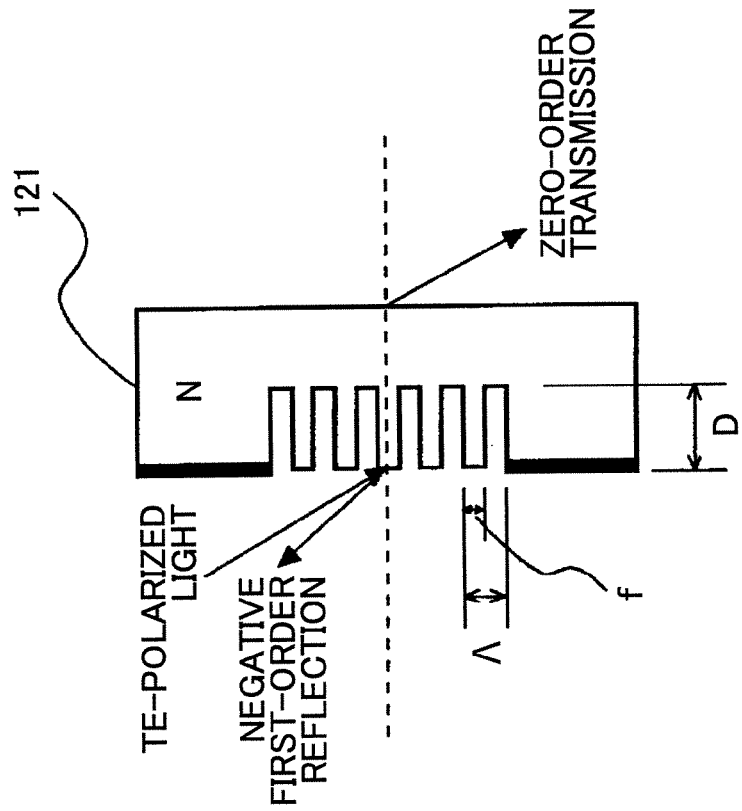

An exemplary configuration of the beam-splitting part 121b according to the first embodiment is described below in more detail with reference to FIGS. 12A and 12B.

The configuration of the beam-splitting part 121b shown in FIG. 12 is as follows: $\lambda=0.633$ μm, $\Lambda=0.35$ μm, f=0.5, D=0.6 μm, N=1.456, and $\theta=65$ degrees.

In this case, the diffraction efficiency of the beam-splitting part 121b is polarization-dependent. For TE-polarized light, the zero-order transmission efficiency is 91.3% and the negative first-order reflection efficiency is 6.1%. For TM-polarized light, the zero-order transmission efficiency is 7.3% and the negative first-order transmission efficiency is 74.9%. In other words, a large portion of TE-polarized light is transmitted as zero-order diffracted light and a small portion of the TE-polarized light is reflected as negative first-order diffracted light. The negative first-order diffracted light has a reflection diffraction angle of −64.4 degrees and is guided to a photodetector.

On the other hand, a large portion of TM-polarized light is transmitted as negative first-order diffracted light and only 10% or less of the TM-polarized light is transmitted as zero-order diffracted light. Therefore, 90% or more of the TM-polarized component of an incident light beam can be cut off by the beam-splitting part 121b having polarization dependence. In other words, the beam-splitting part 121b functions as a polarization control mechanism.

In the configuration described above, a portion of a light beam which portion is reflected and used to detect the intensity of the light beam has the same polarization direction as that of the zero-order transmitted light.

In the exemplary optical scanning device according to the first embodiment, a light beam is polarization-controlled and split into light beams, and two light beams having the same polarization direction are used for scanning and light intensity control. The light intensity ratio between the two light beams can be controlled by changing the configuration of the beam-splitting part 121b. Also, in the exemplary optical scanning device according to the first embodiment, reflected light is used for light intensity control. Since reflected light can be guided to the light source side without using a deflector such as a loopback mirror, a photodetector can be positioned close to a light source.

The beam-splitting part 121b may also be configured to transmit a large portion of first polarized light in the zero-order direction and to reflect a small portion of second polarized light having a polarization direction orthogonal to that of the first polarized light in the negative first-order direction.

Another exemplary configuration of the beam-splitting part 121b is described below with reference to corresponding figures.

Figure 13A:
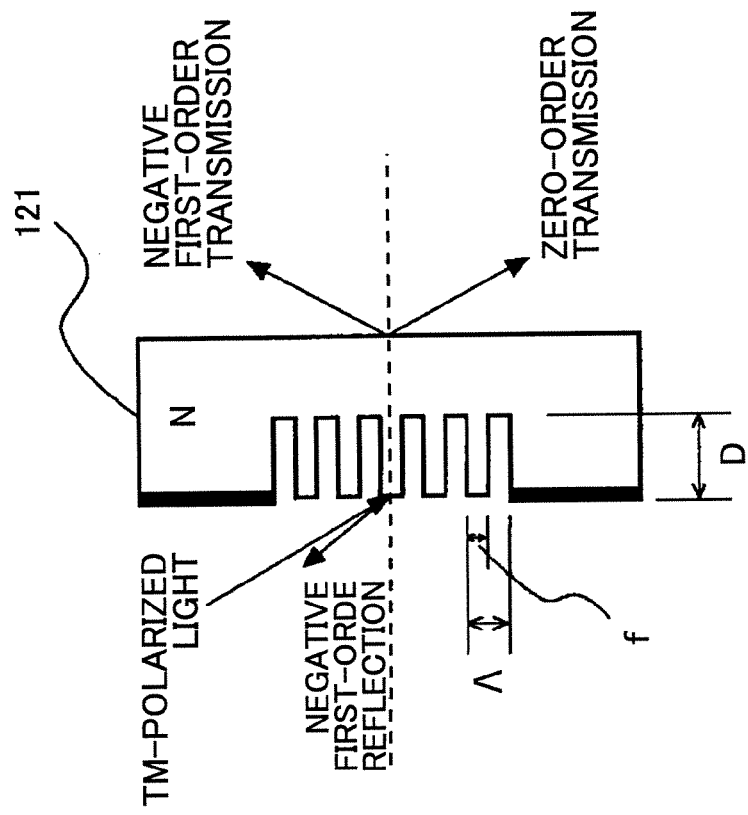
FIGS. 13A and 13B are drawings illustrating another exemplary configuration of the beam-splitting part 121b.
Figure 13B:
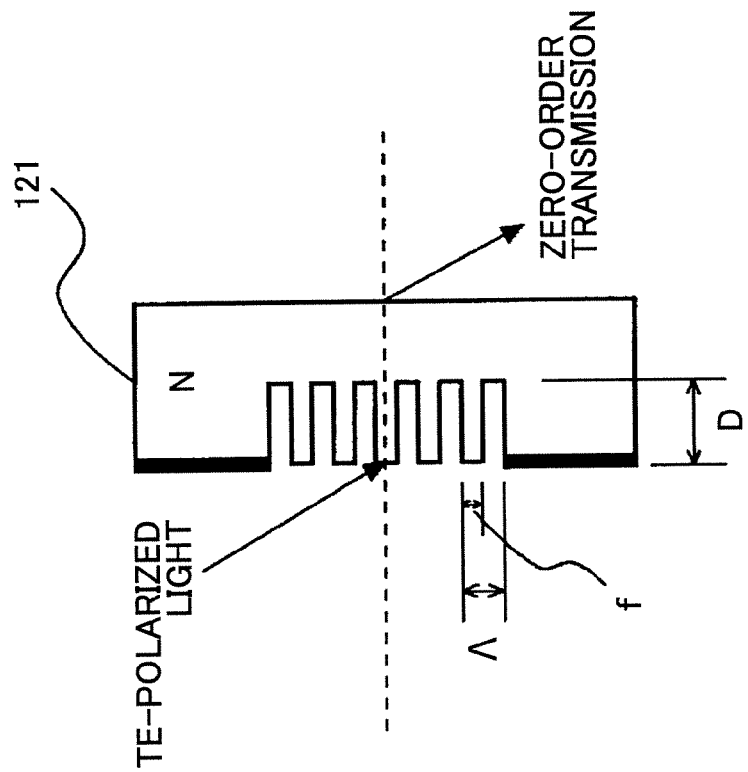

FIGS. 13A and 13B are drawings illustrating another exemplary configuration of the beam-splitting part 121b.

The configuration of the beam-splitting part 121b shown in FIG. 13 is as follows: $\lambda=0.633$ μm, $\Lambda=0.35$ μm, f=0.5, D=0.75 μm, N=1.456, and $\theta=65$ degrees.

In this case, the diffraction efficiency of the beam-splitting part 121b is polarization-dependent. For TE-polarized light, the zero-order transmission efficiency is 97.3%. For TM-polarized light, the zero-order transmission efficiency is 0.3%, the negative first-order transmission efficiency is 91.6%, and the negative first-order reflection efficiency is 5.7%. In other words, a large portion of TE-polarized light is transmitted as zero-order diffracted light.

On the other hand, a large portion of TM-polarized light is transmitted as negative first-order diffracted light and only 1% or less of the TM-polarized light is transmitted as zero-order diffracted light. Therefore, 99% or more of the TM-polarized component of an incident light beam can be cut off by the beam-splitting part 121b having polarization dependence. In other words, the beam-splitting part 121b functions as a polarization control mechanism. Also, 5.7% of the TM-polarized light is reflected as negative first-order diffracted light. The negative first-order diffracted light has a reflection diffraction angle of −64.4 degrees and is guided to a photo-detector.

The above embodiment is applicable when an incident light beam contains TE-polarized light and TM-polarized light in certain proportions. In the above embodiment, a portion of a light beam which portion is reflected and used to detect the intensity of the light beam has a polarization direction that is orthogonal to that of the zero-order transmitted light.

As described above, the exemplary optical scanning device may be configured to use light beams having different polarization directions for scanning and light intensity control. This makes it possible to efficiently use polarization components contained in a light beam. Also, in the exemplary optical scanning device according to the first embodiment, reflected light is used for light intensity control. Since reflected light can be guided to the light source side without using a deflector such as a loopback mirror, a photodetector can be positioned close to a light source.

Although it is possible to use transmitted diffracted light for light intensity control, using reflected light is preferred because of the advantage as described above.

Although negative first-order diffracted light is used for light intensity control in the above embodiment, light with a different diffraction order may be used. For example, the beam-splitting part 121b may be configured to show the same diffraction angle $\theta'$ when m is −2 and Λ is doubled in formula (1). However, increasing the value of m increases the number of diffraction orders and therefore may reduce the zero-order transmission efficiency and the negative first-order transmission efficiency. For this reason, using negative first-order diffracted light provides higher diffraction efficiency than that obtained when higher-order diffracted light is used.

Figure 14:
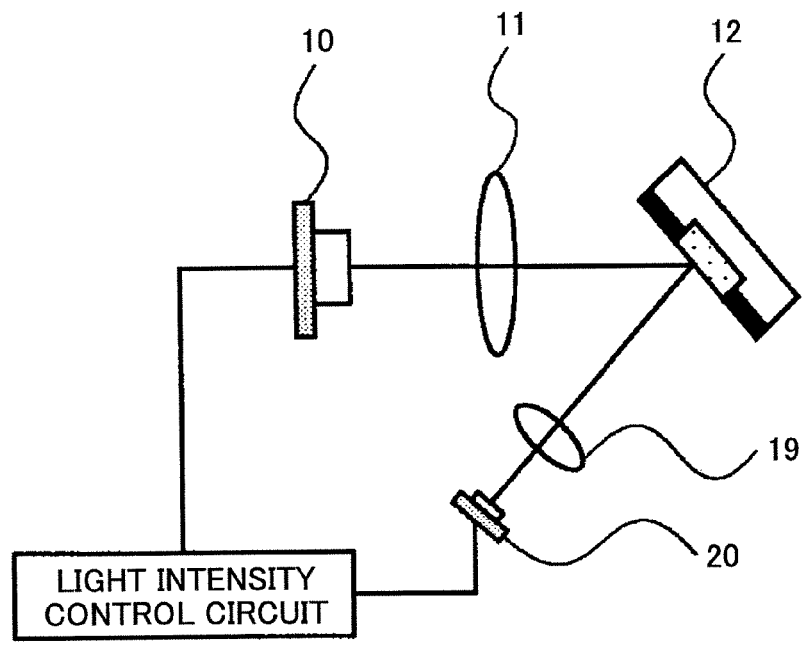
FIG. 14 is a drawing illustrating an exemplary light detection mechanism using reflected light in an optical scanning device according to the first embodiment.
Figure 15:
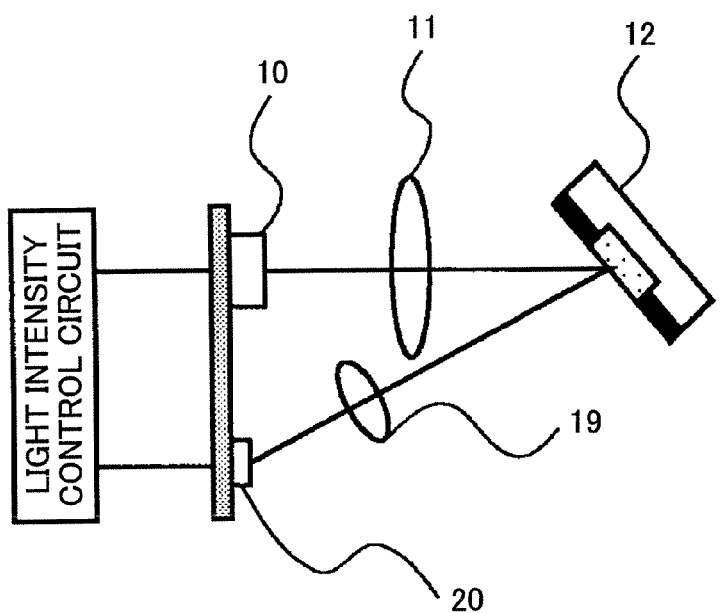
FIG. 15 is a drawing illustrating another exemplary light detection mechanism using reflected light in an optical scanning device according to the first embodiment.
Figure 16:
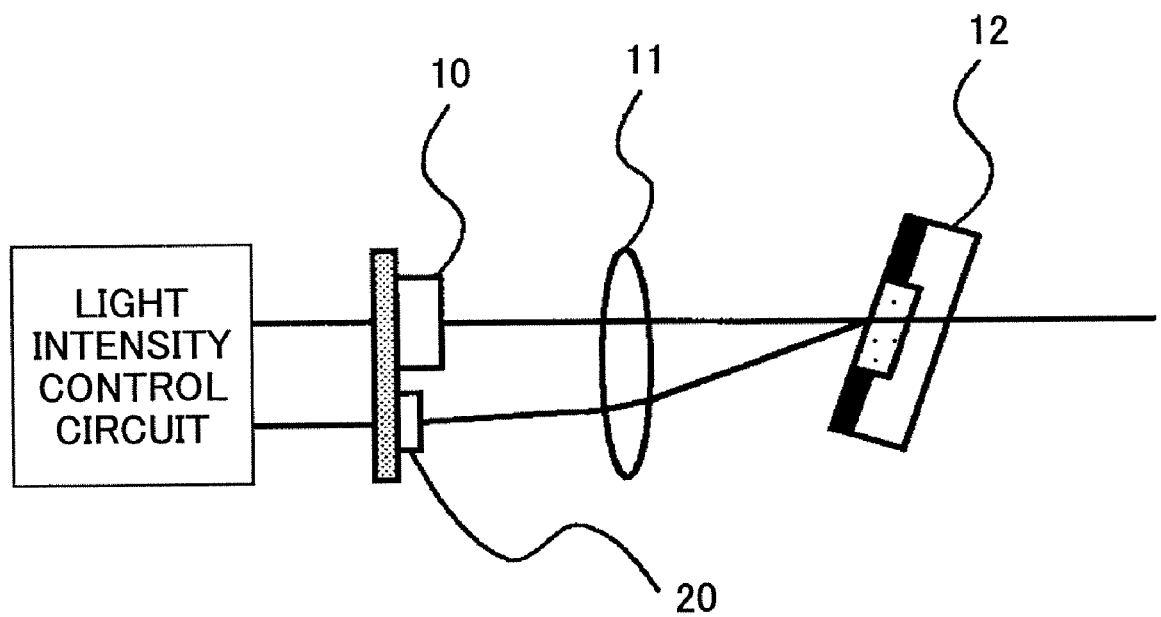
FIG. 16 is a drawing illustrating still another exemplary light detection mechanism using reflected light in an optical scanning device according to the first embodiment.

FIGS. 14 through 16 are drawings illustrating exemplary light detection mechanisms using reflected light in the exemplary optical scanning device according to the first embodiment.

In an exemplary light detection mechanism shown in FIG. 14, a portion of a light beam is separated by the beam limiting/splitting unit 12 and guided via the optical unit 19 to the photodetector 20. The photodetector 20 measures the intensity of the portion of the light beam and, based on the result of measurement, a light intensity control circuit causes the VCSEL 10 to emit a light beam with a desired intensity.

In another exemplary light detection mechanism shown in FIG. 15, the VCSEL 10 and the photodetector 20 are mounted on the same substrate. Since the separated portion of the light beam is directed toward the light source, there is no need to provide a deflector such as a loopback mirror even when the VCSEL 10 and the photodetector 20 are mounted on the same substrate. Accordingly, such a configuration contributes to reducing production costs.

More specifically, integrating a light source and a photodetector makes it possible to combine functions, to reduce the size of an optical scanning device, and thereby to reduce production costs.

Still another exemplary light detection mechanism shown in FIG. 16 is configured so that the separated portion of the light beam is guided via the coupling lens 11 to the photodetector 20 that is mounted on the same substrate as the VCSEL 10. This configuration makes it possible to mount the VCSEL 10 and the photodetector 20 on the same substrate, to eliminate the optical unit 19, and thereby to reduce production costs.

In other words, the above configuration makes it possible to eliminate an optical unit for guiding the separated portion of the light beam to a photodetector and thereby to reduce production costs.

As described above, the VCSEL 10 does not emit light backward. Therefore, it is preferable to perform light intensity control on the VCSEL 10 as described in the first embodiment. Also, a light intensity control mechanism according to the first embodiment may be used not only for a VCSEL but also for a conventional edge emitting laser. In other words, a light intensity control mechanism according to the first embodiment makes it possible to perform auto power control (APC) on a surface emitting laser.

A photodetector used in the first embodiment may include one or more light-detecting areas. A photodetector may be configured to have multiple light-detecting areas corresponding to multiple light sources and thereby to measure the intensities of light beams emitted from the multiple light sources separately. Also, a photodetector may be configured to measure the intensities of multiple light beams using one light-detecting area by time-sharing. Further, a photodetector may be configured to measure the intensities of multiple light beams collectively or to use an appropriate light intensity measuring method for each light beam depending on the characteristics and stability of the corresponding light source. In this embodiment, descriptions of light intensity measuring methods are omitted.

Second Embodiment

An exemplary optical scanning device according to a second embodiment is described below. In the exemplary optical scanning device, a beam-limiting unit and a beam-splitting unit are provided separately.

Figure 17:
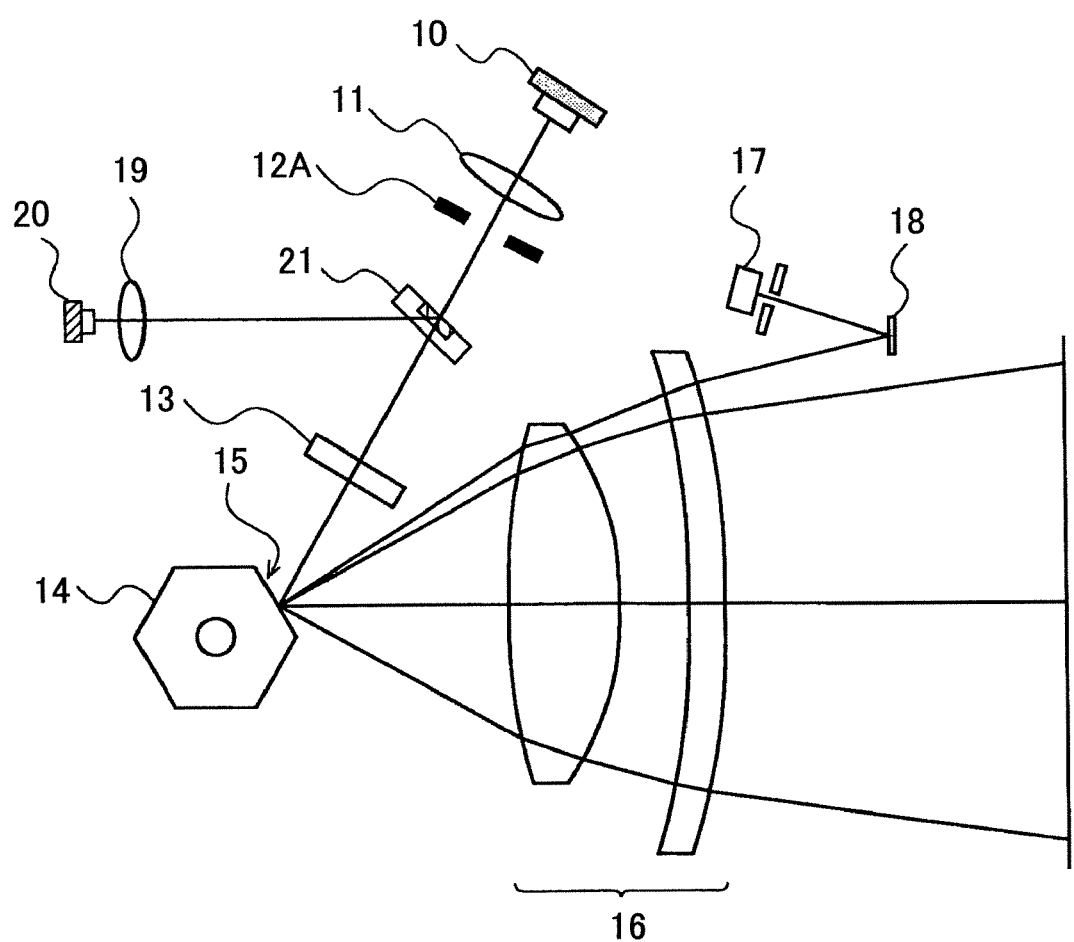
FIG. 17 is a drawing illustrating an exemplary configuration of an optical scanning device according to a second embodiment of the present invention.

FIG. 17 is a drawing illustrating an exemplary configuration of the exemplary optical scanning device according to the second embodiment of the present invention.

In the exemplary optical scanning device of the second embodiment, the beam limiting/splitting unit 12 in the exemplary optical scanning device of the first embodiment is divided into a beam-limiting unit 12A and a beam-splitting unit 21.

As shown in FIG. 17, the exemplary optical scanning device according to the second embodiment includes a VCSEL 10, a coupling lens 11, the beam-limiting unit 12A, a cylindrical lens 13, a polygon scanner 14 having deflecting reflective surfaces 15, fθ lenses 16, a synchronizing sensor 17, a reflection mirror 18, an optical unit 19, a photodetector 20, and the beam-splitting unit 21.

The VCSEL (vertical cavity surface emitting laser) 10 is a light source. Either a single-VCSEL having one light-emitting point or a multi-beam VCSEL having multiple light-emitting points may be used as the VCSEL 10. A divergent light beam emitted from the VCSEL 10 enters a coupling unit for converting the divergent light beam into a light beam with a desired convergence or divergence angle.

In the coupling unit, the light beam is substantially collimated by the coupling lens 11 and then enters a first optical unit via the beam-limiting unit 12A. The first optical unit is made of the cylindrical lens 13 and focuses the light beam to form a line image that is long in the main-scanning direction near the deflecting reflective surfaces (polygon mirror surfaces) 15 of the polygon scanner 14.

The light beam is deflected by the polygon scanner 14 and is then focused by a second optical unit to form a light spot on a target surface. In the second embodiment, two fθ lenses 16 are used as the second optical unit. The synchronizing sensor 17 for controlling scan timing and a third optical unit for guiding the light beam to the synchronizing sensor 17 are positioned outside of the effective image area. In the second embodiment, the reflection mirror 18 is used as the third optical unit.

The beam-splitting unit 21 for separating a portion of the light beam is provided between the coupling lens 11 and the polygon scanner 14. The portion of the light beam separated by the beam-splitting unit 21 is guided via the optical unit 19 or directly to the photodetector 20. Then, the photodetector 20 detects the intensity of the portion of the light beam.

Since a light beam emitted from the VCSEL 10 is highly divergent, the beam-splitting unit 21 is positioned closer to the polygon scanner 14 than the coupling lens 11 that substantially collimates the divergent light beam, in other words, converts the divergent light beam into a light beam with low convergence or divergence.

Such a configuration as described above makes it easier to install a beam-splitting unit.

Also, the beam-splitting unit 21 may be positioned closer to the polygon scanner 14 than the beam-limiting unit 12. With a configuration as described above, even if the divergence angle of a light beam changes, the amount of the light beam shielded by the beam-limiting unit 12A does not change. Therefore, such a configuration makes it possible to reduce the influence of changes in the divergence angle of a light beam caused by changes in the driving current. In other words, such a configuration makes it possible to control the intensity of a light beam from a light source without being affected by changes in the divergence angle of the light beam which are caused by changes in the driving current.

As in the first embodiment, the VCSEL 10 does not emit light backward. Therefore, auto power control (APC) is performed on the VCSEL 10 using a portion of a light beam emitted forward. In the second embodiment, the beam splitting unit 21 is used to direct a portion of a light beam to the photodetector 20.

The beam-limiting unit 12 is an aperture and may be formed in any shape such as an oval shape or a circular shape.

Figure 18:
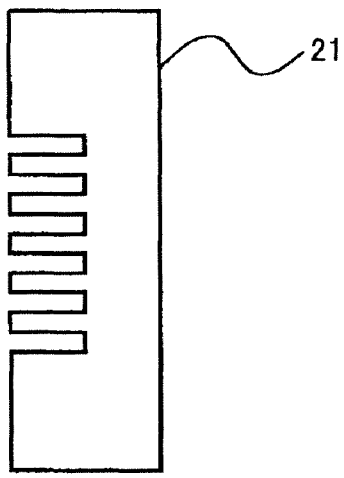
FIG. 18 is a drawing illustrating an exemplary structure of a beam-splitting unit 21.

The beam splitting unit 21 is described below in detail. FIG. 18 is a drawing illustrating an exemplary structure of the beam-splitting unit 21.

The beam-splitting unit 21 is made of a glass plate and has a periodic structure having a diffraction property where ridges and grooves are arranged alternately at a certain pitch. A large portion of a light beam incident on the periodic structure passes through the beam-splitting unit 21 as zero-order transmitted light and a small portion of the light beam is diffracted as transmitted diffracted light at a certain angle with respect to the zero-order transmitted light. The transmitted diffracted light or the small portion of the light beam is guided to a photodetector for detecting light intensity. In this embodiment, the beam-splitting unit 21 is implemented as a phase-type diffractive-optical element.

As described above, in the exemplary optical scanning device according to the second embodiment, a diffractive-optical element that produces transmitted diffracted light is used to split a light beam instead of an optical element made of an optical multilayer film such as a beam splitter or a half mirror. Therefore, according to the second embodiment, it is possible to provide a beam-splitting unit with a high environmental stability.

Although a glass plate is used for the beam-splitting unit 21 of the second embodiment, any other material, for example, a resin, may be used.

Figure 19:
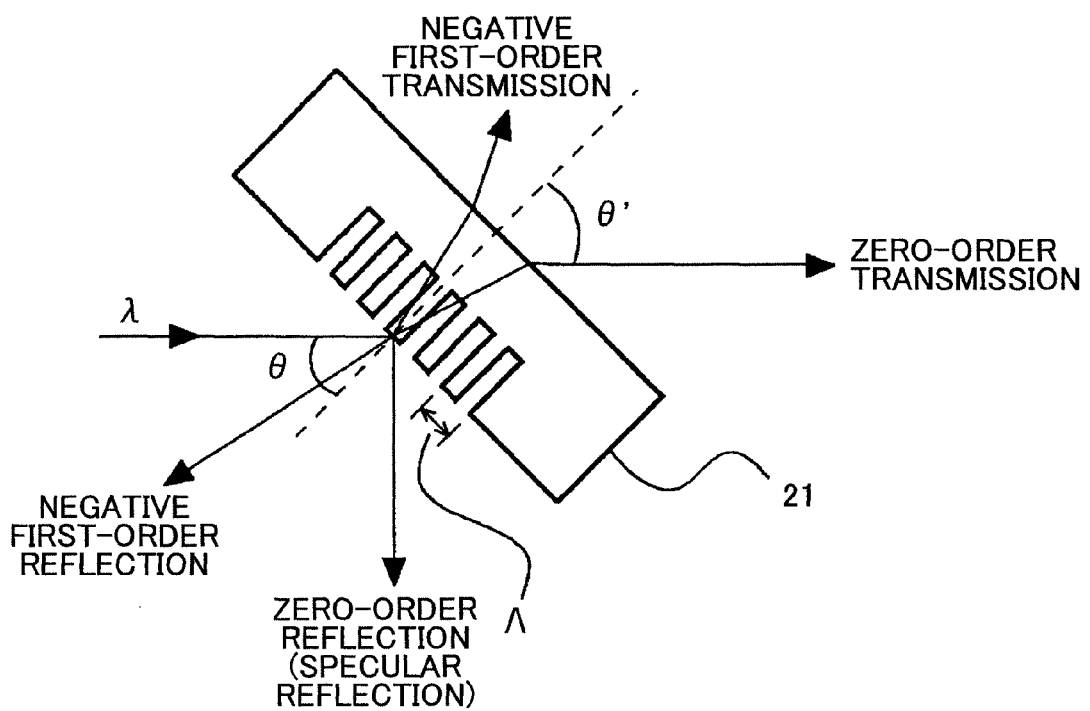
FIG. 19 is a drawing illustrating transmission and reflection of a light beam by an exemplary diffractive-optical element according to the second embodiment.

FIG. 19 is a drawing illustrating transmission and reflection of a light beam by the beam-splitting unit 21.

As shown in FIG. 19, a light beam incident on the periodic structure of the beam-splitting unit 21 at an angle θ is diffracted into zero-order transmitted light, zero-order reflected light, high-order transmitted light, and high-order reflected light. While zero-order transmission and reflection occur even with a structure other than the periodic structure, high-order transmission and reflection are caused by the periodic structure.

The diffraction order of diffracted light can be obtained by the grating equation shown below. When the wavelength of a light beam is λ, the pitch of the periodic structure is Λ, the incidence angle of the light beam on the periodic structure is θ, and the diffraction order is m, the exit angle θ' is expressed by the formula (1) described above.

It is possible to select the diffraction order of diffracted light by using the formula (1). In FIG. 19, the diffraction order of the diffracted light is −1.

Of the zero-order transmitted light, zero-order reflected light, high-order transmitted light, and high-order reflected light described above, the high-order transmitted light is used for light intensity control according to the second embodiment because of the reason described below.

The exit angle of high-order transmitted light is less influenced by a mounting angle error of a diffractive-optical element than that of zero-order reflected light (specularly-reflected light).

Figure 20B:
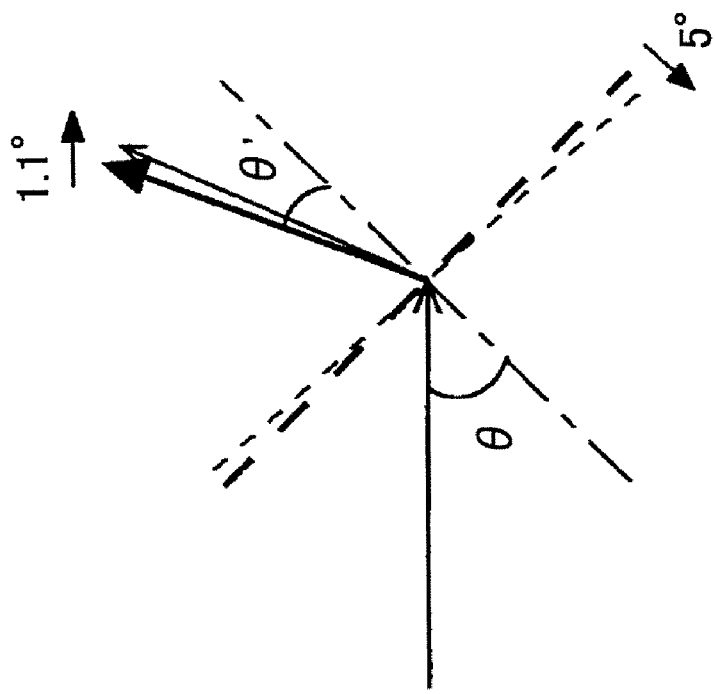
FIG. 20B is a drawing illustrating negative first-order transmission diffraction of a light beam by the exemplary diffractive-optical element according to the second embodiment.
Figure 20A:
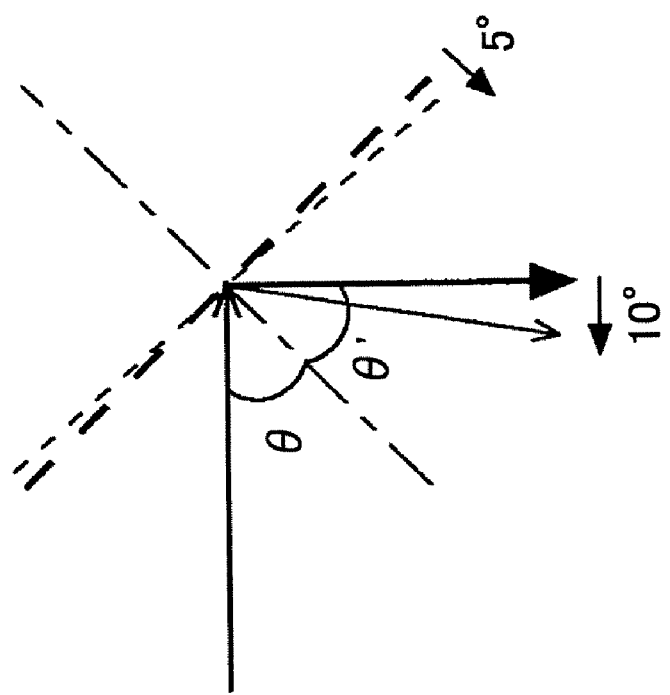
FIG. 20A is a drawing illustrating zero-order reflection of a light beam by the exemplary diffractive-optical element according to the second embodiment.

FIGS. 20A and 20B show exemplary exit angles θ' of zero-order reflected light (specularly-reflected light) and high-order transmitted light when the incidence angle θ of a light beam falling on the beam-splitting unit 21 is 45 degrees, λ=Λ, and m=−1.

As shown in FIG. 20A, the reflection angle θ' of the zero-order reflected light (specularly-reflected light) is −45 degrees. In this case, when the beam-splitting unit 21 is rotated 5 degrees clockwise, the incidence angle θ becomes 40 degrees and the reflection angle θ' becomes −40 degrees. In other words, the angle (θ−θ') between the incident light and the zero-order reflected light changes 10 degrees (from 90 to 80 degrees) when the beam-splitting unit 21 is rotated 5 degrees.

On the other hand, as shown in FIG. 20B, the transmission diffraction angle θ' of the negative first-order transmitted light is −17.03 degrees. In this case, when the beam-splitting unit 21 is rotated 5 degrees clockwise, the incidence angle θ becomes 40 degrees and the transmission diffraction angle θ' becomes −20.93 degrees. In other words, the angle (180−(θ−θ')) between the incident light and the negative first-order transmitted light changes 1.1 degrees (from 117.97 to 119.07 degrees) when the beam-splitting unit 21 is rotated 5 degrees. The above examples show that the change in the exit angle of the negative first-order transmitted light caused by the mounting angle error of the beam-splitting unit 21 is one ninth of that of the zero-order reflected light.

As described above, in the exemplary optical scanning device according to the second embodiment, high-order transmitted light is used for light intensity control to reduce the influence of changes in the exit angle of light caused by a mounting angle error of a diffractive-optical element and thereby to make it easier to install a diffractive-optical element.

An exemplary configuration of the beam-splitting unit 21 according to the second embodiment is described below with reference to FIG. 21. In the descriptions below, it is assumed that the wavelength of incident light is $\lambda$, the pitch of the periodic structure is $\Lambda$, the ratio (fill factor) of the width of each ridge to the pitch $\Lambda$ is f, the depth of the periodic structure is D, the refractive index of the material used for the periodic structure is N. and the incidence angle is $\theta$.

Figure 21:
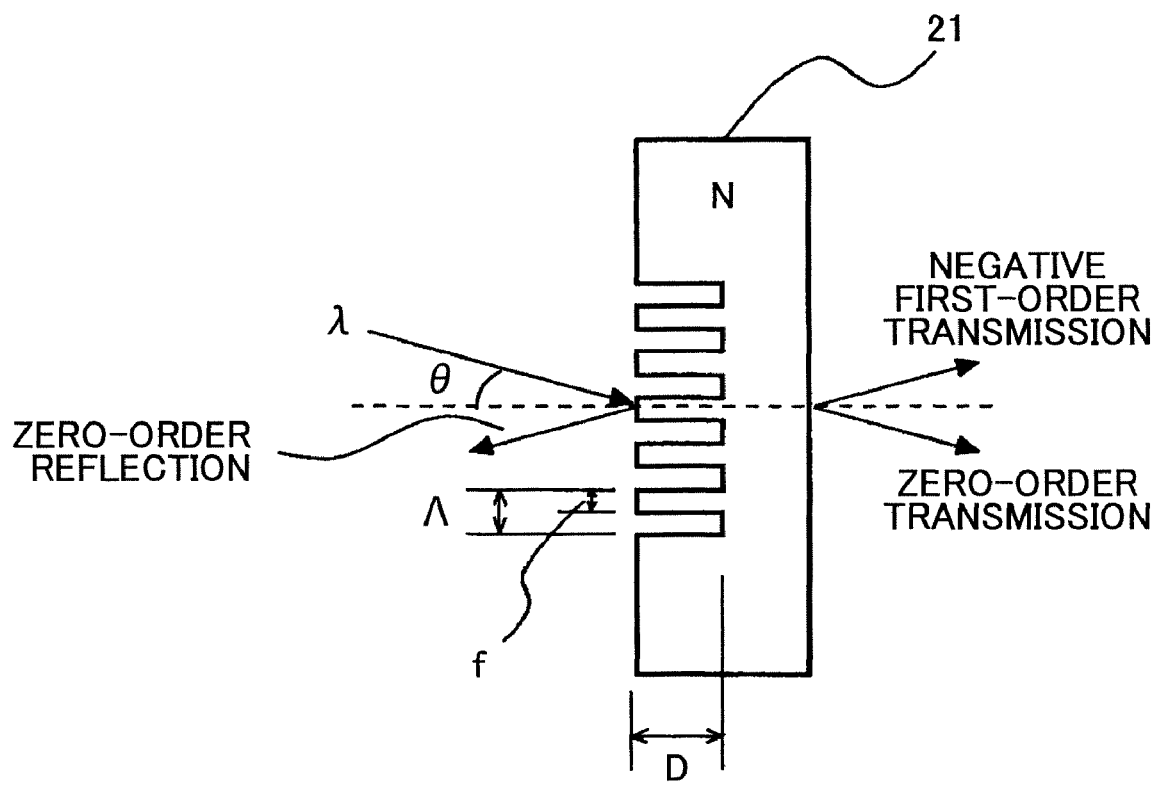
FIG. 21 is a drawing illustrating an exemplary configuration of the exemplary diffractive-optical element according to the second embodiment.

The configuration of the beam-splitting unit 21 shown in FIG. 21 is as follows: $\lambda$=0.633 μm, $\Lambda$=3 μm, f=0.5, D=0.2 μm, N=1.456, and $\theta$=6 degrees.

The beam-splitting unit 21 with the above configuration shows almost no polarization dependence.

Figure 22:
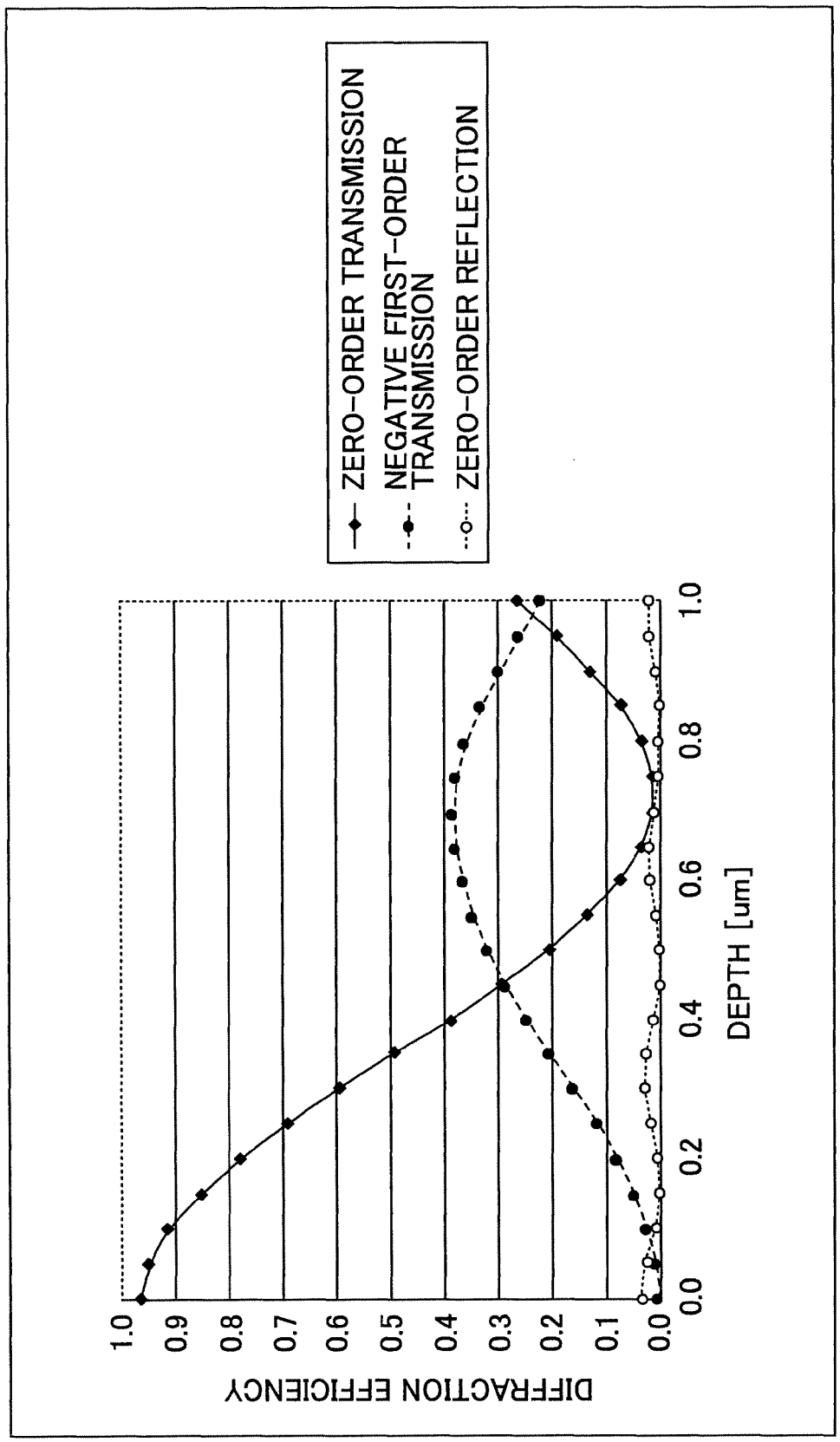
FIG. 22 is a graph showing the diffraction efficiency of a periodic structure of the exemplary diffractive-optical element according to the second embodiment.

FIG. 22 shows changes in diffraction efficiency of the periodic structure of the beam-splitting unit 21 when depth D is changed. As shown in FIG. 22, when D=0.2 μm, the zero-order transmission efficiency is 77.8%, the negative first-order transmission efficiency is 7.5%, and the zero-order reflection efficiency is 0.5%. Accordingly, a large portion of an incident light beam is transmitted as zero-order diffracted light and a small portion of the light beam is transmitted as negative first-order diffracted light. In this case, the negative first-order diffracted light has a transmission diffraction angle $\theta$' of −6.1 degrees and is directed to a photodetector.

In this embodiment, the angle between the incident light and the negative first-order transmitted diffracted light becomes 167.9 degrees. Even when the beam-splitting unit 21 is tilted 1 degree, the angle between the incident light and the negative first-order transmitted diffracted light is still 167.9 degrees. This indicates that the exit angle of the negative first-order transmitted diffracted light is not influenced by the mounting angle error of the beam-splitting unit 21. In other words, the exemplary optical scanning device according to the second embodiment is not greatly influenced by a mounting angle error of a diffractive-optical element. Although a change in the incidence angle caused by a mounting angle error may slightly change the diffraction efficiency of a diffractive-optical element, it does not cause a substantial problem.

When a diffractive-optical element is made of a single material, the reflectance of the diffractive-optical element tends to become low in proportion to the transmittance. In such a case, it is preferable to use transmitted diffracted light for light intensity control.

Also, the second embodiment makes it possible to change the transmission diffraction angle of the beam-splitting unit 21 depending on the position of the photodetector by changing the pitch $\Lambda$.

In the above example, the incidence angle is close to the Bragg angle ($\theta=\sin^{-1}(\lambda/2\Lambda)$).

An example of a beam-splitting unit 21 having polarization-dependence is described below with reference to corresponding figures.

Figure 23:
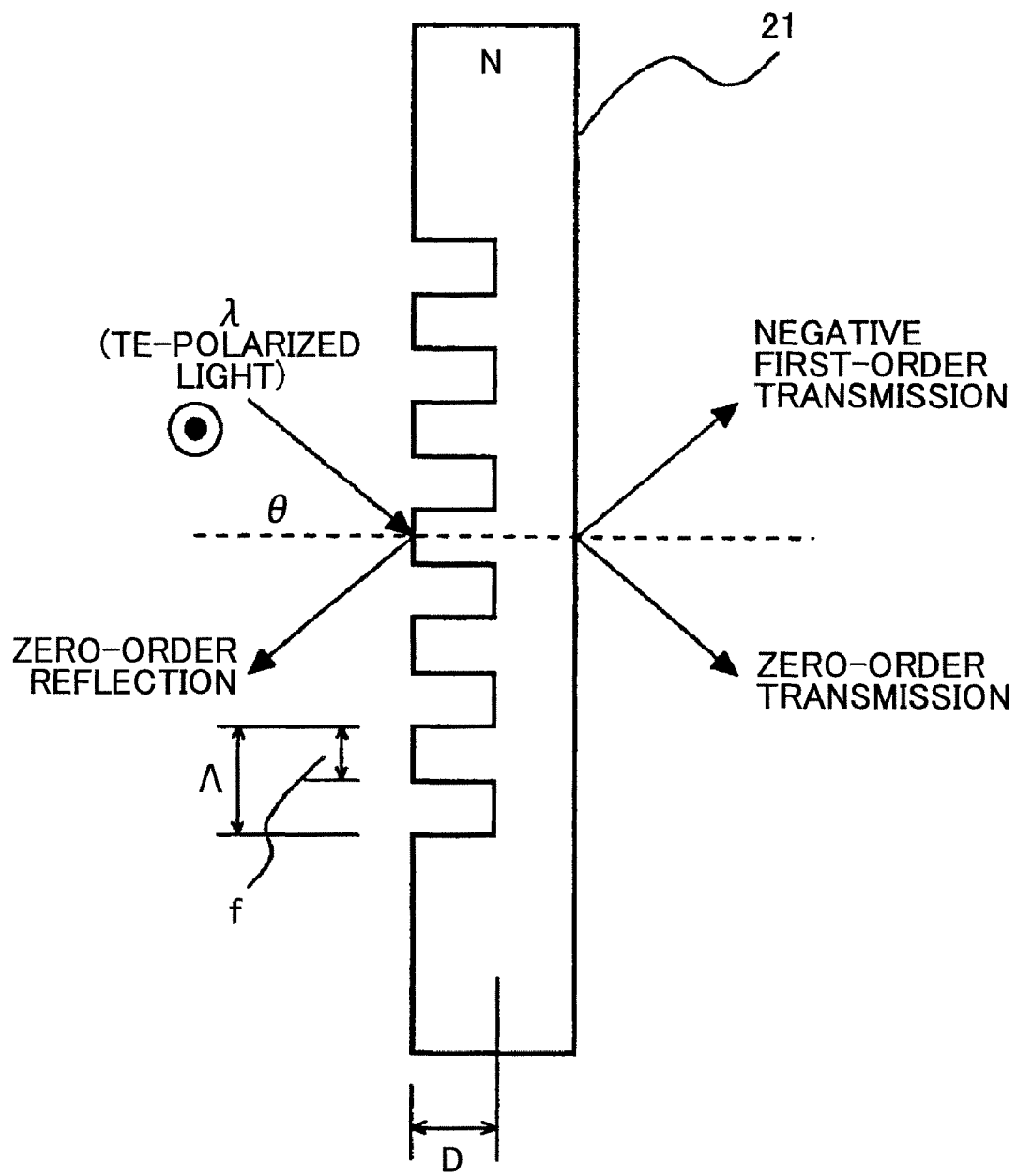
FIG. 23 is a drawing illustrating an exemplary diffractive-optical element having polarization dependence according to the second embodiment.

FIG. 23 is a drawing illustrating the beam-splitting unit 21 having polarization-dependence. When the beam-splitting unit 21 has polarization dependence, it may also be used as a polarization control mechanism.

As shown in FIG. 2, a surface emitting laser normally has a symmetrical structure. Therefore, a laser beam emitted from a surface emitting laser may be randomly polarized. Although surface emitting lasers having a polarization control mechanism have been developed in recent years, they still have many disadvantages. Therefore, in practice, it is preferable to provide a polarization control mechanism separately from a surface emitting laser. In other words, it is useful to give polarization dependence to a diffractive-optical element.

The beam-splitting unit 21 shown in FIG. 23 has high zero-order transmission diffraction efficiency and low negative first-order transmission diffraction efficiency for TE-polarized light having a polarization direction perpendicular to the printed page (projection plane of FIG. 23). On the other hand, the beam-splitting unit 21 has low zero-order transmission diffraction efficiency for TM-polarized light having a polarization direction that is orthogonal to that of TE-polarized light (longitudinal direction on the printed page).

As shown in FIG. 23, a large portion of the TE-polarized component of an incident light beam is transmitted as zero-order diffracted light but the TM-polarized component is almost not transmitted. With the above property, the beam-splitting unit 21 functions as a polarization control mechanism. To give polarization dependence to the beam-splitting unit 21, a birefringent material such as calcite having optical anisotropy or a liquid crystal may also be used.

As described above, an optical scanning device according to the second embodiment may include a polarization control mechanism. A polarization control mechanism reduces the influence of polarization dependence in transmittance and reflectance of optical elements in an optical scanning device and may also be used for polarization control of a surface emitting laser.

Also, birefringence may be produced without using a birefringent material such as calcite. To produce a type of birefringence called form birefringence, a diffractive-optical element is formed to have a periodic structure where ridges and grooves are arranged alternately at a pitch within a subwavelength range or a resonance range that is smaller than, equal to, or several times greater than the wavelength of light. In other words, a diffractive-optical element with a very fine periodic structure having polarization-dependence may be used as a polarization control mechanism.

As described above, according to the second embodiment of the present invention, a periodic structure with form birefringence is used to provide a polarization-dependent diffractive-optical element. This makes it possible to use an inexpensive optical material instead of an expensive birefringent material.

An exemplary configuration of the beam-splitting unit 21 according to the second embodiment is described below in more detail with reference to FIG. 23

The configuration of the beam-splitting unit 21 shown in FIG. 23 is as follows: $\lambda$=0.633 μm, $\Lambda$=0.5 μm, f=0.45, D=1.6 μm, N=1.456, and $\theta$=39 degrees.

In this case, the diffraction efficiency of the beam-splitting unit 21 is polarization-dependent. For TE-polarized light, the zero-order transmission efficiency is 77.1% and the negative first-order transmission efficiency is 19.4%. For TM-polarized light, the zero-order transmission efficiency is 9.2% and the negative first-order transmission efficiency is 88.7%. In other words, a large portion of TE-polarized light is transmitted as zero-order diffracted light and a small portion of the TE-polarized light is transmitted as negative first-order diffracted light. The negative first-order diffracted light has a transmission diffraction angle of −39.5 degrees and is directed to a photodetector.

The zero-order reflection efficiency in this case is 0.4% and is lower than the negative first-order transmission efficiency. Therefore, zero-order reflected light is not suitable for light intensity control.

On the other hand, a large portion of TM-polarized light is transmitted as negative first-order diffracted light and only 10% or less of the TM-polarized light is transmitted as zero-order diffracted light. Therefore, 90% or more of the TM-polarized component of an incident light beam can be cut off by the beam-splitting unit 21 having polarization dependence. In other words, the beam-splitting unit 21 functions as a polarization control mechanism.

In the configuration as described above, the negative first-order transmitted diffracted light used to detect the intensity of a light beam has the same polarization direction as that of the zero-order transmitted light.

In an optical scanning device according to the second embodiment, a light beam is polarization-controlled and split into light beams, and two light beams having the same polarization direction are used for scanning and light intensity control. The light intensity ratio between the two light beams can be controlled by changing the configuration of the beam-splitting unit 21.

The beam-splitting unit 21 may also be configured to transmit a large proportion of first polarized light in the zero-order direction and to transmit a large portion of second polarized light having a polarization direction orthogonal to that of the first polarized light in the negative first-order direction.

Another exemplary configuration of the beam-splitting unit 21 is described below.

The exemplary configuration of the beam-splitting unit 21 is as follows: $\lambda=0.633$ μm, $\Lambda=0.5$ μm, $f=0.45$, $D=1.9$ μm, $N=1.456$, and $\theta=39$ degrees.

In this case, the diffraction efficiency of the beam-splitting unit 21 is polarization-dependent. For TE-polarized light, the zero-order transmission efficiency is 96.2%. For TM-polarized light, the zero-order transmission efficiency is 0.6% and the negative first-order transmission efficiency is 96.9%. In other words, a large portion of TE-polarized light is transmitted as zero-order diffracted light.

The negative first-order transmission efficiency is 0.2% for TE-polarized light and 96.9% for TM-polarized light. A large portion of TM-polarized light is transmitted as negative first-order diffracted light. Therefore, a large portion of the TM-polarized component of an incident light beam can be cut off by the beam-splitting unit 21 having polarization dependence. In other words, the beam-splitting unit 21 functions as a polarization control mechanism. The 96.9% of the TM-polarized light (negative first-order diffracted light) has a transmission diffraction angle of −39.5 degrees and is directed to a photodetector.

The zero-order reflection efficiency in this case is 0.4% and is lower than the negative first-order transmission efficiency. Therefore, zero-order reflected light is not suitable for light intensity control.

The above embodiment is applicable when an incident light beam contains TE-polarized light and TM-polarized light in certain proportions. In the above case, TE-polarized light is used for scanning and TM-polarized light is used for light intensity control. In other words, a portion of a light beam which portion is transmitted and used to detect the intensity of the light beam has a polarization direction that is orthogonal to that of the zero-order transmitted light.

As described above, in another exemplary optical scanning device according to the second embodiment, light beams having different polarization directions are used for scanning and light intensity detection. This makes it possible to efficiently use polarization components contained in a light beam.

Also, even when a light beam contains a single polarization component, it is possible to use a light intensity control method as described above by rotating a diffractive-optical element so that the single polarization component can behave both as TE-polarized light and TM-polarized light.

Although negative first-order diffracted light is used for light intensity control in the second embodiment, light with a different diffraction order may be used. For example, the beam-splitting unit 21 may be configured to achieve the same diffraction angle $\theta'$ even when m is −2 and $\Lambda$ is doubled in formula (1). However, increasing the value of m increases the number of diffraction orders and therefore may reduce the zero-order transmission efficiency and the negative first-order transmission efficiency. For this reason, using negative first-order diffracted light provides higher diffraction efficiency than that obtained when higher-order diffracted light is used.

Figure 24:
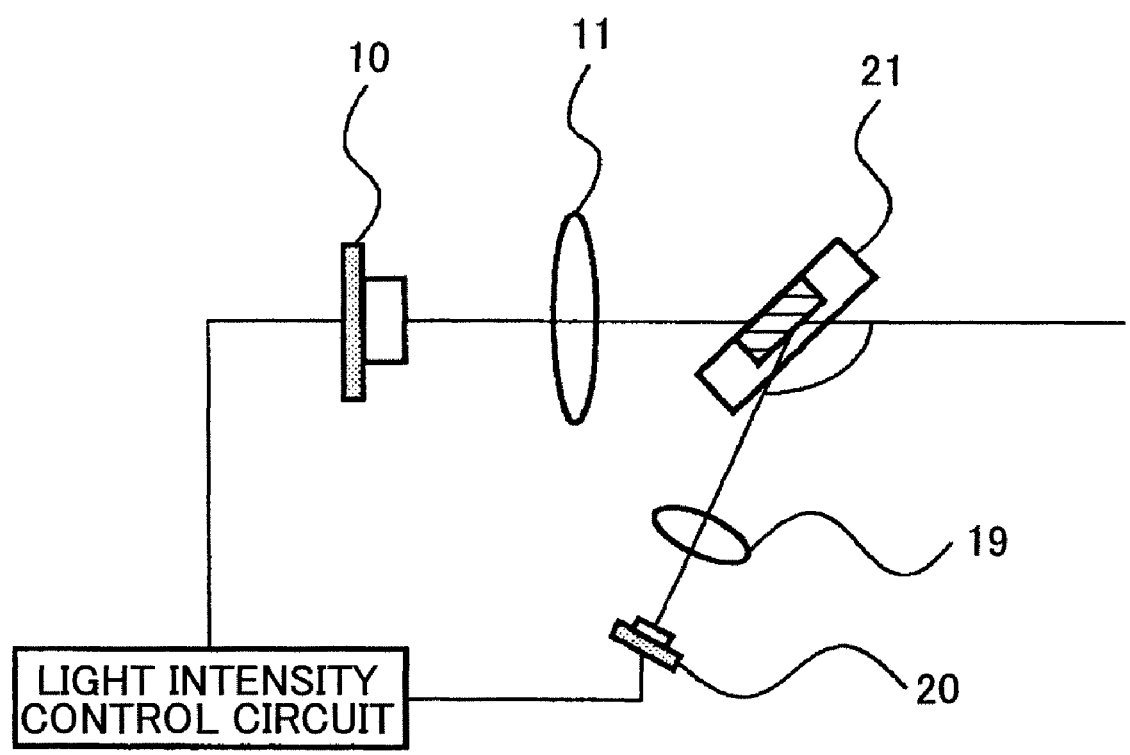
FIG. 24 is a drawing illustrating an exemplary light detection mechanism using transmitted light in an optical scanning device according to the second embodiment.

FIG. 24 is a drawing illustrating an exemplary light detection mechanism using transmitted light in an optical scanning device according to the second embodiment.

In the exemplary light detection mechanism shown in FIG. 24, a portion of a light beam is separated by the beam splitting unit 21 and guided via the optical unit 19 to the photodetector 20. The photodetector 20 measures the intensity of the portion of the light beam and, based on the result of measurement, a light intensity control circuit causes the VCSEL 10 to emit a light beam with a desired intensity. In the exemplary optical scanning device according to the second embodiment, the angle between zero-order transmitted light and negative first-order transmitted light is 90 degrees or larger. This makes it possible to guide a light beam to a position closer to the light source than the beam-splitting unit 21 without using a deflector such as a loopback mirror and thereby to position a photodetector close to a light source.

Figure 25:
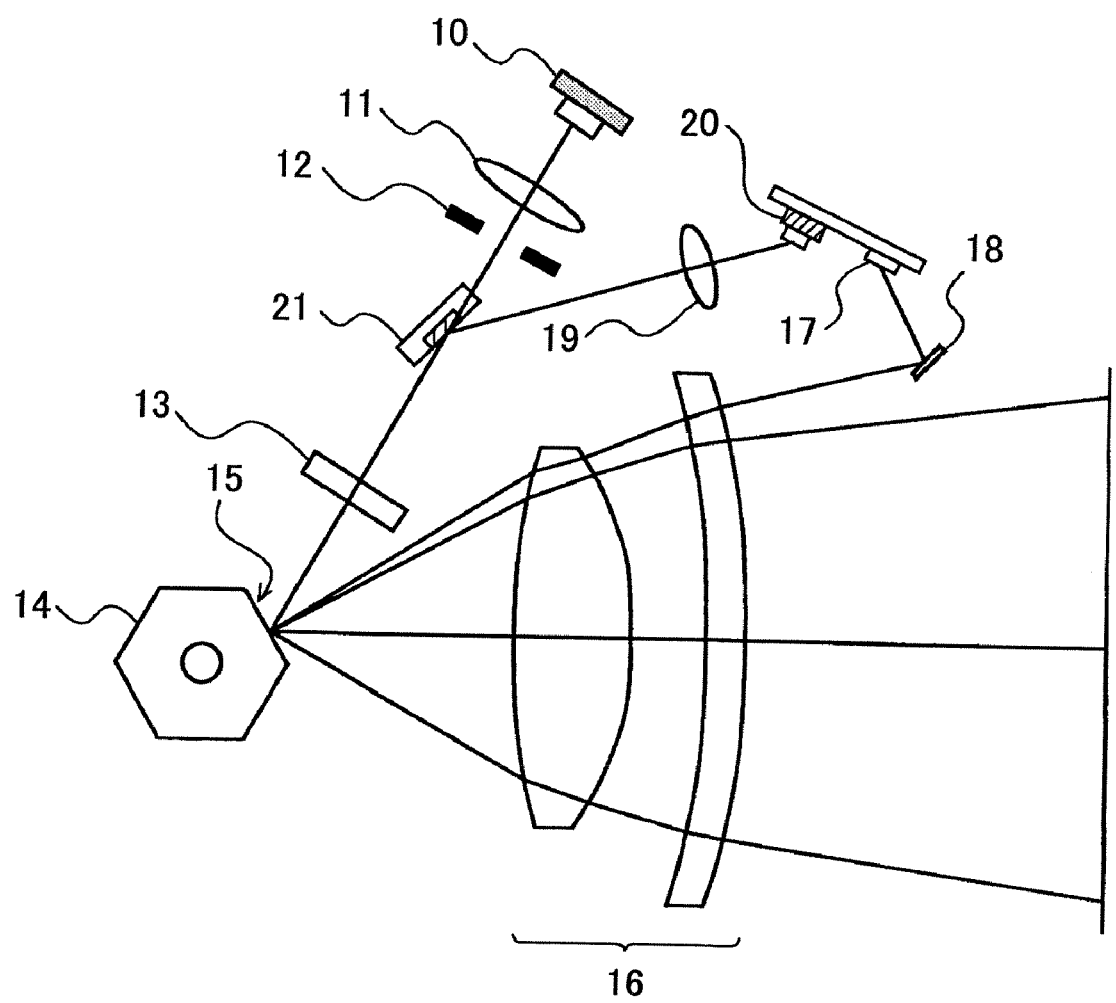
FIG. 25 is a drawing illustrating another exemplary configuration of an optical scanning device according to the second embodiment.

In another exemplary light detection mechanism shown in FIG. 25, the synchronizing sensor 17 and the photodetector 20 are mounted on the same substrate. Since the separated portion of the light beam is directed toward the synchronizing sensor 17, there is no need to provide a deflector such as a loopback mirror even when the synchronizing sensor 17 and the photodetector 20 are mounted on the same substrate. Accordingly, such a configuration contributes to reducing production costs.

More specifically, integrating a synchronizing sensor and a photodetector makes it possible to combine functions, to reduce the size of an optical scanning device, and thereby to reduce production costs.

An exemplary image forming apparatus including an optical scanning device according to the first or second embodiment is described below.

Figure 26:
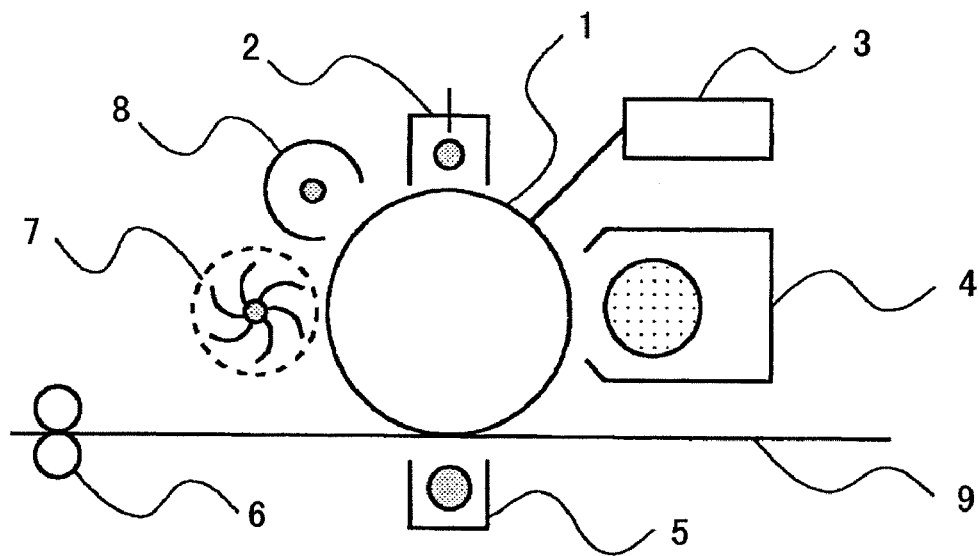
FIG. 26 is a drawing illustrating an exemplary configuration of an image forming apparatus according to an embodiment of the present invention.
Figure 27:
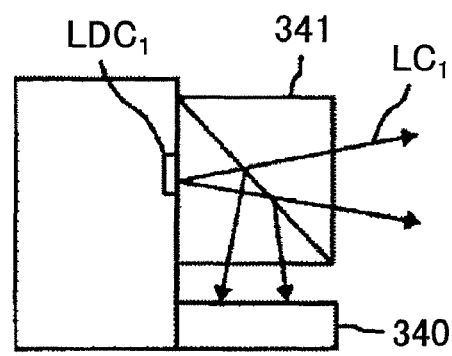
FIG. 27 is a drawing illustrating a conventional optical scanning device.
Figure 28:
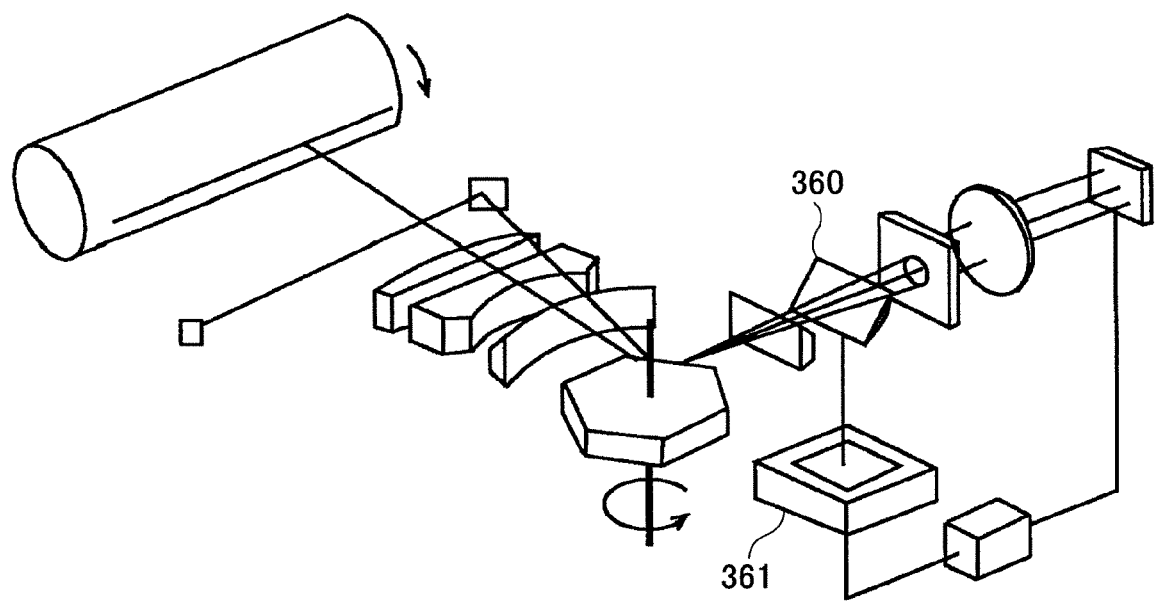
FIG. 28 is a drawing illustrating another conventional optical scanning device.
Figure 29:
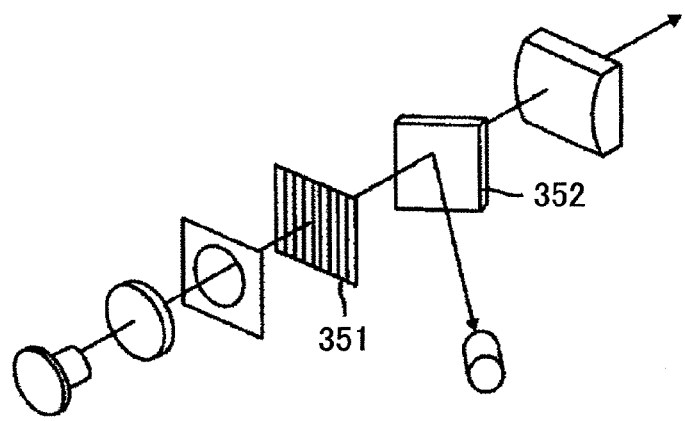
FIG. 29 is a drawing illustrating still another conventional optical scanning device.

FIG. 26 is a drawing illustrating an exemplary configuration of the exemplary image forming apparatus according to an embodiment of the present invention.

As shown in FIG. 26, the exemplary image forming apparatus includes an image carrier 1, a charging unit 2, an exposing unit 3, a developing unit 4, a transfer unit 5, a fusing unit 6, a cleaning unit 7, and a discharging unit 8. In the exemplary image forming apparatus, an electrophotographic process is used as an image forming process. The outline of an exemplary electrophotographic process is described below.

In the exemplary electrophotographic process, the charging unit 2 charges the image carrier 1 such as a photoconductor (charging process). The exposing unit 3 such as an optical scanning device according to an embodiment of the present invention scans a light beam on the image carrier 1 and thereby forms a latent image (exposing process). The developing unit 4 causes toner to adhere to the latent image and thereby forms a toner image (developing process). The transfer unit 5 transfers the toner image onto recording paper 9 (transfer process). The fusing unit 6 applies pressure and heat to the toner image and thereby fuses the toner image onto the recording paper 9 (fusing process). The cleaning unit 7 removes toner that has not been transferred onto the recording paper 9 from the image carrier 1. Then, the discharging unit 8 discharges the image carrier 1.

Also, an optical scanning device according to embodiments of the present invention can be used for a tandem color image forming apparatus that is suitable for high-speed color image forming.

As described above, embodiments of the present invention make it easier to install a beam-splitting unit for light intensity control and thereby make it possible to reduce fluctuation in light beam intensity. In other words, embodiments of the present invention make it possible to provide an image forming apparatus that can form an image with uniform image density. Also, embodiments of the present invention make it possible to use a surface emitting laser array for an optical scanning device of an image forming apparatus and thereby make it possible to improve the printing speed and printing resolution of the image forming apparatus. Further, embodiments of the present invention make it possible to decrease the rotational speed of a beam deflector of an optical scanning device while maintaining the same scanning speed and resolution and thereby make it possible to reduce power consumption and noise and heat generated by the rotation of a beam deflector.

In an optical scanning device and an image forming apparatus according to an embodiment of the present invention, transmitted diffracted light is used for light intensity control. This makes it possible to easily install a beam-splitting unit, improve diffraction efficiency, and increase the amount of light used for light intensity control. Embodiments of the present invention make it possible to increase the angle between zero-order transmitted light and negative first-order transmitted light and thereby to improve the layout flexibility of an optical scanning device. In an optical scanning device according to an embodiment of the present invention, a beam-splitting unit is positioned downstream of a beam-limiting unit. Such a configuration makes it possible to control the intensity of a light beam from a light source without being affected by changes in the divergence angle of the light beam which are caused by changes in the driving current. This, in turn, makes it possible to use a surface emitting laser array in an optical scanning device and thereby to improve the scanning speed and resolution of the optical scanning device.

Also, embodiments of the present invention make it possible to control polarization of a light beam and thereby to reduce the influence of polarization dependence in transmittance and reflectance of a beam deflector and other optical elements. This, in turn, makes it possible to reduce fluctuation in the intensity of a light beam emitted from a light source of an optical scanning device. Thus, embodiments of the present invention make it possible to provide an image forming apparatus that can form an image with uniform image density.

Figure 30:
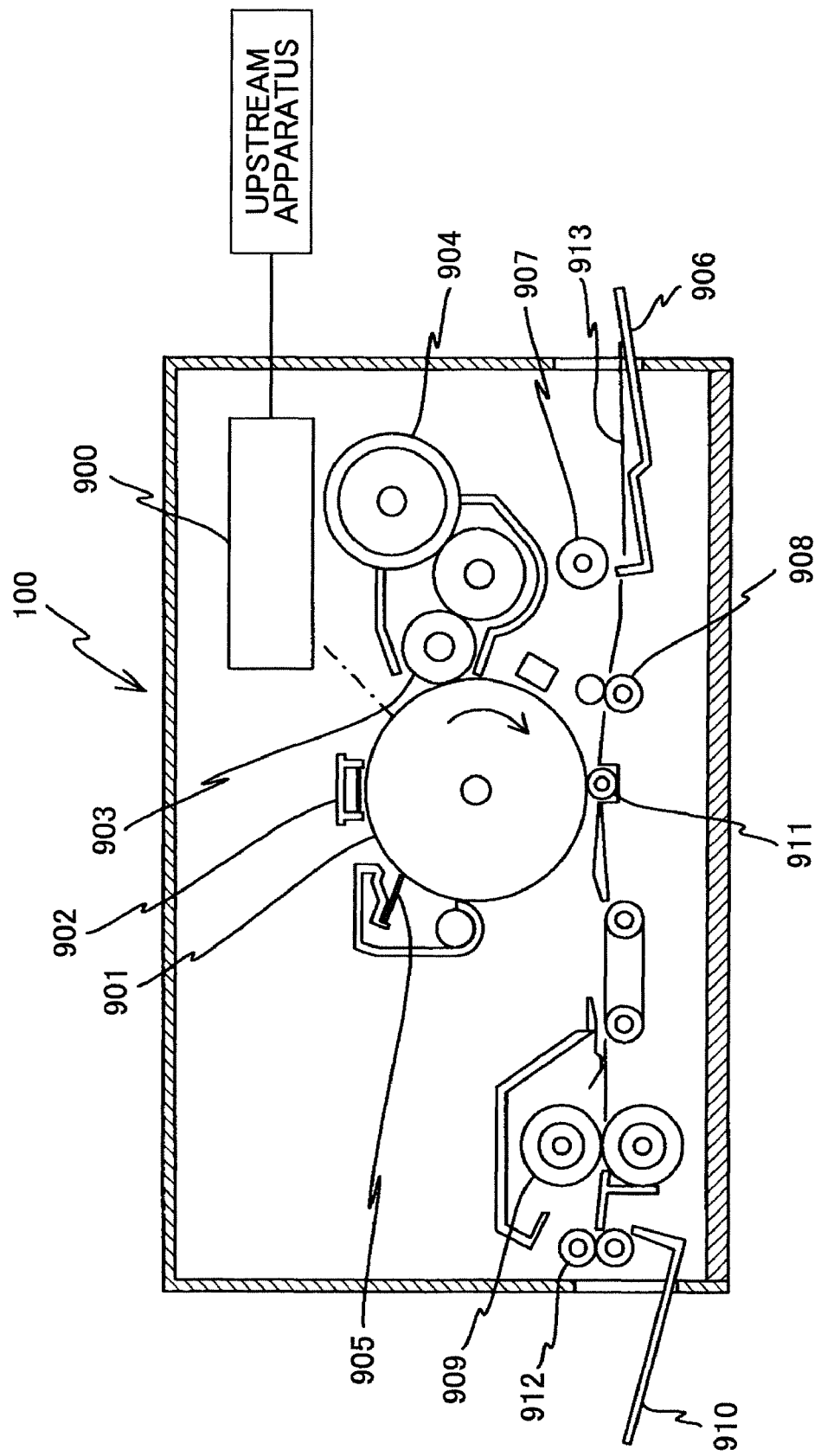
FIG. 30 is a drawing illustrating an exemplary configuration of an exemplary laser printer according to an embodiment of the present invention.

An embodiment of the present invention is descried below with reference to FIGS. 30 through 33. FIG. 30 is a drawing illustrating an exemplary configuration of a laser printer 100 according to an embodiment of the present invention.

The laser printer 100 shown in FIG. 30 includes an optical scanning device 900, a photosensitive drum 901 that is to be scanned with a light beam, a charger 902, a development roller 903, a toner cartridge 904, a cleaning blade 905, a paper feed tray 906, a paper feed roller 907, resist rollers 908, a transfer charger 911, a fusing roller 909, a paper ejecting roller 912, and a paper catch tray 910.

The charger 902, the development roller 903, the transfer charger 911, and the cleaning blade 905 are positioned close to the surface of the photosensitive drum 901 and are arranged along its rotational direction in the order mentioned.

A photosensitive layer is formed on the surface of the photosensitive drum 901. The photosensitive drum 901 is configured to rotate clockwise (in the direction of arrow) in a plane shown in FIG. 30.

The charger 902 uniformly charges the surface of the photosensitive drum 901.

The optical scanning device 900 irradiates the surface of the photosensitive drum 901 charged by the charger 902 with a light beam that is modulated according to image data from an upstream apparatus (for example, a personal computer). The charges in the irradiated areas on the surface of the photosensitive drum 901 are eliminated and, as a result, a latent image corresponding to the image data is formed on the surface of the photosensitive drum 901. The formed latent image moves toward the development roller 903 as the photosensitive drum 901 rotates. The length direction (direction along the rotational axis) of the photosensitive drum 901 is called the "main-scanning direction" and the rotational direction of the photosensitive drum 901 is called the "sub-scanning direction". On the surface of the photosensitive drum 901, an area along the main-scanning direction between the scanning start position and the scanning end position is called the scanning area, and an area in the scanning area where a latent image is formed is called the "effective imaging area". The configuration of the optical scanning device 900 is described later.

The toner cartridge 904 contains toner and supplies the toner to the development roller 903. The amount of toner in the toner cartridge 904 is checked, for example, when the laser printer 100 is turned on or when a printing process is completed. When the amount of remaining toner is small, the laser printer 100 displays a message prompting a user to replace the toner cartridge 904 on a display unit (not shown).

The toner supplied from the toner cartridge 904 is charged. The charged toner adheres to the surface of the development roller 903 and forms a thin uniform layer as the development roller 903 rotates. A voltage is applied to the development roller 903 so as to generate electric fields in opposite directions in charged areas (areas not irradiated with a light beam) and in non-charged areas (areas irradiated with a light beam) on the surface of the photosensitive drum 901. The electric fields cause the toner on the development roller 903 to adhere only to the areas irradiated with a light beam on the photosensitive drum 901. In other words, the development roller 903 causes toner to adhere to the latent image formed on the photosensitive drum 901 and thereby develops the latent image. The developed latent image moves toward the transfer charger 911 as the photosensitive drum 901 rotates.

The paper feed tray 906 holds recording paper sheets 913 to which latent images are transferred. The paper feed roller 907 positioned close to the paper feed tray 906 feeds the recording paper sheets 913 one by one from the paper feed tray 906 to the resist rollers 908. The resist rollers 908 positioned close to the transfer charger 911 temporarily hold the paper sheet 913 fed from the paper feed roller 907 and convey the paper sheet 913 to the space between the photosensitive drum 901 and the transfer charger 911 in accordance with the rotation of the photosensitive drum 901.

A voltage with a polarity opposite to that of the toner is applied to the transfer charger 911 to electrically attract the toner on the photosensitive drum 901 to the recording paper sheet 913. With the voltage, the transfer charger 911 transfers the latent image on the photosensitive drum 901 to the recording paper sheet 913. The recording paper sheet 913 with the transferred image is conveyed to the fusing roller 909.

The fusing roller 909 applies heat and pressure to the recording paper sheet 913 and thereby fuses the toner onto the recording paper sheet 913. Then, the recording paper sheet 913 is ejected by the paper ejecting roller 912 and stacked on the paper catch tray 910.

The cleaning blade 905 removes the toner remaining on the photosensitive drum 901. The removed toner is recycled. As the photosensitive drum 901 rotates, the surface area where the toner is removed returns to the position below the charger 902.

An exemplary configuration and mechanism of the optical scanning device 900 is described below with reference to FIG. 31.

Figure 31:
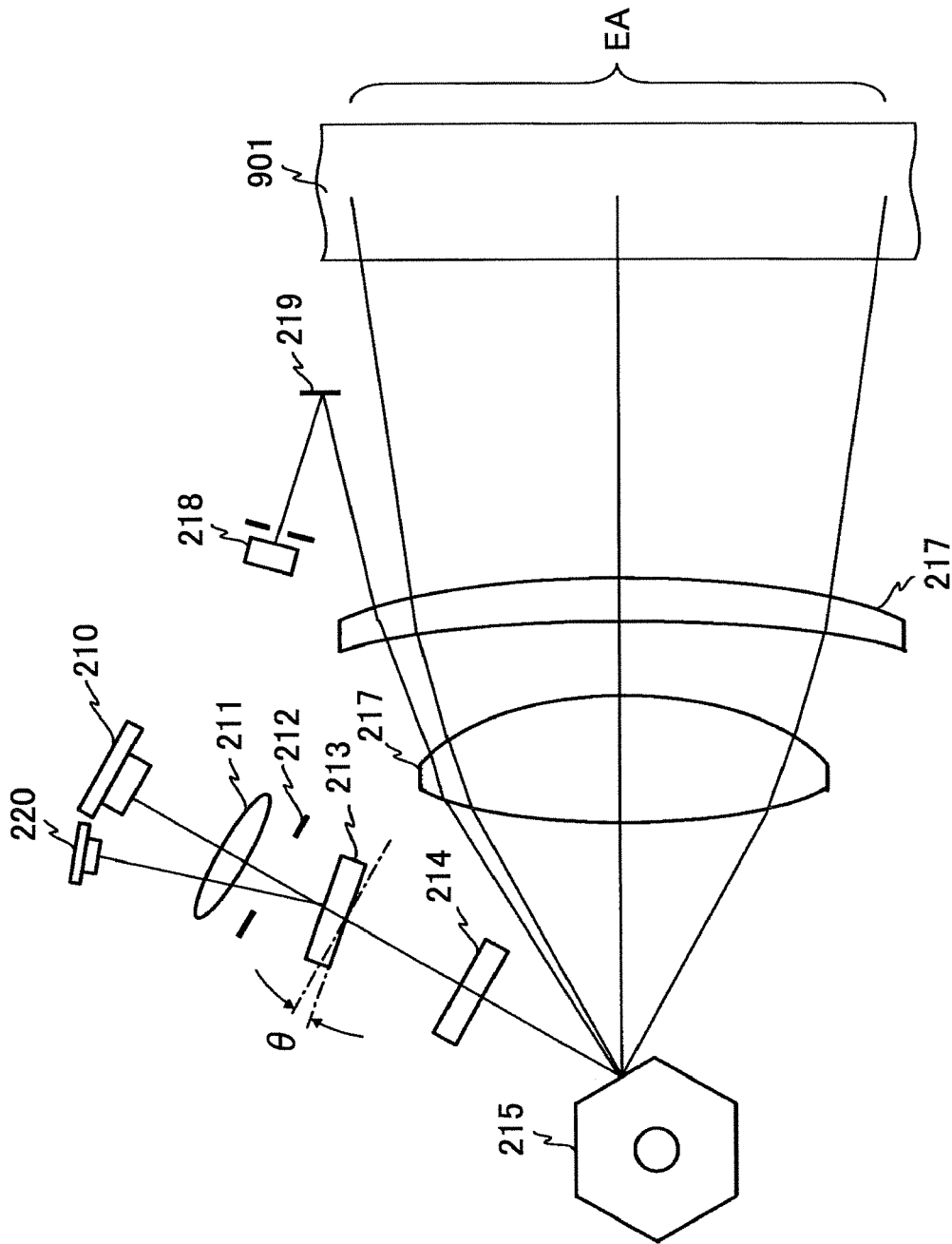
FIG. 31 is a drawing illustrating an exemplary optical scanning device in the exemplary laser printer shown in FIG. 30.

The optical scanning device 900 includes a light source unit 210, a coupling lens 211, an aperture 212, a parallel glass plate 213, a cylindrical lens 214, a polygon scanner 215, two fθ lenses 217, a synchronizing sensor 218, a reflection mirror 219, a light intensity detector 220, and a processing circuit (not shown in FIG. 31).

Figure 32:
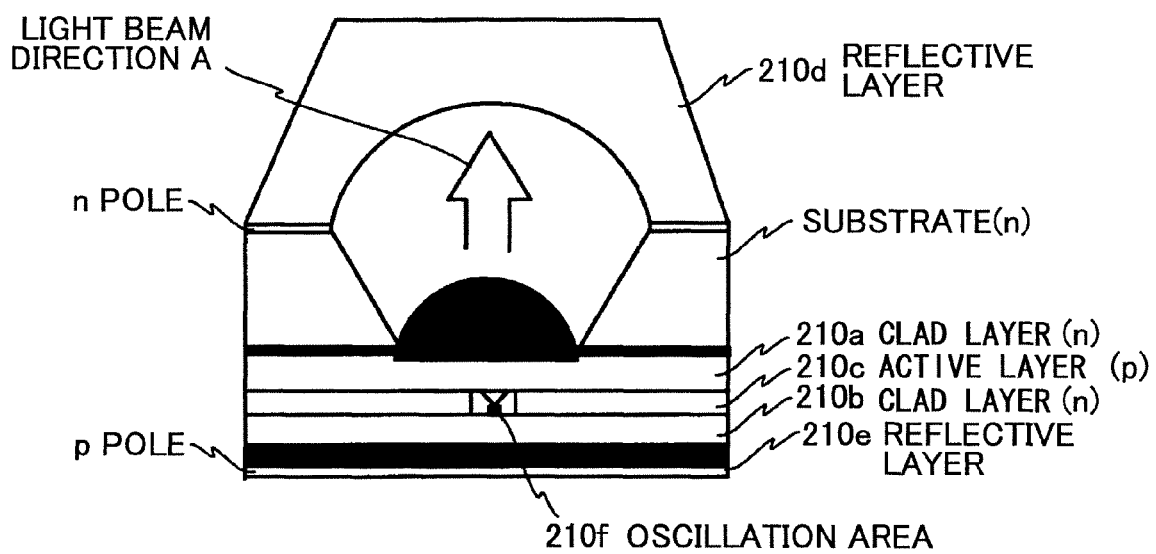
FIG. 32 is a drawing illustrating an exemplary surface emitting laser.

The light source unit 210 includes a surface emitting laser array having multiple light-emitting points. For example, each of the light emitting points has a structure as shown in FIG. 32. In the exemplary light emitting point, an active layer 210c is sandwiched between two clad layers 210a and 210b. A substrate is stacked on the upper surface of the clad layer 210a. Also, reflective layers 210d and 210e with high reflectance are provided on the upper surface of the substrate and the under surface of the clad layer 210b. The layers sandwiched between the reflective layers 210d and 210e function as a Fabry-Perot resonator that is perpendicular to the substrate and cause laser oscillation in an oscillation area 210f of the active layer 210c. A light beam is emitted in the direction of arrow A shown in FIG. 32, in other words, in the direction perpendicular to the substrate. The light source unit 210 may also be implemented with multiple surface emitting lasers each having one light-emitting point.

The parallel glass plate 213 is tilted slightly in a direction corresponding to the main-scanning direction so that the light axis of the parallel glass plate 213 forms an angle θ with the light axis of the coupling lens 211. The tilt direction and angle of the parallel glass plate 213 is determined according to the position of the light intensity detector 220. The parallel glass plate 213 may also be tilted in a direction corresponding to the sub-scanning direction.

A divergent light beam emitted from the light source unit 210 is substantially collimated by the coupling lens 211, limited by the aperture 212, and enters the parallel glass plate 213. In the present application, a "substantially collimated light beam" may indicate not only a completely collimated light beam but also a light beam with low convergence or divergence.

A portion of the light beam is specularly reflected by the parallel glass plate 213 to the aperture 212 as a substantially collimated light beam. In the exemplary configuration, the light path of the reflected light beam and the light path of the light beam going from the light source unit 210 to the parallel glass plate 213 do not form a wide angle. The reflected light beam passes through the aperture 212, is focused by the coupling lens 211, and is received by the light intensity detector 220 positioned near the focal point. The light intensity detector 220 generates a signal (photoelectric conversion signal) in proportion to the intensity of the received light beam.

On the other hand, the light beam transmitted by the parallel glass plate 213 enters the cylindrical lens 214. The cylindrical lens 214 focuses the light beam to form a line image that is long in a direction corresponding to the main-scanning direction near the deflecting reflective surfaces (polygon mirror surfaces) of the polygon scanner 215.

The light beam is polarized by the polygon scanner 215 and is then focused by the fθ lenses 217 to form a light spot on the photosensitive drum 901.

The polygon scanner 215 is being rotated by a polygon motor (not shown) at a constant speed. The light beam focused near the deflecting reflective surfaces is deflected at a constant angular velocity by the rotating polygon scanner 215 and therefore the light spot formed on the photosensitive drum 901 moves at a constant speed in the main scanning direction. In other words, the polygon scanner 215 scans the photosensitive drum 901 in the main-scanning direction.

A portion of the light beam is deflected by the polygon scanner 215 toward the outside of an effective imaging area EA. The deflected portion of the light beam passes through the fθ lenses 217, is reflected by the reflection mirror 219, and is received by the synchronizing sensor 218. The synchronizing sensor 218 generates a signal (photoelectric conversion signal) in proportion to the intensity of the received light beam.

Figure 33:
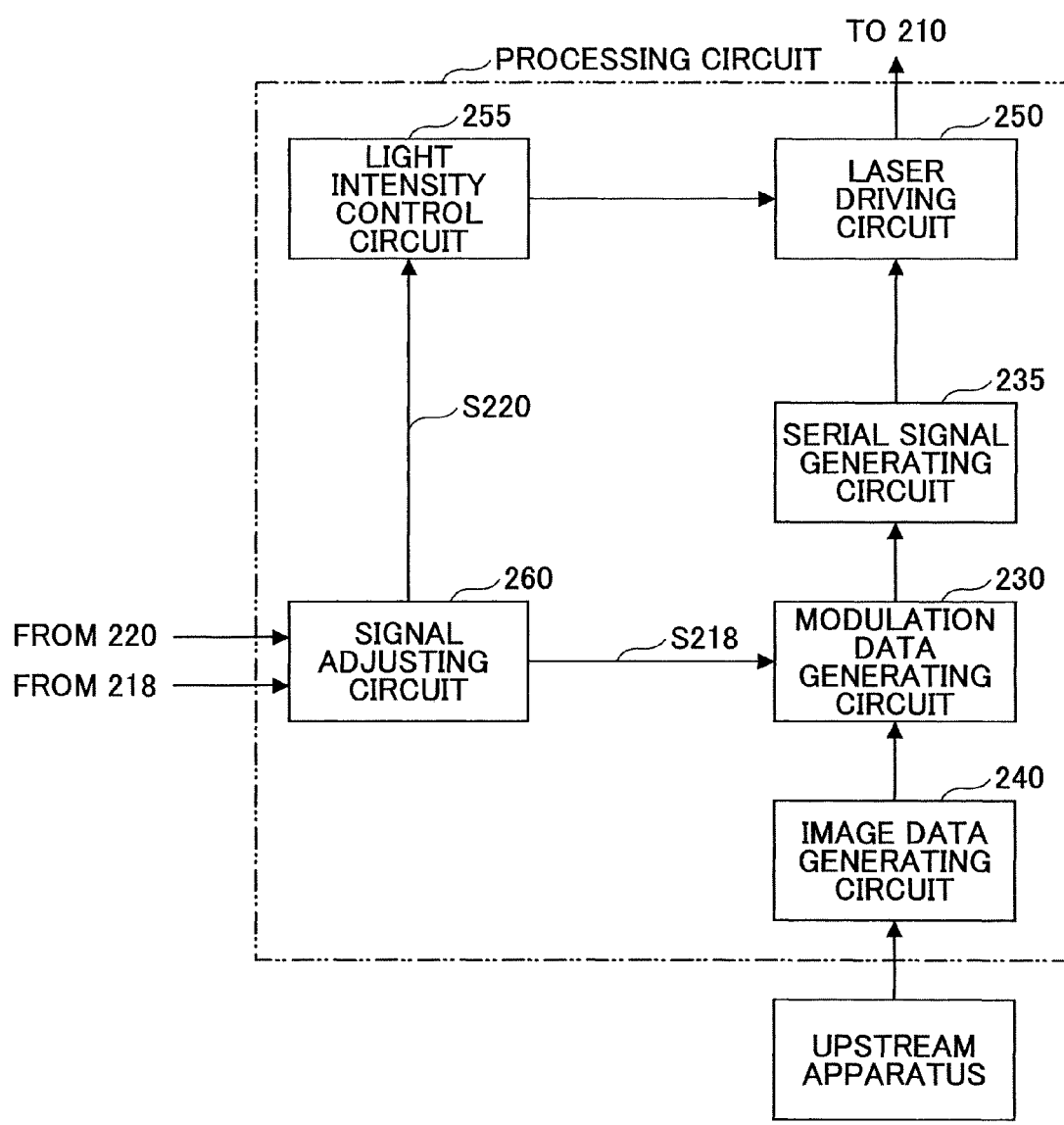
FIG. 33 is a block diagram illustrating an exemplary processing circuit.

As shown in FIG. 33, the processing circuit includes a signal adjusting circuit 260, a modulation data generating circuit 230, a serial signal generating circuit 235, an image data generating circuit 240, a light intensity control circuit 255, and a laser driving circuit 250.

The signal adjusting circuit 260 amplifies, inverts, and binarizes a signal output from the synchronizing sensor 218 and thereby generates a signal S218. When the synchronizing sensor 218 receives a light beam, the level of the signal S218 changes from high (H) to low (L). Also, the signal adjusting circuit 260 amplifies and binarizes a signal output from the light intensity detector 220 and thereby generates a signal S220.

The image data generating circuit 240 generates image data based on image information sent from an upstream apparatus.

The modulation data generating circuit 230 generates modulation data based on the signal S218 from the signal adjusting circuit 260 and the image data from the image data generating circuit 240.

The serial signal generating circuit 235 converts the modulation data from the modulation data generating circuit 230 into a serial signal.

The light intensity control circuit 255 generates APC (auto power control) information based on the signal S220 from the signal adjusting circuit 260. The APC information is used to maintain the intensity of a light beam emitted from the light source unit 210 at a specified level.

The laser driving circuit 250 generates a driving signal for driving the surface emitting laser array of the light source unit 210 based on the serial signal from the serial signal generating circuit 235 and the APC information from the light intensity control circuit 255. The generated driving signal is output to the light source unit 210.

As described above, in the optical scanning device 900 according to an embodiment of the present invention, the first optical unit is implemented by the coupling lens 211, the second optical unit is implemented by the parallel glass plate 213, and a photodetector is implemented by the light intensity detector 220.

Also, in the laser printer 100 according to an embodiment of the present invention, an image transfer unit is made up of the charger 902, the development roller 903, the toner cartridge 904, and the transfer charger 911.

As described above, in the optical scanning device 900 according to an embodiment of the present invention, a divergent light beam emitted from the light source unit 210 is substantially collimated by the coupling lens 211, and enters the parallel glass plate 213 via the aperture 212. A portion of the light beam is specularly reflected by the parallel glass plate 213 to the aperture 212 as a substantially collimated light beam. The reflected light beam passes through the aperture 212 and is focused by the coupling lens 211. Most of the focused light beam is received by the light intensity detector 220. Such a mechanism makes it possible to downsize a photodetector. Also, using the parallel glass plate 213 to split a light beam makes it possible to simplify the configuration of an optical scanning device and to position the light source unit 210 and the light intensity detector 220 close to each other. Accordingly, embodiments of the present invention make it possible to provide a small and low-cost optical scanning device including a light intensity control mechanism that can accurately detect the intensity of a light beam emitted from a light source.

Also, the laser printer 100 according to an embodiment of the present invention includes the optical scanning device 900 that can reduce fluctuation in the intensity of a light spot formed on the photosensitive drum 901. In other words, embodiments of the present invention make it possible to reduce fluctuation in image density and thereby to form a high-quality image without increasing the size and costs of an image forming apparatus. Normally, fluctuation in the intensity of a light spot is caused by the fluctuation in the divergence angle of a light beam emitted from a light source unit and the polarization dependence in transmittance and reflectance of optical elements.

Also, using a surface emitting laser array as the light source of the laser printer 100 according to an embodiment of the present invention makes it possible to scan multiple light beams at once and thereby to improve the printing speed and resolution. Further, using a surface emitting laser array makes it possible to make the rotational speed of a beam deflector lower than that in a conventional laser printer where a single-beam laser is used for scanning while maintaining the same scanning speed and resolution. This, in turn, makes it possible to reduce power consumption and noise and heat generated by the rotation of a beam deflector.

Figure 34:
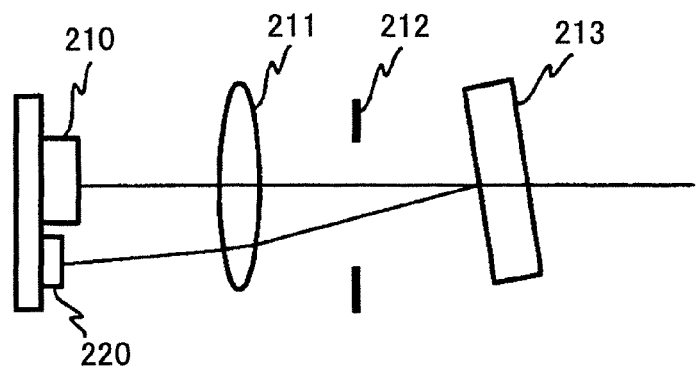
FIG. 34 is a drawing illustrating a light source unit integrated with a light intensity detector.

In the optical scanning device 900 according to an embodiment of the present invention, the light source unit 210 and the light intensity detector 220 may be integrated as shown in FIG. 34. In this case, the light source unit 210 and the light intensity detector 220 may be formed on the same substrate. Integrating the light source unit 210 and the light intensity detector 220 makes it possible to combine functions, to reduce the size of an optical scanning device, and thereby to reduce production costs.

Figure 35:
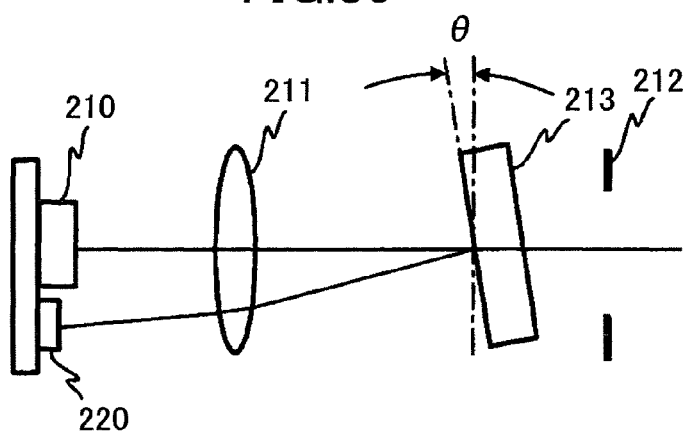
FIG. 35 is a drawing used to describe a case where an aperture is placed in a different position.

In the optical scanning device 900 according to an embodiment of the present invention, the aperture 212 may be placed between the parallel glass plate 213 and the cylindrical lens 214 as shown in FIG. 35.

Figure 36:
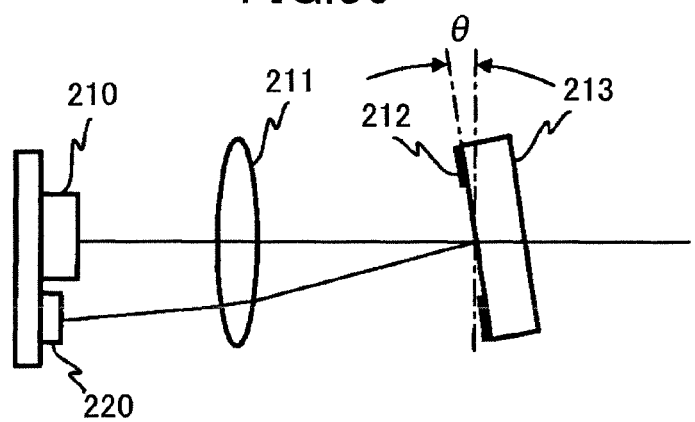
FIG. 36 is a drawing used to describe a case where a parallel glass plate and an aperture are integrated.

Also, the aperture 212 may be integrated with the parallel glass plate 213 as shown in FIG. 36. Such a configuration makes it possible to reduce the number of parts in an optical scanning device and thereby to reduce the workload of adjusting the parts.

Figure 37:
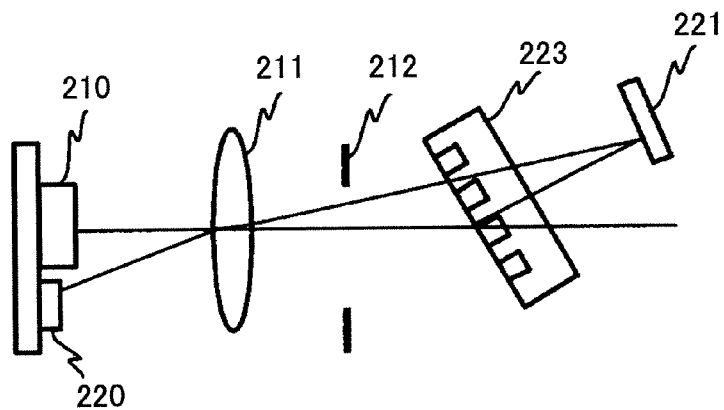
FIG. 37 is a drawing used to describe a case (1) where a diffractive-optical element is used instead of a parallel glass plate.

Also, a diffractive-optical element 223 may be used instead of the parallel glass plate 213 as shown in FIG. 37. The diffractive-optical element 223 is tilted slightly in a direction corresponding to the main-scanning direction so that the light axis of the diffractive-optical element 223 forms an angle θ with the light axis of the coupling lens 211. In this case, a light beam entering the diffractive-optical element 223 via the aperture 212 is diffracted into zero-order transmitted light that is directed to the polygon scanner 215 and high-order transmitted light a portion of which is directed to the light intensity detector 220. The portion of the high-order transmitted light is deflected by a loopback mirror 221, passes through the aperture 212 and the coupling lens 211, and is received by the light intensity detector 220. With the above configuration, the light path of the deflected high-order transmitted light and the light path of the light beam going from the light source unit 210 to the diffractive-optical element 223 do not form a wide angle. The diffractive-optical element 223 may also be tilted in a direction corresponding to the sub-scanning direction. The diffraction angle of the high-order transmitted light can be adjusted depending on the position of the light intensity detector 220 by changing the pitch Λ of the diffraction grating of the diffractive-optical element 223. Also, the diffraction efficiency of the diffractive-optical element 223 can be adjusted by changing the depth D of the diffraction grating. Thus, using the diffractive-optical element 223 improves the layout flexibility of an optical scanning device.

Figure 38:
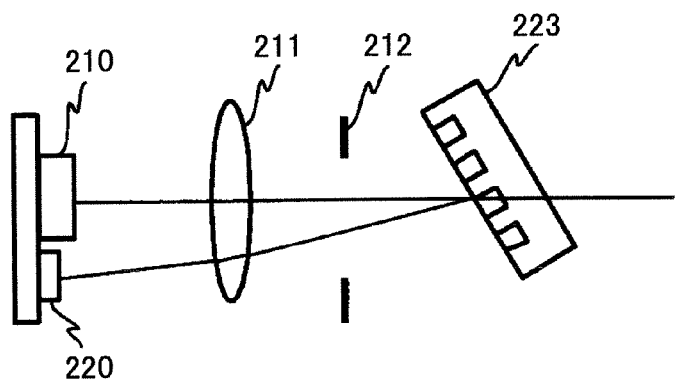
FIG. 38 is a drawing used to describe a case (2) where a diffractive-optical element is used instead of a parallel glass plate.

With the diffractive-optical element 223, it is possible to use high-order reflected light for light intensity control as shown in FIG. 38. The light path of the high order reflected light does not form a wide angle with the light path of the light beam going from the light source unit 210 to the diffractive-optical element 223. Therefore, the high order reflected light can be directed so as to pass through the aperture 212 and the coupling lens 211 and then to enter the light intensity detector 220 without using the loopback mirror 221.

Figure 39:
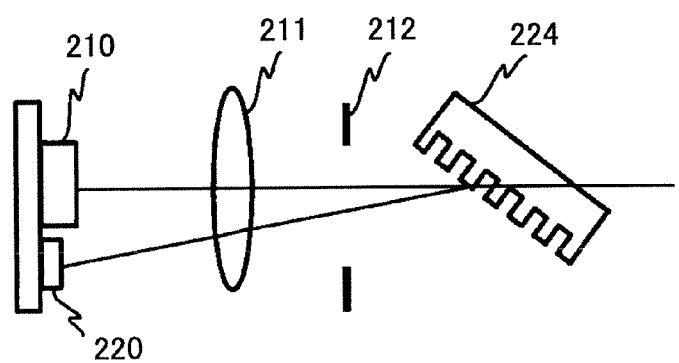
FIG. 39 is a drawing used to describe a case (3) where a diffractive-optical element is used instead of a parallel glass plate.

Further, a diffractive-optical element 224 may be used instead of the parallel glass plate 213 as shown in FIG. 39. The diffraction grating formed on the diffractive-optical element 224 has a periodic structure that shows form birefringence.

A periodic structure where two media (for example, air and an isotropic medium) with different refractive indices are arranged alternately at a pitch smaller than the wavelength of light is called a subwavelength structure (SWS). A diffraction grating having such a periodic structure shows form birefringence. Conventionally, a birefringent crystal such as rock crystal or calcite has been used to produce birefringence. However, since birefringence is a substance-specific property, it is difficult to control the birefringence of a substance. On the other hand, form birefringence can be produced without using a birefringent crystal and can be relatively easily controlled by changing the shape of a medium. Using form birefringence makes it possible to create, for example, a polarization beam splitter without using a birefringent crystal.

Form birefringence is also seen in a periodic structure (resonance structure) where two media are arranged alternately at a pitch within a so-called resonance range that is equal to or several times greater than the wavelength of light.

The diffraction grating (diffraction plane) on the diffractive-optical element 224 may have either a subwavelength structure or a resonance structure.

The diffractive-optical element 224 with such a diffraction grating may behave differently toward TE-polarized light having an electric field component parallel to the active layer and TM-polarized light having a magnetic field component parallel to the active layer. For example, the diffraction efficiency of the diffractive-optical element 224 is polarization-dependent. Therefore, the diffractive-optical element 224 may function as a polarization control mechanism as well as a beam-splitting mechanism.

Figure 40:
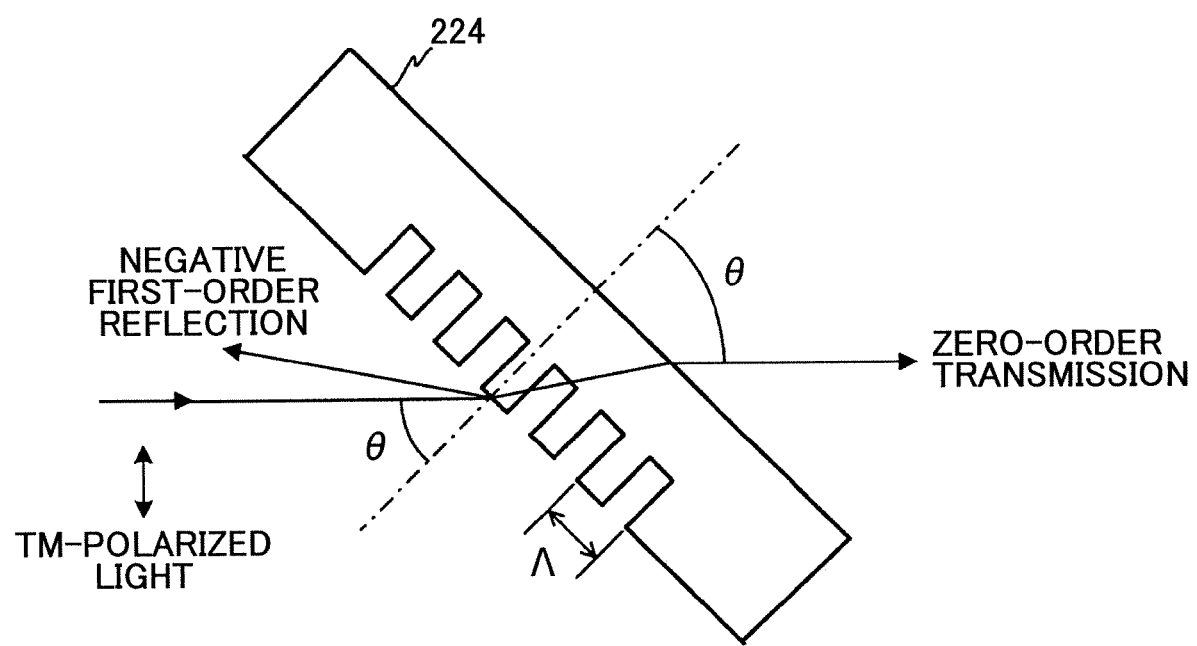
FIG. 40 is a drawing illustrating polarization control by a diffractive-optical element.

For example, as shown in FIG. 40, the diffractive-optical element 224 may be configured to show a zero-order transmission efficiency of more than 90% and a negative first-order reflection efficiency of 10% or lower for TM-polarized light (linearly-polarized light having a polarization direction that is a longitudinal direction on the printed page or the projection plane of FIG. 40); and a negative first-order transmission efficiency of 90% or higher for TE-polarized light (linearly-polarized light having a polarization direction perpendicular to the printed page). In this case, a large portion of the TM-polarized light is transmitted by the diffractive-optical element 224 and directed to the polygon scanner 215, and a small portion of the TM-polarized light is diffracted as negative first-order reflected light and is used for light intensity control. Therefore, a sufficient amount of light is directed to the photosensitive drum 901 for scanning. On the other hand, most of the TE-polarized light is transmitted as negative first-order diffracted light and only a very small portion of the TE-polarized light is directed to the polygon scanner 215. Therefore, TE-polarized light in an incident light beam can be cut off by the diffractive-optical element 224 (the diffractive-optical element 224 can control the polarization of a light beam).

An exemplary configuration of the diffractive-optical element 224 is described below.

The exemplary configuration of the diffractive-optical element 224 is as follows: wavelength $\lambda = 0.633$ μm, refractive index of diffraction grating N=1.456, pitch of diffraction grating $\Lambda = 0.35$ μm, fill factor f=0.5, depth of diffraction grating D=0.7 μm, and incidence angle $\theta = 65$ degrees. The exit angle $\theta'$ of the negative first-order reflected light obtained by the following grating equation (1) is $-64.4$ degrees:

$$\sin\theta + m\lambda/\Lambda = \sin\theta' \qquad (1)$$

In other words, the light path of the negative first-order reflected light and the light path of the light beam going from the light source unit 210 to the diffractive-optical element 224 do not form a wide angle.

A diffraction grating having a subwavelength structure or a resonance structure may be configured to produce only zero-order light and negative first-order diffracted light by selecting a certain grating pitch Λ. Such a diffraction grating does not produce other higher-order light and therefore is able to produce negative first-order light with high intensity. In other words, such a diffraction grating makes it possible to increase the intensity of a light beam used for light intensity control.

Figure 41:
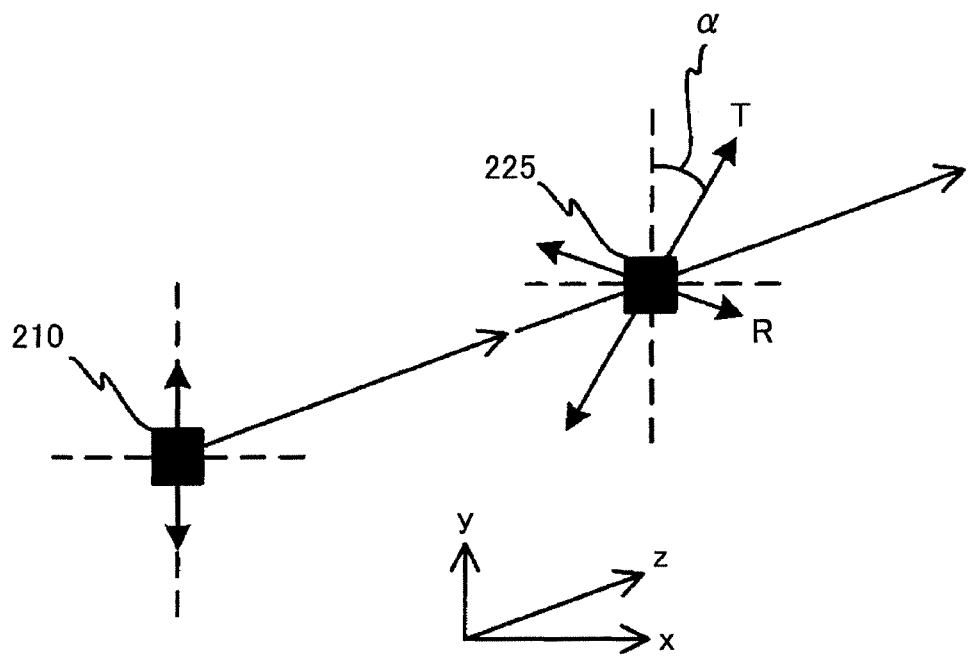
FIG. 41 is a drawing illustrating an optical element having polarization dependence.

In the above embodiment, an optical element 225 as shown in FIG. 41 may be used instead of the parallel glass plate 213. The optical element 225 is polarization-dependent and configured to transmit a polarization component (T direction component) in an incoming light beam which polarization component has a direction (T direction) that is tilted at an angle α with respect to the y direction and to reflect a polarization component (R direction component) in the incoming light beam which polarization component has a direction (R direction) that is orthogonal to the T direction. In this case, it is assumed that a light beam emitted from the light source unit 210 is linearly polarized in the y direction shown in FIG. 41. Also, transmission and reflection in this case mean those according to Snell's law and do not include transmission diffraction and reflection diffraction.

The T direction component in a light beam from the light source unit 210 is transmitted and the R direction component is reflected by the optical element 225. In other words, the polarization of a light beam from the light source unit 210 is controlled by the optical element 225. The T direction component transmitted by the optical element 225 enters the cylindrical lens 214 and the R direction component reflected by the optical element 225 enters the light intensity detector 220 and is used for light intensity control.

The light amount of the R direction component to be reflected by the optical element 225 differs depending on the relative rotation angle (angle α shown in FIG. 41) of the optical element 225 with respect to the light source unit 210 around the light axis of the optical element 225. Therefore, the light amount of the R direction component can be controlled by changing the relative rotation angle of the optical element 225. Also, the light amount of the R direction component can be controlled by changing the relative rotation angle of the light source unit 210.

Figure 42:
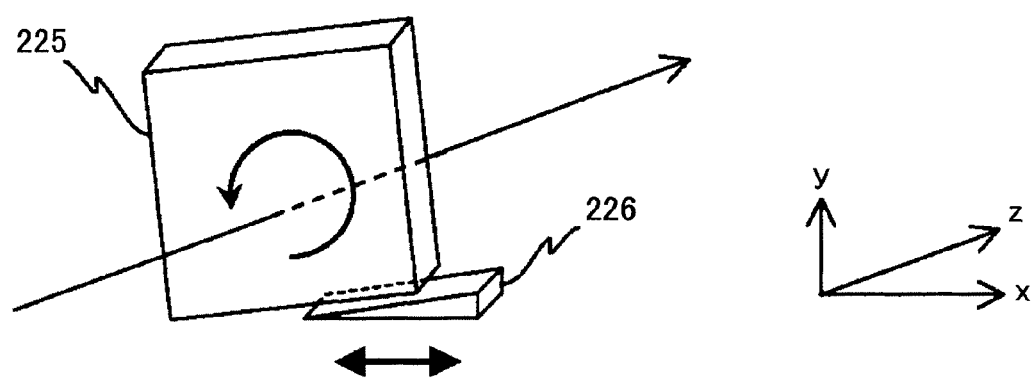
FIG. 42 is a drawing used to describe a method of adjusting the relative rotation angle of the optical element shown in FIG. 41.

Accordingly, the light amount of the R direction component to be reflected by the optical element 225 can be determined in the design phase of the optical scanning device 900 by setting the transmittance of the T direction component and the reflectance of the R direction component of the optical element 225 and by adjusting the relative rotation angle of the optical element 225. For example, as shown in FIG. 42, the relative rotation angle of the optical element 225 can be adjusted by inserting/withdrawing a wedge 226 into/from a position under a lower corner of the optical element 225 and thereby rotating the optical element 225 around its light axis. In this case, a driving mechanism (not shown) for inserting/withdrawing the wedge 226 is necessary. The driving mechanism may be controlled by a signal from the outside. Such a signal may be generated by a user instruction based on the result of an operational test of the image forming apparatus or may be generated by the image forming apparatus itself based on the result of an automatic operational test. Also, any other conventional adjusting mechanism may be used to adjust the relative rotation angle of the optical element 225.

Also, the relative rotation angle of the optical element 225 may be adjusted according to the change in the scanning resolution caused by the rotation of a multi-beam light source. Further, the relative rotation angle of the optical element 225 may be adjusted according to output signals from the light intensity detector 220 and the synchronizing sensor 218. Such a configuration makes it possible to stably detect the intensity of a light beam.

The optical element 225 is preferably implemented by a polarization/beam-splitting element (polarization/beam-splitting mirror) configured to transmit most (95% or more) of the T direction component and to reflect most (95% or more) of the R direction component. Such a polarization/beam-splitting mirror makes it possible to reduce the loss of an incoming light beam and thereby to improve the light use efficiency of the optical scanning system 900.

A polarization/beam-splitting mirror may be formed as a multilayer film structure using, for example, a dielectric multilayer film. Also, the advancement of microfabrication technologies has made it possible to form a diffraction plane having a periodic structure with a pitch smaller than the wavelength of light. Such a periodic structure is called a subwavelength structure and is used, for example, in a wire-grid polarizer and a photonic crystal polarizer. Unlike a conventional polarizer with a dielectric multilayer film structure, a polarizer with a subwavelength structure functions as a polarization/beam-splitting mechanism even for a light beam with a vertical or substantially vertical (10 degrees or narrower) incidence angle and therefore improves the layout flexibility of an optical scanning device.

Figure 43:
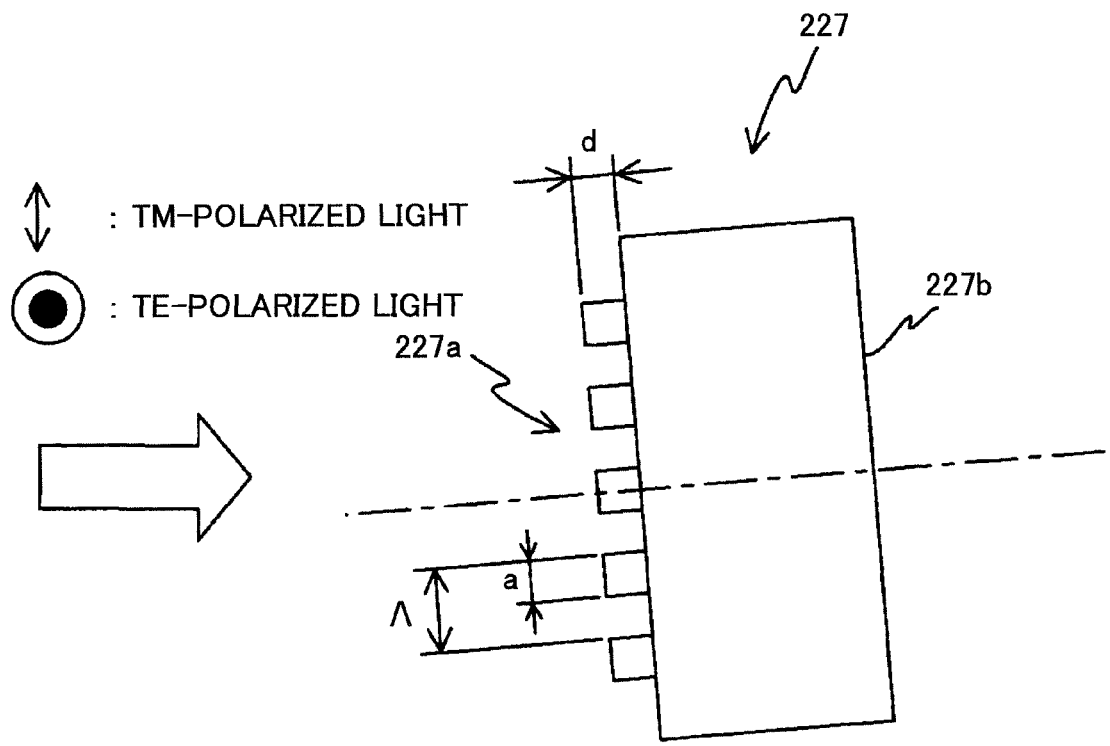
FIG. 43 is a drawing illustrating an exemplary polarization/beam-splitting mirror.

A polarization/beam-splitting mirror 227 according to an embodiment of the present invention has a diffraction plane with a subwavelength structure that is simpler than that of a wire-grid polarizer where fine metal wire is arranged at intervals in a dielectric material or a photonic crystal polarizer where several tens to one hundred or more films with a periodic structure are layered. As shown in FIG. 43, the polarization/beam-splitting mirror 227 includes a substrate 227b and a periodic structure 227a formed on a side of the substrate 227b. A light beam with a wavelength λ enters the periodic structure 227a via the light incident side medium (air) at a vertical or substantially vertical angle. The periodic structure 227a functions as a diffraction plane and each of the ridges in the periodic structure 227a has a substantially rectangular shape. In FIG. 43, light with a polarization direction perpendicular to the printed page is called TE-polarized light and light with a polarization direction that is a longitudinal direction on the printed page is called TM-polarized light.

When the pitch Λ (<λ) of the periodic structure 227a (sub-wavelength structure) is 0.4 μm, the width a of each ridge of the periodic structure 227a is 0.24 μm, the depth d of each groove of the periodic structure 227a is 0.18 μm, the refractive index of the periodic structure 227a is 2.27, the refractive index of the substrate 227b is 1.456, the wavelength λ of a light beam is 0.663 μm, and the incidence angle of the light beam is 90 degrees, the transmittance and reflectance of the polarization/beam-splitting mirror 227 calculated by rigorous coupled-wave analysis (RCWA) are as follows: for TE-polarized light, the transmittance is 99.95% and the reflectance is 0.05%; and for TM-polarized light, the transmittance is 0.54% and the reflectance is 99.46%. In other words, the polarization/beam-splitting mirror 227 transmits most of TE-polarized light and reflects most of TM-polarized light. The polarization/beam-splitting mirror 227 as described above may be easily produced by using a nanoimprint technique.

According to the above embodiment, the polarization/beam-splitting mirror 227 has a simple structure where no more than one layer is provided between the light incident side medium (air) and the substrate 27b. Also, the periodic structure 227a is made of a single periodic structure rather than a double periodic structure. Therefore, the above embodiment makes it possible to easily produce a polarization/beam-splitting mirror with an aspect ratio equal to or smaller than 1 by using, for example, a nanoimprint technique.

Figure 44:
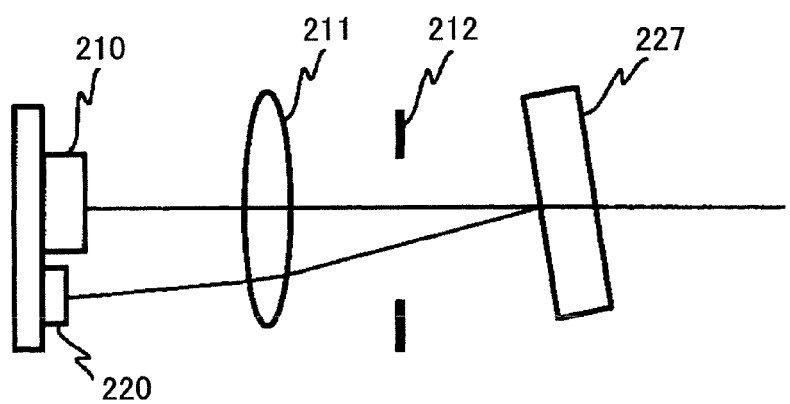
FIG. 44 is a drawing used to describe a case where a light source unit and a light intensity detector are integrated.
Figure 45:
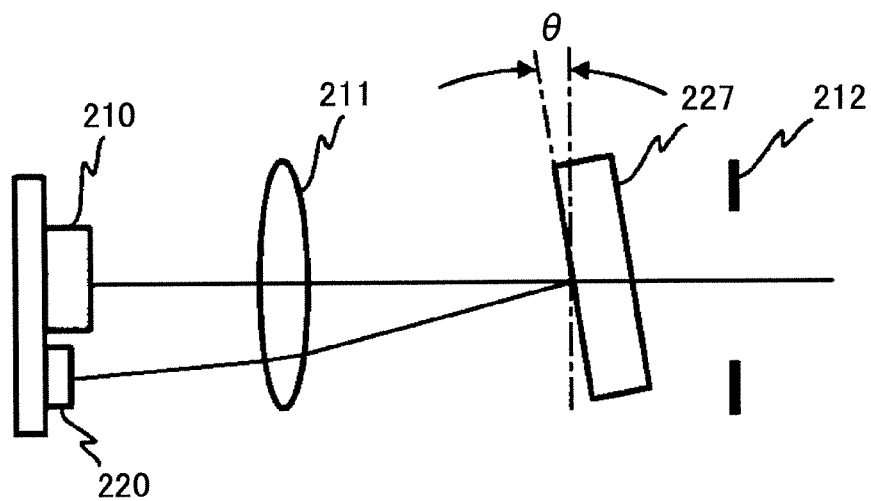
FIG. 45 is a drawing used to describe a case where an aperture is placed in a different position.
Figure 46:
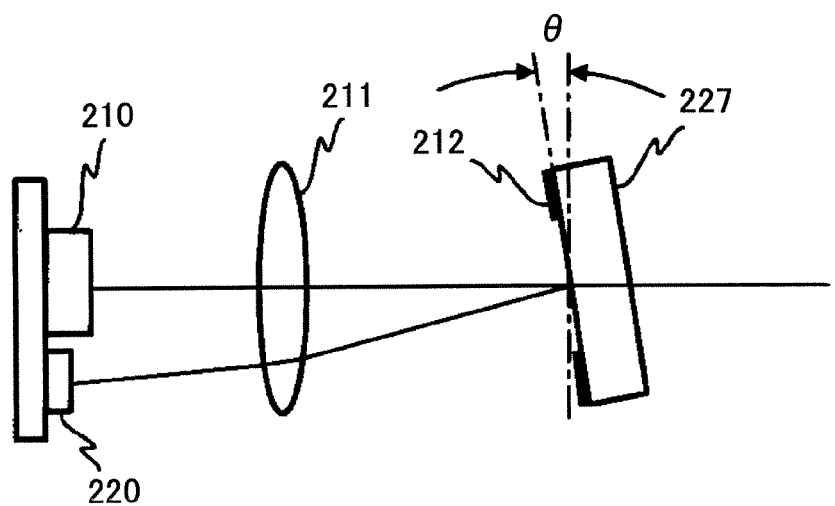
FIG. 46 is a drawing used to describe a case where a polarization/beam-splitting mirror and an aperture are integrated.

Even when the polarization/beam-splitting mirror 227 is used instead of the parallel glass plate 213, the light source unit 210 and the light intensity detector 220 may be integrated as shown in FIG. 44. Also, the aperture 212 may be placed between the polarization/beam-splitting mirror 227 and the cylindrical lens 214 as shown in FIG. 45. Further, the aperture 211 may be integrated with the polarization/beam-splitting mirror 227 as shown in FIG. 46.

A light intensity control mechanism according to the above embodiment may be used not only for a surface emitting laser but also for a conventional edge emitting laser.

Also, the light intensity detector 220 may include one or more light-detecting areas. When the light intensity detector 220 has one light-detecting area, it may be configured to measure the intensities of multiple light beams using the light-detecting area by time-sharing. When the light intensity detector 220 has multiple light-detecting areas, it may be configured to assign each of the multiple light-detecting areas to a corresponding one of multiple light-emitting points and thereby to separately measure the intensities of light beams emitted from the multiple light-emitting points. Further, the light intensity detector 220 may be configured to measure the intensities of multiple light beams collectively or to use an appropriate light intensity measuring method for each light beam depending on the characteristics and stability of the corresponding light-emitting point.

In the above embodiment, the first optical unit is composed of one optical element. However, the first optical unit may be composed of multiple optical elements.

The above embodiment may be applied to an optical scanning device that can produce a color image and therefore makes it possible to provide a small and low-cost image forming apparatus that can form a high-quality color image.

Figure 47:
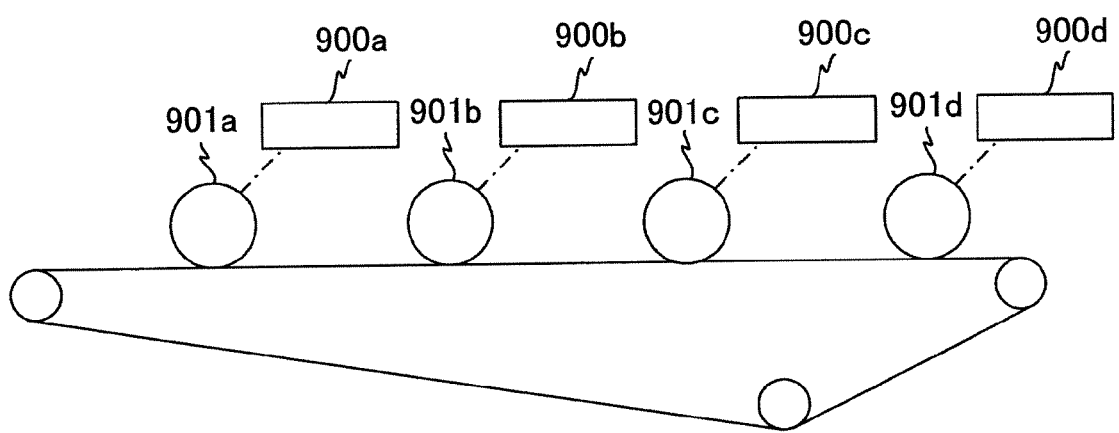
FIG. 47 is a drawing illustrating an exemplary tandem color image forming apparatus.

Also, the above embodiment may be applied to a tandem color image forming apparatus including a photosensitive drum for each color. An exemplary tandem color image forming apparatus shown in FIG. 47 includes an optical scanning apparatus 900a for forming a latent image of Y image data on a photosensitive drum 901a, an optical scanning apparatus 900b for forming a latent image of M image data on a photosensitive drum 901b, an optical scanning apparatus 900c for forming a latent image of C image data on a photosensitive drum 901c, and an optical scanning apparatus 900d for forming a latent image of K image data on a photosensitive drum 901d.

In the above embodiment, the laser printer 100 is used as an example of an image forming apparatus. However, an image forming apparatus may be a digital copier, a scanner, a facsimile, or a multifunction copier including the optical scanning device 900. In other words, an optical scanning device according to an embodiment of the present invention makes it possible to provide various small and low-cost image forming apparatuses that can form a high-quality image.

Figure 48:
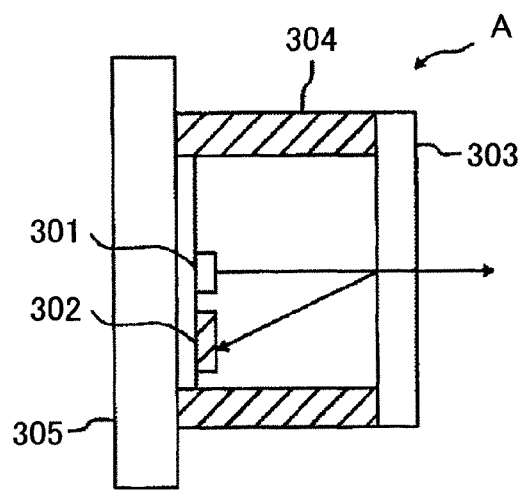
FIG. 48 is a drawing illustrating an exemplary light source device according to an embodiment of the present invention.

Other embodiments of the present invention are described below with reference to the accompanying drawings. FIG. 48 is a drawing illustrating an exemplary light source device according to an embodiment of the present invention. A light source device A shown in FIG. 48 includes a surface emitting laser 301, a photodetector 302 for receiving a portion of a light beam emitted from the surface emitting laser 301, a cover glass 303, a holder 304, and a base 305. The cover glass 303, the holder 304, and the base 305 enclose the surface emitting laser 301 and the photodetector 302.

Figure 49:
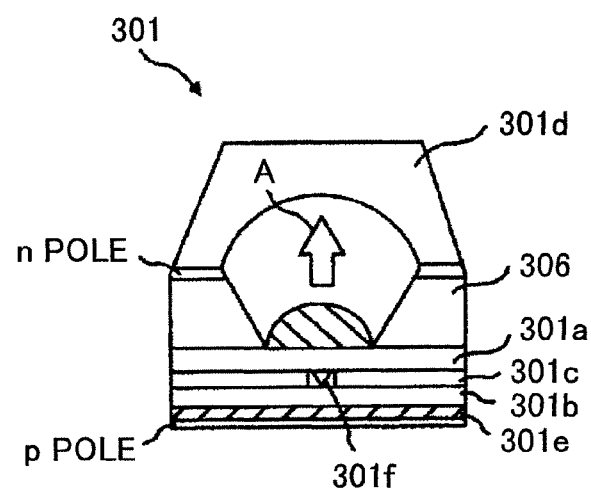
FIG. 49 is a drawing illustrating an exemplary surface emitting laser.

FIG. 49 is a drawing illustrating an exemplary structure of the surface emitting laser 301. The surface emitting laser 301 includes an active layer 301c, two clad layers 301a and 301b one on each side of the active layer 301c, a substrate 306 stacked on the upper surface of the clad layer 301a, and reflective layers 301d and 301e with high reflectance. The reflective layers 301d and 301e are provided on the upper surface of the substrate 306 and the under surface of the clad layer 301b, respectively, so that they are positioned at opposite ends.

The layers sandwiched between the reflective layers 301d and 301e function as a Fabry-Perot resonator that is perpendicular to the substrate 306 and cause laser oscillation in an oscillation area 301f of the active layer 301c. A light beam is emitted in the direction of arrow A shown in FIG. 49, in other words, in the direction perpendicular to the substrate 306. Because of the above structure, a laser beam emitted from the surface emitting laser 301 may be randomly polarized.

As shown in FIG. 48, a light beam emitted from the surface emitting laser 301 enters the cover glass 303 that is an optical element. A portion of the light beam is separated and enters the photodetector 302. While a light beam emitted from the surface emitting laser 301 is randomly polarized, the light beam becomes linearly polarized in a specific direction after being transmitted by the cover glass 303.

In this example, the cover glass 303 functions both as a beam-splitting mechanism and a polarization control mechanism. In other words, a beam-splitting mechanism and a polarization control mechanism are integrated in the cover glass 303. Light intensity control is performed on the surface emitting laser 301 based on a light beam intensity signal from the photodetector 302.

Figure 50:
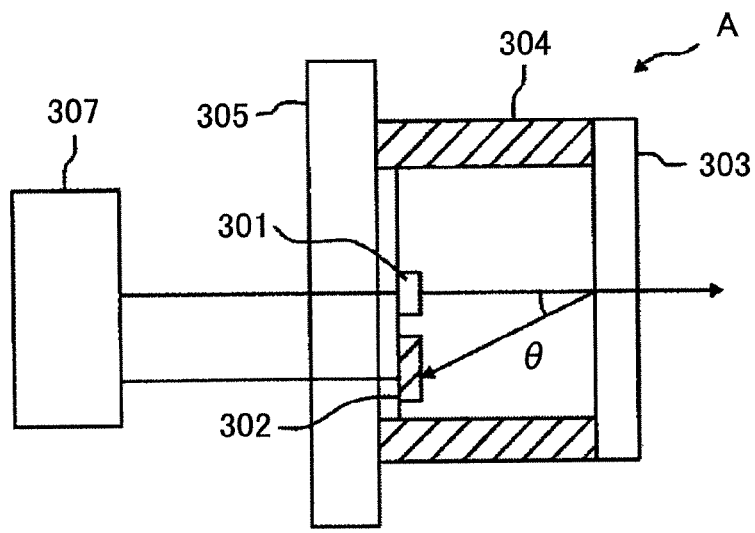
FIG. 50 is a drawing illustrating an exemplary light intensity control unit.

FIG. 50 is a drawing illustrating an exemplary light intensity control unit. As shown in FIG. 50, a portion of a light beam is reflected at an angle θ by the cover glass 303 of the light source device A and enters the photodetector 302.

The photodetector 302 sends a light intensity signal to a laser beam intensity control unit 307. The laser beam intensity control unit 307 controls the driving current to maintain the intensity of a light beam emitted from the surface emitting laser 301 at a certain level. A current signal from the laser beam intensity control unit 307 is fed back to the surface emitting laser 301 to drive the surface emitting laser 301 at a specified output power.

Figure 51:
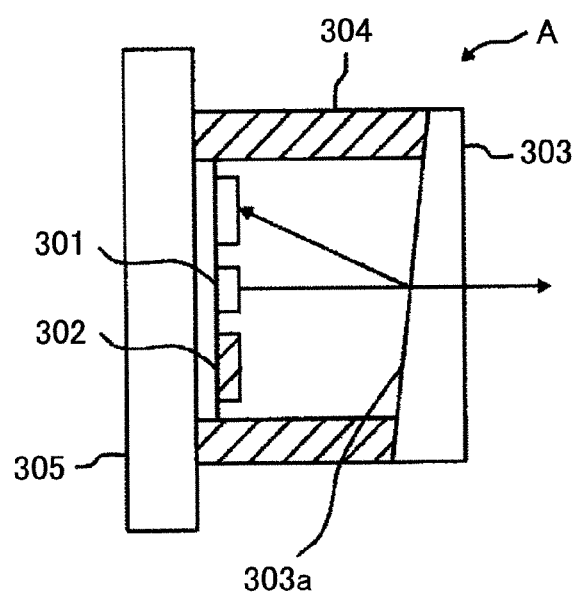
FIG. 51 is a drawing illustrating an exemplary beam-splitting mechanism.

FIG. 51 is a drawing illustrating an exemplary beam-splitting mechanism. In the light source device A shown in FIG. 51, the surface emitting laser 301 is mounted on the base 305. A half mirror surface 303a that functions as a beam-splitting mechanism is formed on a side of the cover glass 303 supported by the holder 304 which side is closer to the surface emitting laser 301.

The half mirror surface 303a transmits a certain portion of a light beam, for example, 50% of a light beam and reflects the remaining 50% of the light beam. The half mirror surface 303a may be implemented by a dielectric multilayer film.

The proportion of the portion of a light beam to be transmitted to the portion of the light beam to be reflected by the half mirror surface 303a may be determined based on the factors described below. Generally, it is preferable to use a light beam with high intensity for scanning. Therefore, the half mirror surface 303a is preferably configured to achieve high transmittance.

In other words, the half mirror surface 303a is preferably configured to reflect a minimum portion of a light beam which portion is necessary for light intensity control. Also, positioning a beam-splitting mechanism closer to the surface emitting laser 301 than a polarization control mechanism makes it possible to split a light beam while its intensity is high.

Figure 52:
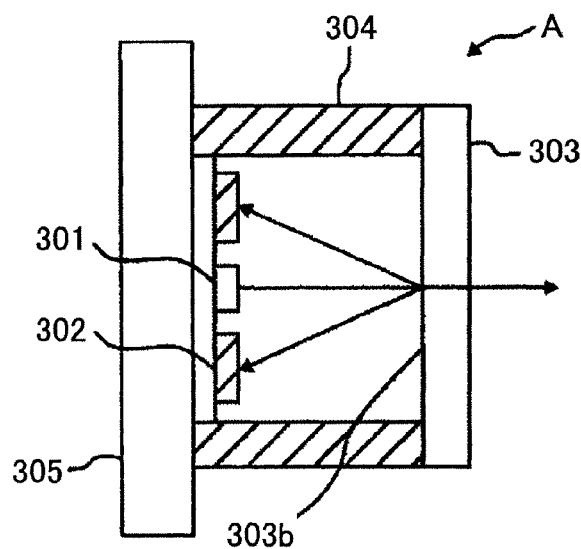
FIG. 52 is a drawing illustrating another exemplary beam-splitting mechanism.

FIG. 52 is a drawing illustrating another exemplary beam-splitting mechanism. In the light source device A shown in FIG. 52, a diffraction plane 303b having a periodic structure that functions as a beam-splitting mechanism is formed on a side of the cover glass 303 which side is closer to the surface emitting laser 301.

The diffraction plane 303b produces positive and negative first-order reflected light that is detected by the photodetectors 302. The diffraction plane 303b causes positive and negative first-order diffraction when the pitch Λ of the diffraction grating 303b is greater than the wavelength λ of a light beam emitted from the surface emitting laser 301 (Λ>λ).

In FIG. 52, the photodetector 302 is provided for each of the positive first-order reflected light and the negative first-order reflected light. However, the light source device A may be configured to provide the photodetector 302 only for one of the positive first-order reflected light and the negative first-order reflected light. Also, it is possible to use diffracted light of a different diffraction order. According to the above embodiment, a stable polarization control mechanism can be formed without using an additional material such as a polymer or metal wire by directly processing the cover glass 303.

Also, it is possible to make the positive first-order diffraction efficiency higher than the negative first-order diffraction efficiency or vice versa by blazing the diffraction plane 303b. Meanwhile, unnecessary light produced by the diffraction plane 303b may be cut off by providing an aperture (not shown) inside or outside of the light source device A.

Figure 53:
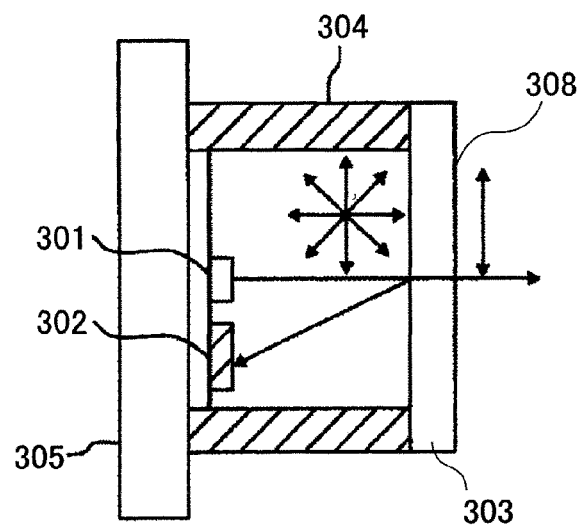
FIG. 53 is a drawing illustrating an exemplary polarization control mechanism.

FIG. 53 is a drawing illustrating an exemplary polarization control mechanism. In the light source device A shown in FIG. 53, a polymer polarization filter (polarizer) 308 that functions as a polarization control mechanism is formed on the far side of the cover glass 303 from the surface emitting laser 301.

Forming a polarization control mechanism on the far side of the cover glass 303 from the surface emitting laser 301, in other words, on the outmost surface of the light source device A makes it possible to output a polarization-controlled light beam from the light source device A.

In the above example, only a linearly polarized component having a specific polarization direction is transmitted out of randomly polarized light emitted from the surface emitting laser 301. Any other polarization control mechanism, such as a wire-grid polarizer, that can be formed as a thin layer on the cover glass 303 may also be used.

FIG. 54 is a drawing illustrating another exemplary polarization control mechanism. In the light source device A shown in FIG. 54, a diffraction plane (diffraction grating) 309 having a polarization-dependent periodic structure that functions as a polarization control mechanism is formed on the far side of the cover glass 303 from the surface emitting laser 301.

When the pitch Λ' of the diffraction plane 309 is close to the wavelength λ of a light beam emitted from the surface emitting laser 301 (Λ'=λ to 10λ: resonance range) or smaller than the wavelength λ (Λ<λ: subwavelength range), the diffraction plane 309 shows polarization dependence. The diffraction plane 309 having such a structure behaves differently depending on the polarization direction (for example, TE-wave or TM-wave) of an incoming light beam.

For example, a polarization-dependent diffraction plane where the pitch Λ' is 2λ is described in "Optics Letters Volume 20, Issue. 17, page 1830, M. Schmitz, et al." The diffraction plane described in the above document transmits TE-polarized light and diffracts TM-polarized light into positive first-order diffracted light and negative first-order diffracted light.

Also, a diffraction plane having a subwavelength structure where Λ' is smaller than λ can be configured to show a desired form birefringence so that the diffraction plane transmits light with a specific polarization. Meanwhile, unnecessary light produced by the diffraction plane 309 may be cut off by providing an aperture (not shown) inside or outside of the light source device A.

According to the above embodiment, a polarization control mechanism that is strong and tolerant of heat can be formed without using an additional material such as a multilayer film by directly processing the cover glass 303.

Figure 56A:
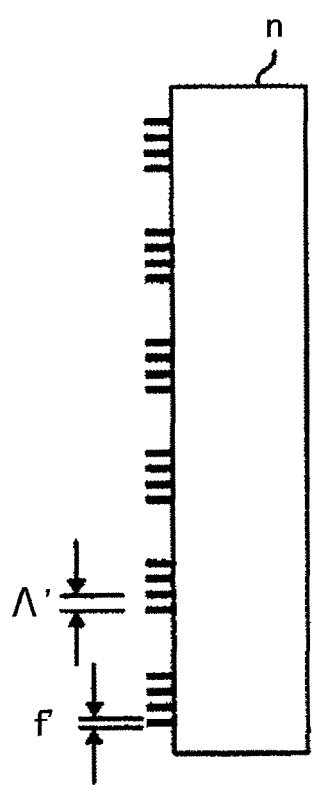
FIGS. 56A through 56C are drawings illustrating the exemplary beam-splitting/polarization-control mechanism shown in FIG. 55 along with TE-polarized light and TM-polarized light.
Figure 56B:
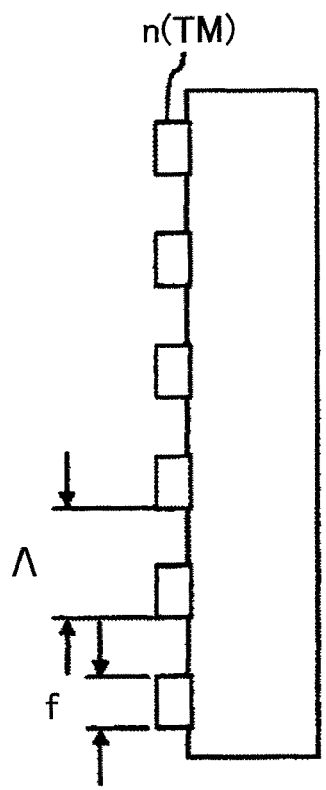
Figure 56C:
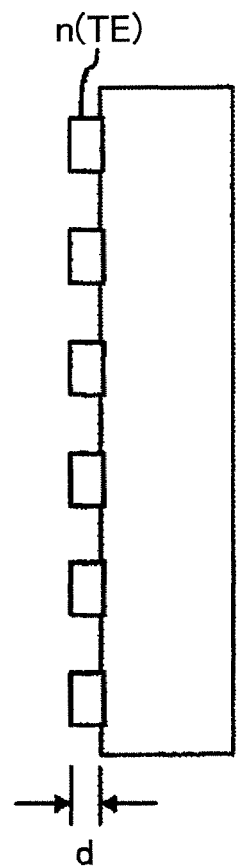

FIG. 55 is a drawing illustrating an exemplary beam-splitting/polarization-control mechanism formed on the cover glass 303. FIGS. 56A through 56C are drawings illustrating the exemplary beam-splitting/polarization-control mechanism shown in FIG. 55 along with TE-polarized light and TM-polarized light.

In FIG. 55 through FIG. 56C, a diffraction plane 310 formed on a side (a side closer to the surface emitting laser 301) of the cover glass 303 functions both as a beam-splitting mechanism and a polarization control mechanism. The photodetector 302 is mounted on the base 305 surrounded by the holder 304 so as to face the diffraction plane 310.

The diffraction plane 310 on the cover glass 303 has polarization dependence and is formed by combining a diffraction grating that has a pitch Λ and functions as a beam-splitting mechanism and a diffraction grating that has a pitch Λ' and functions as a polarization control mechanism. The pitch Λ is greater than the pitch Λ'.

When the diffraction grating with the pitch Λ' has form birefringence, it shows effective refractive indices similar to those of an isotropic medium. When the refractive index of a substrate (cover glass 303 in this case) is n, the wavelength of light is λ, the pitch is Λ', and the fill factor is f, the refractive index n(TE) for TE-polarized light and the refractive index n(TM) for TM-polarized light of the diffraction grating can be expressed by the following formulas:

$$n(TE) = \sqrt{\{fn^2 + (1-f)\}}$$

$$n(TM) = \sqrt{[n^2/\{f + (1-f)n^2\}]}$$

As shown by the above formulas, the diffraction grating with the pitch Λ' shows different effective diffractive indices for TE-polarized light and TM-polarized light. In other words, as shown in FIGS. 56B and 56C, the diffraction plane 310 functions as a diffraction grating having the pitch Λ and the refractive index n(TE) for TE-polarized light, and functions as a diffraction grating having the pitch Λ and the refractive index n(TM) for TM-polarized light.

Therefore, the diffraction plane 310 behaves differently for TE-polarized light and TM polarized light and can be used as a polarization/beam-splitting mirror that transmits light linearly polarized in a first direction and reflects light linearly polarized in a second direction that is orthogonal to the first direction. In other words, the diffraction plane 310 can be used as a polarization control mechanism.

Also, the diffraction plane 310 with a pitch Λ can produce, for example, positive first-order reflected light and/or negative first-order reflected light, and therefore can function as a beam-splitting mechanism that splits a light beam and directs a portion of the light beam to the photodetector 302.

Further, as shown in FIG. 55, the diffraction plane 310 that functions both as a beam-splitting mechanism and a polarization control mechanism can be formed on a side of cover glass 303 which side is closer to the surface emitting laser 301. Providing both a beam-splitting mechanism and a polarization control mechanism on the same side of the cover glass 303 makes it possible to form them without using additional materials by directly processing only one side of the cover glass 303.

Also, since the diffraction plane 310 is in an enclosure formed by the cover glass 303, the holder 304, and the base 305, it is protected from foreign substances and dust. With such a structure, a protective layer on the diffraction plane 310 may be omitted. Although forming the diffraction plane 310 on the near side of the cover glass 303 from the surface emitting laser 301 has the above advantage, it is also possible to form the diffraction plane 310 on the far side of the cover glass 303.

In the above embodiment, the light source device A includes the surface emitting laser 301, the photodetector 302, the cover glass 303, the holder 304, and the base 305. However, a structure that functions both as a holder and a base may be used. Also, another supporting part may be added to the configuration.

Further, any conventional method may be used to join the holder 304 and the cover glass 303.

Compared to edge emitting lasers, it is comparatively easy to form a laser array with surface emitting lasers. Even a surface emitting laser array having tens of light-emitting points is available. A light source device according to the above embodiment may be implemented by using such a surface emitting laser array.

Figure 57:
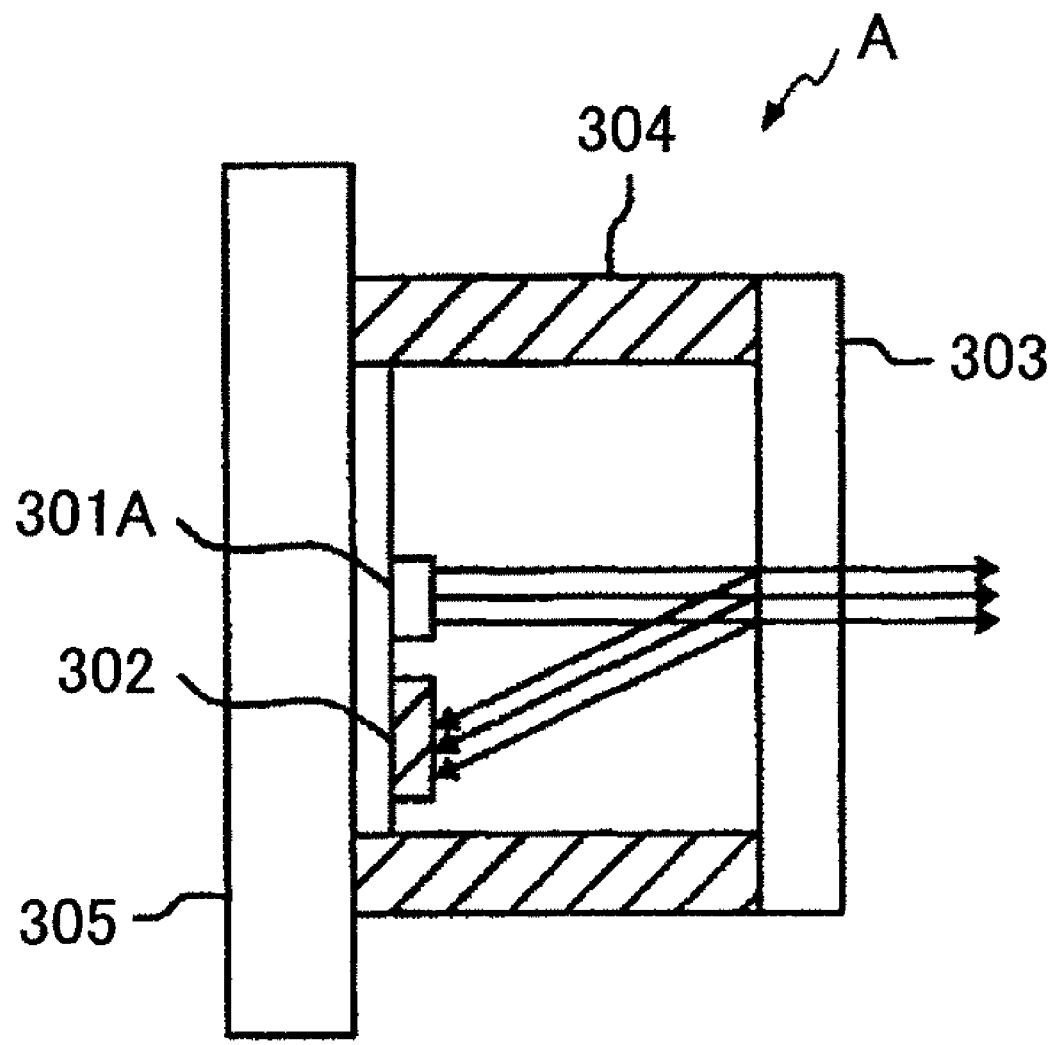
FIG. 57 is a drawing illustrating an exemplary light source device using a surface emitting laser array.

FIG. 57 is a drawing illustrating an exemplary light source device using a surface emitting laser array. As shown in FIG. 57, a surface emitting laser array 301A of a light source device A emits multiple light beams (to simplify the drawing, only three light beams are illustrated).

A photodetector 302 for receiving portions of the light beams and the surface emitting laser array 301A are enclosed by a cover glass 303, a holder 304, and a base 305.

A beam-splitting mechanism and a polarization control mechanism as described above may be used for the light beams. Each of the light beams emitted from the surface emitting laser array 301A is split by a beam-splitting mechanism and a portion of each of the light beams (a split light beam) is directed to the photodetector 302. The photodetector 302 may be configured to detect multiple split light beams collectively.

In this case, the photodetector 302 may be configured to detect all of the split light beams or to detect some of the split light beams as samples. On the other hand, the light source device A may be configured to separately control the intensity of each of the light beams emitted from the surface emitting laser array 301A. In this case, one photodetector is provided for each of the light beams.

FIGS. 58A and 58B are drawings illustrating an exemplary optical scanning device according to an embodiment of the present invention.

A light source unit 320 includes a light source device A and a first optical unit 311 (for example, a single lens). A light beam emitted from the light source device A is substantially collimated by the single lens 311 and guided to a second optical unit 321. The second optical unit 321 is made of, for example, a cylindrical lens 312. The light beam is focused in one direction by the cylindrical lens 312 to form a line image on a deflecting reflective surface of a deflector 313.

The deflector 313 deflects the light beam into a third optical unit 322. The third optical unit 322 is made of, for example, two image scanning lenses 314 and 315. The image scanning lenses 314 and 315 focuses the light beam to form a light spot on a target surface 316. The light spot is moved at certain intervals to scan the target surface 316.

Even when the surface emitting laser array 301A shown in FIG. 57 is used as the light source device A, the working of the exemplary optical scanning device is substantially the same as described above. In this case, multiple light spots formed by multiple light beams from the surface emitting laser array 301A are arranged on the target surface 316 at specified intervals in the main-scanning and sub-scanning directions. Optical elements (the surface emitting laser array 301A and optical elements 311 through 315) in the exemplary optical scanning device are arranged so that the light spots are formed at the specified intervals.

As described above, embodiments of the present invention may be applied to a surface emitting laser array and therefore contribute to increasing the number of light beams usable in an optical scanning device. Also, embodiments of the present invention contribute to improving the printing speed and printing resolution of an image forming apparatus. Further, embodiments of the present invention makes it possible to provide a small and low-cost light source device and thereby to provide a small and low-cost optical scanning device.

Unnecessary light beams that are produced by a diffraction-optical element (light beams of certain diffraction orders that are not used for scanning and light intensity control) may be cut off by providing a shield inside or outside of an optical scanning device.

Figure 59:
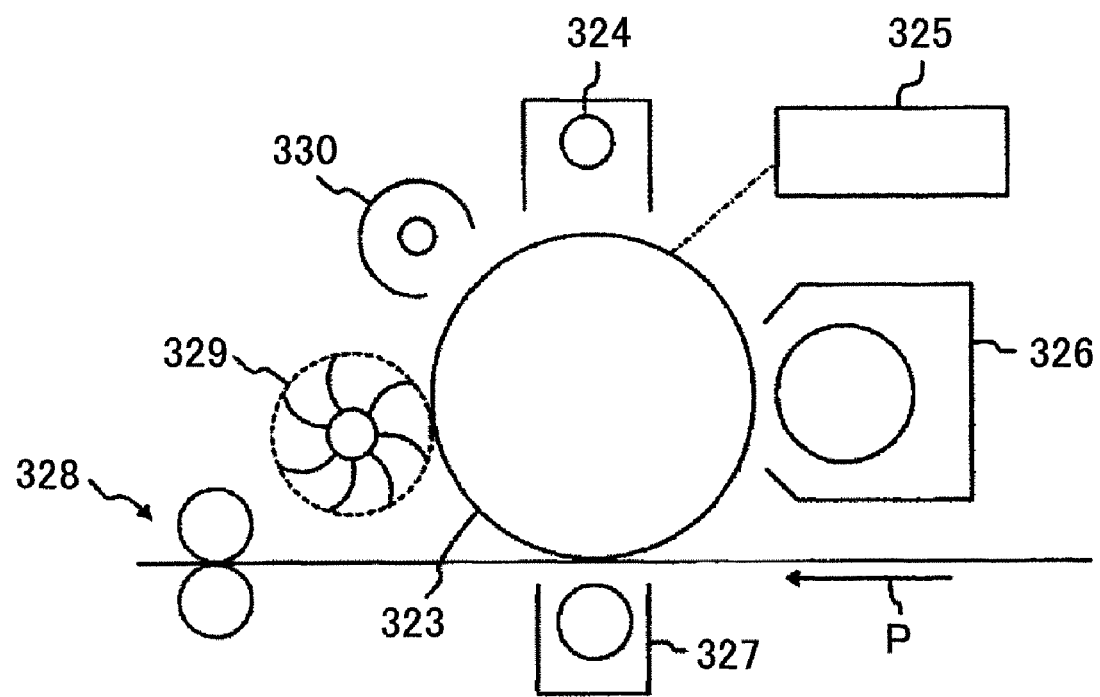
FIG. 59 is a drawing illustrating an exemplary image forming apparatus including the exemplary optical scanning device according to an embodiment of the present invention.
Figure 60:
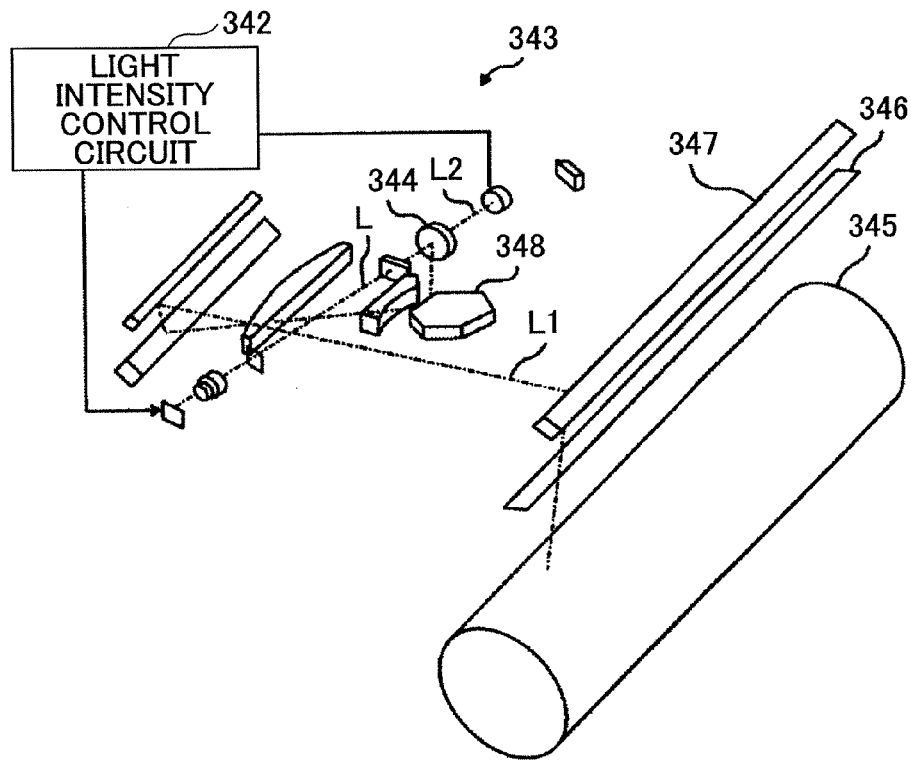
FIG. 60 is a drawing illustrating a conventional optical scanning device where a half mirror is used to separate a portion of a light beam.
Figure 61:
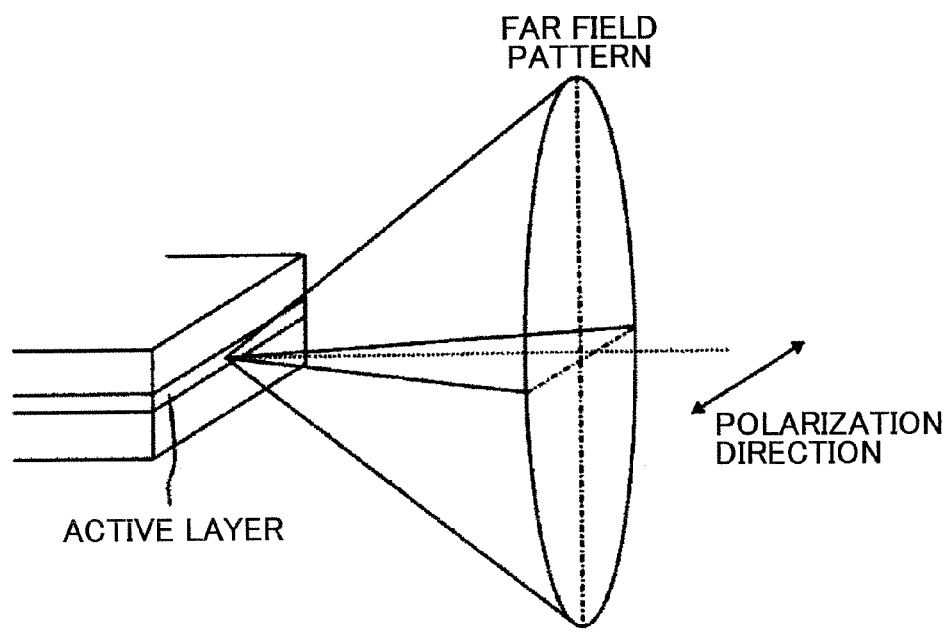
FIG. 61 is a drawing illustrating the polarization direction of a light beam emitted from an edge emitting laser.
Figure 62:
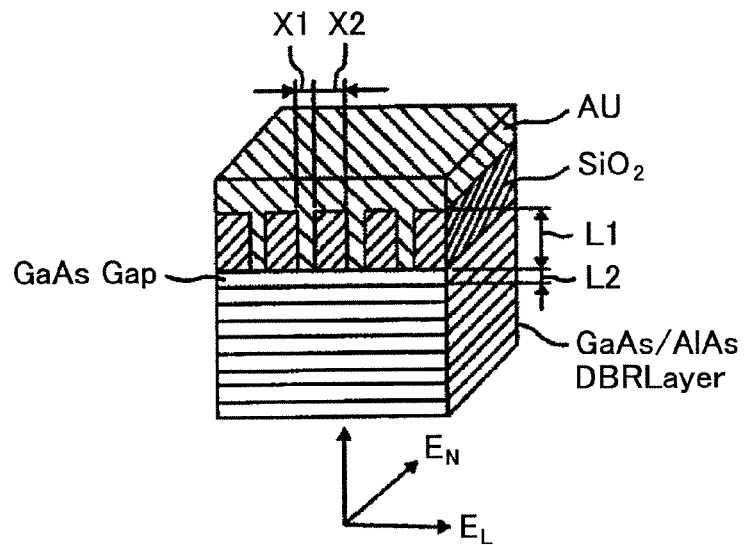
FIG. 62 is a drawing illustrating a conventional polarization control mechanism.
Figure 63:
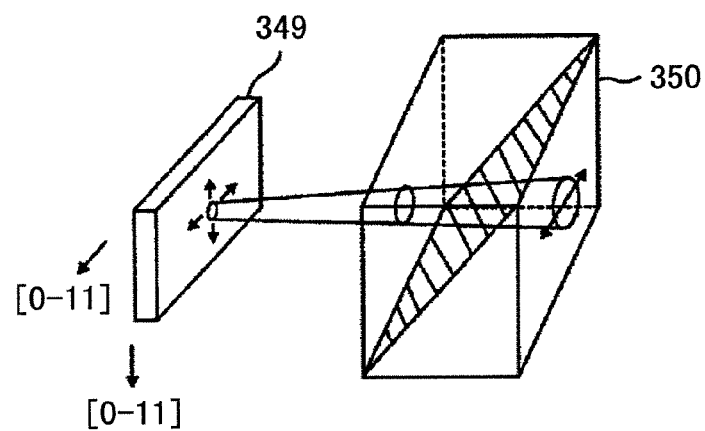
FIG. 63 is a drawing illustrating a conventional polarization control mechanism disclosed in patent document 6 where a polarization beam splitter is positioned adjacent to the light emitting side of a surface emitting laser.

FIG. 59 is a drawing illustrating an exemplary image forming apparatus including the exemplary optical scanning device according to an embodiment of the present invention. In the exemplary image forming apparatus, an electrophotographic process is used as an image forming process. The outline of an exemplary electrophotographic process is described below.

In the exemplary electrophotographic process, a charging unit 324 charges an image carrier 323 (for example, a photoconductor) (charging process). An exposing unit 325 such as an optical scanning device according to an embodiment of the present invention scans a light beam on the image carrier 323 and thereby forms a latent image (exposing process). A developing unit 326 causes toner to adhere to the latent image and thereby forms a toner image (developing process). A transfer unit 327 transfers the toner image onto recording paper P (transfer process). Then, a fusing unit 328 applies pressure and heat to the toner image and thereby fuses the toner image onto the recording paper P (fusing process).

Further, a cleaning unit 329 removes toner remaining on the image carrier 323 and a discharging unit 330 discharges the charged area on the image carrier 323. Meanwhile, an optical scanning device according to embodiments of the present invention can be used for a tandem color image forming apparatus that is suitable for high-speed color image forming.

As described above, embodiments of the present invention make it possible to control the intensity of a light beam emitted from a surface emitting laser and thereby make it possible to provide an image forming apparatus that can form an image with uniform image density. Also, embodiments of the present invention make it possible to control polarization of a light beam emitted from a surface emitting laser, to reduce the influence of polarization dependence in transmittance and reflectance of optical elements in an optical scanning device, and thereby to reduce fluctuation in image density.

Further, embodiments of the present invention make it possible to use a surface emitting laser array for an optical scanning device of an image forming apparatus and thereby make it possible to improve the printing speed and printing resolution of the image forming apparatus. Meanwhile, embodiments of the present invention make it possible to decrease the rotational speed of a beam deflector of an optical scanning device while maintaining the same scanning speed and resolution and thereby make it possible to reduce power consumption and noise and heat generated by the rotation of a beam deflector.

An embodiment of the present invention makes it easier to install a beam-splitting unit in an optical scanning device of an image forming apparatus. Another embodiment of the present invention makes it possible to integrate a beam-splitting mechanism and a polarization control mechanism. Another embodiment of the present invention makes it possible to control the intensity of a light beam from a light source without being affected by changes in the divergence angle of the light beam which are caused by changes in the driving current.

Still another embodiment of the present invention makes it possible to integrate a beam-splitting unit and a polarization control unit on a cover glass that is often used in a light source device using a laser diode such as an edge emitting laser or a surface emitting laser, and thereby makes it possible to provide a small and low-cost light source device.

The present invention is not limited to the specifically disclosed embodiments, and variations and modifications may be made without departing from the scope of the present invention.

The present application is based on Japanese Priority Application No. 2006-005431 filed on Jan. 12, 2006, Japanese Priority Application No. 2006-329113 filed on Dec. 6, 2006, and Japanese Priority Application No. 2006-254494 filed on Sep. 20, 2006, the entire contents of which are hereby incorporated herein by reference.

What is claimed is:

1. A device for optically scanning a target surface, comprising:
   a light source unit configured to emit a light beam;
   a light intensity detecting unit;
   a coupling unit configured to substantially collimate the emitted light beam;
   a beam limiting unit comprising a light shielding film or a light shielding material on a plate, and configured to limit an amount of the collimated light beam;
   a beam splitting unit configured to split the beam limited light beam and thereby to cause a first portion of the beam limited light beam to enter the light intensity detecting unit, wherein the light intensity detecting unit is configured to detect intensity of the first portion of the beam limited light beam; and
   a beam deflecting unit configured to deflect a second portion of the split light beam toward the target surface, wherein
   the beam limiting unit and the beam splitting unit are positioned between the coupling unit and the beam deflecting unit,
   the beam splitting unit is configured to split the light beam by diffraction,
   the beam limiting unit and the beam splitting unit are integrated on a substrate as a single unitary structure, and
   the beam limiting unit and the beam splitting unit are formed on the same surface of the substrate.

2. The device as claimed in claim 1, wherein the beam splitting unit is a diffractive-optical element that produces transmitted diffracted light.

3. The device as claimed in claim 1, wherein the beam splitting unit includes a polarization control unit configured to control polarization of the emitted light beam.

4. The device as claimed in claim 3, wherein the beam splitting unit has form birefringence.

5. The device as claimed in claim 3, wherein the first portion of the beam limited light beam caused to enter the light intensity detecting unit is reflected light having a same polarization direction as that of zero-order transmitted light.

6. The device as claimed in claim 3, wherein the first portion of the beam limited light beam caused to enter the light intensity detecting unit is reflected light having a polarization direction orthogonal to that of zero-order transmitted light.

7. The device as claimed in claim 5, wherein the reflected light is negative first-order diffracted light.

8. The device as claimed in claim 1, wherein the light source unit and the light intensity detecting unit are mounted on a same substrate.

9. The device as claimed in claim 8, wherein the beam splitting unit causes the first portion of the beam limited light beam to pass though the coupling unit again and then enter the light intensity detecting unit mounted on the same substrate as the light source.

10. The device as claimed in claim 1, wherein the light source unit includes a surface emitting laser configured to emit one laser beam or a surface emitting laser array configured to emit multiple laser beams.

11. An image forming apparatus including the device as claimed in claim 1.

12. The device as claimed in claim 1, wherein the light intensity detecting unit is configured to measure intensities of multiple light beams using one light-detecting area by time-sharing.

13. The device as claimed in claim 1, wherein the single unitary structure, for a TE-polarized component of an incident light beam, is configured to have a higher transmission diffraction efficiency than a reflection diffraction efficiency.

14. The device as claimed in claim 1, wherein the single unitary structure, for a TM-polarized component of an incident light beam, is configured to have a higher reflection diffraction efficiency than a transmission diffraction efficiency.

15. The device as claimed in claim 1, wherein the beam limiting unit is formed on a portion of the substrate other than a portion corresponding to the beam splitting unit.

* * * * *